US011759085B2

(12) United States Patent
Harrington et al.

(10) Patent No.: US 11,759,085 B2
(45) Date of Patent: Sep. 19, 2023

(54) FLOOR CLEANING SYSTEM

(71) Applicant: Unger Marketing International, LLC, Bridgeport, CT (US)

(72) Inventors: William Harrington, Newtown, CT (US); Robert F. Smith, Waterbury, CT (US); Joseph K. Patterson, Monroe, CT (US); Paul H. Adams, Monroe, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 634 days.

(21) Appl. No.: 16/423,635

(22) Filed: May 28, 2019

(65) Prior Publication Data

US 2019/0365192 A1    Dec. 5, 2019

Related U.S. Application Data

(60) Provisional application No. 62/833,255, filed on Apr. 12, 2019, provisional application No. 62/795,239, (Continued)

(51) Int. Cl.
*A47L 13/58* (2006.01)
*A47L 13/51* (2006.01)
(Continued)

(52) U.S. Cl.
CPC .......... *A47L 13/256* (2013.01); *A46B 5/0041* (2013.01); *A46B 5/0045* (2013.01);
(Continued)

(58) Field of Classification Search
CPC ........... A47L 13/51; A47L 13/58; A47L 13/60
See application file for complete search history.

(56) References Cited

U.S. PATENT DOCUMENTS 395,960 A     1/1889  Drew
1,517,187 A   11/1924 Bonsall
(Continued)

FOREIGN PATENT DOCUMENTS

AU   2014215927 B2   9/2014
BE      1009731 A6   7/1997
(Continued)

OTHER PUBLICATIONS

International Search Report and Written Opinion for International Application No. PCT/US2019/034282 dated Aug. 7, 2019, ISR/WO, dated Aug. 7, 2019, 9 pgs.
(Continued)

*Primary Examiner* — Randall E Chin
(74) *Attorney, Agent, or Firm* — McCarter & English, LLP; Dave S. Christensen; David K. Kincaid

(57) ABSTRACT

A floor cleaning system and a method of cleaning a floor are provided. The cleaning system includes a flat headed mop. The system also includes a frame and at least one compartment removably coupled to the frame. A wringing assembly is fluidly coupled to the at least one compartment, the wringing assembly comprising a fixed extractor element and at least one roller movable from a first position when the mop head is being inserted to a second position when the mop head is being withdrawn.

8 Claims, 52 Drawing Sheets

Related U.S. Application Data filed on Jan. 22, 2019, provisional application No. 62/767,579, filed on Nov. 15, 2018, provisional application No. 62/695,486, filed on Jul. 9, 2018, provisional application No. 62/677,376, filed on May 29, 2018.

(51) Int. Cl.

| | |
|---|---|
| *A47L 13/256* | (2006.01) |
| *F16C 11/04* | (2006.01) |
| *A47L 13/20* | (2006.01) |
| *A47L 13/60* | (2006.01) |
| *A47L 11/40* | (2006.01) |
| *B62B 3/10* | (2006.01) |
| *B65F 1/14* | (2006.01) |
| *A46B 5/00* | (2006.01) |
| *A47L 13/258* | (2006.01) |

(52) U.S. Cl.
CPC .......... *A46B 5/0058* (2013.01); *A46B 5/0083* (2013.01); *A47L 11/4083* (2013.01); *A47L 13/20* (2013.01); *A47L 13/258* (2013.01); *A47L 13/51* (2013.01); *A47L 13/58* (2013.01); *A47L 13/60* (2013.01); *B62B 3/106* (2013.01); *B65F 1/141* (2013.01); *F16C 11/045* (2013.01); *B62B 2207/02* (2013.01)

(56) References Cited

U.S. PATENT DOCUMENTS

| | | |
|---|---|---|
| 1,673,473 A | 6/1928 | Sands |
| 2,286,944 A | 6/1942 | Altland |
| 2,796,617 A | 7/1953 | Bradshaw |
| 2,671,239 A | 3/1954 | Wisner |
| 2,740,146 A | 4/1956 | Vaughn |
| 2,852,794 A | 9/1958 | Blum |
| 2,966,689 A | 1/1961 | Antonucci, Jr. |
| 3,280,418 A | 10/1966 | Schonberger |
| 3,341,876 A | 9/1967 | Campbell |
| D212,831 S | 11/1968 | Koch |
| 4,161,799 A | 7/1979 | Sorrells |
| 4,344,201 A | 8/1982 | Trisolini |
| 4,685,167 A | 8/1987 | Murray |
| 4,704,763 A | 11/1987 | Sacks et al. |
| D296,254 S | 6/1988 | Jaros et al. |
| 4,852,210 A | 8/1989 | Krajicek |
| 4,912,804 A | 4/1990 | Pasbol |
| 5,082,139 A | 1/1992 | Quam |
| 5,094,559 A | 3/1992 | Rivera et al. |
| 5,115,535 A | 5/1992 | Casademunt Ferre et al. |
| 5,131,111 A | 7/1992 | Richardson et al. |
| 5,191,166 A | 3/1993 | Smirlock et al. |
| D338,299 S | 8/1993 | Delmerico et al. |
| 5,274,877 A | 1/1994 | Morad et al. |
| 5,333,353 A | 8/1994 | Taylor |
| 5,414,892 A | 5/1995 | Clark, Jr. |
| 5,419,015 A | 5/1995 | Garcia |
| 5,438,727 A | 8/1995 | Specht |
| 5,440,778 A | 8/1995 | De Guzman |
| D362,941 S | 10/1995 | Delmerico et al. |
| 5,548,865 A | 8/1996 | Pagani |
| D374,321 S | 10/1996 | Mandell et al. |
| 5,774,929 A | 7/1998 | Jurgens et al. |
| D396,914 S | 8/1998 | Pepper et al. |
| 5,836,039 A | 11/1998 | Rimer |
| 5,864,914 A | 2/1999 | Salmon |
| 5,918,343 A | 7/1999 | Young |
| 5,945,193 A | 8/1999 | Pollard et al. |
| D417,051 S | 11/1999 | Dickinson et al. |
| 5,983,441 A | 11/1999 | Williams et al. |
| D426,361 S | 6/2000 | Young |
| 6,115,877 A | 9/2000 | Morad et al. |
| 6,115,878 A | 9/2000 | McLaughlin et al. |
| 6,128,803 A | 10/2000 | Dickinson et al. |
| 6,158,089 A | 12/2000 | Monahan et al. |
| 6,260,226 B1 | 7/2001 | Specht |
| 6,279,195 B1 | 8/2001 | Biggs |
| 6,283,170 B1 | 9/2001 | Robinson |
| 6,354,666 B1 | 3/2002 | Atkins et al. |
| 6,374,867 B1 * | 4/2002 | Maiuro ................ A47J 47/18 141/2 |
| 6,457,203 B1 | 10/2002 | Williams et al. |
| 6,460,230 B2 | 10/2002 | Shimamura et al. |
| 6,487,745 B2 | 12/2002 | Specht |
| 6,543,081 B1 | 4/2003 | Cohen |
| D477,447 S | 7/2003 | Calaicone |
| 6,588,045 B2 | 7/2003 | Fernandez |
| 6,640,348 B1 | 11/2003 | Clune et al. |
| 6,671,923 B2 | 1/2004 | Gromnicki |
| D489,852 S | 5/2004 | Perelli |
| 6,737,147 B2 | 5/2004 | Kennedy et al. |
| 6,810,554 B2 | 11/2004 | McKay |
| 6,886,703 B1 | 5/2005 | Bonner |
| 6,996,873 B2 | 2/2006 | Salmon |
| D525,404 S | 7/2006 | Petner et al. |
| D527,506 S | 8/2006 | Camp, Jr. et al. |
| D528,729 S | 9/2006 | Van Landingham, Jr. |
| D530,870 S | 10/2006 | Lauer |
| D531,368 S | 10/2006 | Lauer |
| D531,772 S | 11/2006 | Lauer |
| D533,705 S | 12/2006 | Bertucci et al. |
| D533,977 S | 12/2006 | Bensussan et al. |
| D536,851 S | 2/2007 | Lauer |
| 7,174,600 B2 | 2/2007 | Kresse et al. |
| D542,494 S | 5/2007 | Lauer et al. |
| D542,992 S | 5/2007 | Lauer |
| D546,012 S | 7/2007 | Casteel et al. |
| D548,913 S | 8/2007 | Van Landingham, Jr. |
| 7,254,863 B1 | 8/2007 | Morad |
| D550,418 S | 9/2007 | Weaver et al. |
| 7,293,317 B2 | 11/2007 | Tsuchiya et al. |
| D578,263 S | 10/2008 | Pho |
| 7,516,508 B2 | 4/2009 | Stackpole, Jr. et al. |
| 7,536,743 B2 | 5/2009 | Goh et al. |
| 7,607,191 B2 | 10/2009 | Morris et al. |
| D611,215 S | 3/2010 | Miller et al. |
| D616,168 S | 5/2010 | Libman et al. |
| 7,827,649 B2 | 11/2010 | Horian |
| 7,946,445 B2 | 5/2011 | Tytar |
| D641,116 S | 7/2011 | Jones et al. |
| D643,982 S | 8/2011 | Franklin |
| 8,056,178 B2 | 11/2011 | Bar-Noy et al. |
| 8,099,824 B2 | 1/2012 | Dingert et al. |
| D653,826 S | 2/2012 | Lee |
| 8,381,931 B1 | 2/2013 | Ernest, III |
| 8,393,047 B2 | 3/2013 | Van Landingham, Jr. et al. |
| 8,419,024 B1 | 4/2013 | Arroyo-Ferrer |
| 8,474,089 B2 | 7/2013 | Goentzel |
| 8,479,352 B2 | 7/2013 | Rivadulla Oliva |
| 8,544,141 B1 | 10/2013 | Kyde et al. |
| 8,567,616 B2 | 10/2013 | Mishan et al. |
| 8,584,300 B2 | 11/2013 | Weis |
| 8,652,263 B2 | 2/2014 | Goentzel |
| 8,701,238 B1 | 4/2014 | Morad et al. |
| 8,771,428 B2 | 7/2014 | Goentzel |
| 8,990,998 B1 | 3/2015 | McBride, Jr. et al. |
| 9,161,673 B2 | 10/2015 | Tronconi et al. |
| 9,216,751 B2 | 12/2015 | Adams et al. |
| 9,433,335 B2 | 9/2016 | Nolan et al. |
| 9,504,366 B2 | 11/2016 | Kasper et al. |
| D782,767 S | 3/2017 | Kearney |
| 9,713,412 B2 | 7/2017 | Maurer |
| D809,727 S | 2/2018 | Bensussan et al. |
| 9,932,056 B2 | 4/2018 | Eisenhut et al. |
| 9,943,207 B1 | 4/2018 | Patterson |
| 10,743,737 B1 | 8/2020 | Parrott |
| 10,858,139 B2 | 12/2020 | Eason |
| D923,896 S | 6/2021 | Harrington et al. |
| 11,064,842 B2 | 7/2021 | McDonald |
| D933,325 S | 10/2021 | Harrington et al. |
| D955,075 S | 6/2022 | Harrington et al. |
| D962,575 S | 8/2022 | Harrington et al. |

(56) References Cited

U.S. PATENT DOCUMENTS

| | | | |
|---|---|---|---|
| 2002/0073502 | A1 | 6/2002 | Gromnicki |
| 2002/0120997 | A1 | 9/2002 | Alt |
| 2003/0019954 | A1 | 1/2003 | Clarke |
| 2003/0121530 | A1 | 7/2003 | Borgonjon et al. |
| 2004/0019998 | A1 | 2/2004 | Sander |
| 2004/0074520 | A1 | 4/2004 | Truong et al. |
| 2004/0128786 | A1 | 7/2004 | Policicchio et al. |
| 2004/0139585 | A1 | 7/2004 | McVicker |
| 2004/0231700 | A1 | 11/2004 | Bell et al. |
| 2005/0086760 | A1 | 4/2005 | Young |
| 2005/0086980 | A1 | 4/2005 | Young |
| 2005/0100403 | A1 | 5/2005 | Kruepke |
| 2005/0115098 | A1 | 6/2005 | Rust et al. |
| 2005/0229352 | A1* | 10/2005 | LeCompte ............ A47L 13/58 15/260 |
| 2006/0048330 | A1 | 3/2006 | Rust et al. |
| 2006/0070202 | A1 | 4/2006 | Auer et al. |
| 2006/0151054 | A1 | 7/2006 | Deaton |
| 2006/0213021 | A1* | 9/2006 | Ducharme ............ A47L 13/58 15/264 |
| 2006/0272115 | A1 | 12/2006 | Kacher et al. |
| 2007/0026181 | A1 | 2/2007 | Roberts |
| 2007/0061985 | A1 | 3/2007 | Fischer |
| 2007/0074365 | A1 | 4/2007 | Erdman et al. |
| 2007/0107155 | A1 | 5/2007 | Kacher et al. |
| 2007/0134465 | A1 | 6/2007 | Vanbenschoten et al. |
| 2007/0266518 | A1 | 11/2007 | Hoyle et al. |
| 2007/0289084 | A1 | 12/2007 | Damrath et al. |
| 2008/0006640 | A1 | 1/2008 | Natale |
| 2008/0141477 | A1 | 6/2008 | Damrath et al. |
| 2008/0155775 | A1 | 7/2008 | Damrath et al. |
| 2009/0007351 | A1 | 1/2009 | Horian |
| 2009/0035507 | A1 | 2/2009 | Kurtz, Jr. |
| 2009/0035509 | A1 | 2/2009 | Kurtz, Jr. |
| 2010/0050363 | A1 | 3/2010 | Young |
| 2011/0010900 | A1 | 1/2011 | Gilardi |
| 2011/0099745 | A1 | 5/2011 | Van Landingham, Jr. et al. |
| 2011/0203613 | A1 | 8/2011 | Roberts |
| 2012/0042462 | A1 | 2/2012 | Milanese et al. |
| 2012/0096668 | A1 | 4/2012 | Treacy |
| 2012/0110774 | A1* | 5/2012 | Matola ............ A47L 13/60 15/262 |
| 2012/0145189 | A1 | 6/2012 | Knopow et al. |
| 2012/0151703 | A1 | 6/2012 | Chow |
| 2013/0312211 | A1 | 11/2013 | Matola |
| 2014/0215739 | A1 | 8/2014 | Lindner et al. |
| 2014/0263105 | A1 | 9/2014 | Kontorovich et al. |
| 2014/0289985 | A1 | 10/2014 | Hoying et al. |
| 2015/0201821 | A1 | 7/2015 | McBride, Jr. et al. |
| 2015/0305590 | A1 | 10/2015 | Rashid |
| 2015/0351603 | A1 | 12/2015 | Katsnelson |
| 2016/0068176 | A1 | 3/2016 | Adams et al. |
| 2016/0113471 | A1 | 4/2016 | Zhu et al. |
| 2016/0128540 | A1 | 5/2016 | Hoying et al. |
| 2016/0309980 | A1 | 10/2016 | Lecompte et al. |
| 2016/0316988 | A1 | 11/2016 | Balz et al. |
| 2017/0027403 | A1 | 2/2017 | Zhu |
| 2017/0049292 | A1 | 2/2017 | Harrington et al. |
| 2017/0086637 | A1 | 3/2017 | Zhu et al. |
| 2017/0231457 | A1 | 8/2017 | Cloud |
| 2017/0369342 | A1 | 12/2017 | Hom et al. |
| 2018/0035862 | A1 | 2/2018 | Polti et al. |
| 2018/0055327 | A1 | 3/2018 | Li |
| 2018/0199788 | A1 | 7/2018 | Huang |
| 2019/0365186 | A1 | 12/2019 | Buckley et al. |
| 2019/0365193 | A1 | 12/2019 | Smith et al. |
| 2021/0177229 | A1 | 6/2021 | Smith et al. |

FOREIGN PATENT DOCUMENTS

| | | |
|---|---|---|
| CA | 1306592 C | 8/1992 |
| CA | 2993591 A1 | 12/2017 |
| CN | 2081281 U | 7/1991 |
| CN | 200987655 Y | 12/2007 |
| CN | 201227258 Y | 4/2009 |
| CN | 201227259 Y | 4/2009 |
| CN | 201384477 Y | 1/2010 |
| CN | 101843468 A | 9/2010 |
| CN | 201675888 U | 12/2010 |
| CN | 202211661 U | 5/2012 |
| CN | 202313166 U | 7/2012 |
| CN | 102711578 A | 10/2012 |
| CN | 102846284 A | 1/2013 |
| CN | 202821248 U | 3/2013 |
| CN | 203029178 U | 7/2013 |
| CN | 103445735 A | 12/2013 |
| CN | 204146974 U | 2/2015 |
| CN | 104853664 A | 8/2015 |
| CN | 204744046 U | 11/2015 |
| CN | 204889883 U | 12/2015 |
| CN | 105286740 A | 2/2016 |
| CN | 107456180 A | 2/2016 |
| CN | 105640460 A | 6/2016 |
| CN | 105769071 A | 7/2016 |
| CN | 205391076 U | 7/2016 |
| CN | 205493747 U | 8/2016 |
| CN | 105996932 A | 10/2016 |
| CN | 205625834 U | 10/2016 |
| CN | 205697619 U | 11/2016 |
| CN | 205729277 U | 11/2016 |
| CN | 205831737 U | 12/2016 |
| CN | 205866707 U | 1/2017 |
| CN | 206080445 U | 4/2017 |
| CN | 206080446 U | 4/2017 |
| CN | 106725163 A | 5/2017 |
| CN | 106725164 A | 5/2017 |
| CN | 206151396 U | 5/2017 |
| CN | 206183214 U | 5/2017 |
| CN | 206381142 U | 8/2017 |
| CN | 107115077 A | 9/2017 |
| CN | 206548456 U | 10/2017 |
| CN | 107456178 A | 12/2017 |
| CN | 107456179 A | 12/2017 |
| CN | 107456181 A | 12/2017 |
| CN | 107456184 A | 12/2017 |
| CN | 107456185 A | 12/2017 |
| CN | 107495914 A | 12/2017 |
| CN | 107518843 A | 12/2017 |
| CN | 206761652 U | 12/2017 |
| CN | 107684406 A | 2/2018 |
| CN | 107684407 A | 2/2018 |
| CN | 107692938 A | 2/2018 |
| CN | 107811591 A | 3/2018 |
| CN | 207152550 U | 3/2018 |
| CN | 207186587 U | 4/2018 |
| CN | 207202839 U | 4/2018 |
| DE | 382754 A | 10/1923 |
| DE | 4318792 A1 | 12/1994 |
| DE | 19635620 A1 | 3/1998 |
| DE | 10065373 A1 | 7/2002 |
| DE | 102016118256 B3 | 1/2018 |
| EP | 0991355 A1 | 4/2000 |
| EP | 1219226 A1 | 7/2002 |
| EP | 2033565 A2 | 3/2009 |
| EP | 1219224 B1 | 3/2010 |
| EP | 2769660 A1 | 8/2014 |
| EP | 2848178 A2 | 3/2015 |
| FR | 3058627 A1 | 5/2018 |
| GB | 379946 A | 9/1932 |
| GB | 396469 A | 8/1933 |
| GB | 932579 A | 7/1963 |
| GB | 1168635 A | 10/1969 |
| GB | 1277932 A | 6/1972 |
| JP | H10304998 A | 11/1998 |
| JP | 2014030815 A | 2/2014 |
| KR | 485755 Y1 | 2/2018 |
| KR | 2018025263 | 3/2018 |
| WO | 199210968 A1 | 7/1992 |
| WO | 2000/001328 A1 | 1/2000 |
| WO | 200200089 A1 | 1/2002 |
| WO | 2004080265 A2 | 9/2004 |
| WO | 2005013794 A1 | 2/2005 |
| WO | 2006027383 A1 | 3/2006 |

(56) References Cited

FOREIGN PATENT DOCUMENTS

| WO | 1651089 | A1 | 5/2006 |
|----|---------|----|--------|
| WO | 2006/074687 | A1 | 7/2006 |
| WO | 2007/046211 | A1 | 4/2007 |
| WO | 2015090356 | A1 | 6/2015 |
| WO | 2016116067 | A1 | 7/2016 |
| WO | 2017193609 | A1 | 11/2017 |
| WO | 2017206511 | A1 | 12/2017 |
| WO | 2018024160 | A1 | 2/2018 |
| WO | 2018040920 | A1 | 3/2018 |

OTHER PUBLICATIONS

Partial Supplementary European Search Report for Application No. 19810953.0 dated Mar. 11, 2022; 9 pg.
European Search Report for Application No. 19810956.3 dated Feb. 10, 2022.
Extended European Search Report for Application No. 19810211.3 dated Mar. 14, 2022; 6 pgs.
Extended European Search Report for Application No. 19811600.6 dated Mar. 16, 2022 ; 6 pgs.
European Search Report dated Mar. 14, 2022; 6 pgs.
Ecsupplies.com Unger® OmniClean Dual Bucket Kit—Black/Blue, 2023. <https://www.ecsupplies.com/p/UNG-CLBK1/Unger-OmniClean-Dual-Bucket-Kit-Black-Blue/>.
webstaurantstore.com Rubbermaid FGQ050000000 Blue Microfiber Floor Finishing System, 2023. <https://www.webstaurantstore.com/rubbermaid-fgq050000000-blue-microfiber-floor-finishing-system/690FGQ050000.html>.
International Search Report and Written Opinion for Application No. PCT/US2020/063749, dated Mar. 11, 2021, 8 pages.

\* cited by examiner

FLOOR CLEANING SYSTEM

CROSS REFERENCE TO RELATED APPLICATIONS

The present application is a nonprovisional application and claims the benefit of U.S. Provisional Application Ser. No. 62/833,255 filed Apr. 12, 2019, U.S. Provisional Application Ser. No. 62/677,376 filed on May 29, 2018, U.S. Provisional Application Ser. No. 62/695,486 filed on Jul. 9, 2018, U.S. Provisional Application Ser. No. 62/767,579 filed on Nov. 15, 2018, and U.S. Provisional Application Ser. No. 62/795,239 filed on Jan. 22, 2019, the contents of all of which are incorporated by reference herein in their entirety

BACKGROUND

The subject matter disclosed herein relates to a system for cleaning a floor, and in particular to a system having a multi-compartment bucket with a fluid extraction device for removing dirty or clean fluid from a flat mop.

Mops have been traditionally used to clean floors. Mops come in different styles, such as a string, strip, foam or flat mop for example. A flat mop has a generally planar end member with a flat microfiber pad coupled to one side. Further, one property of the microfiber pad is that it releases dirt when placed in a fluid (e.g. fluid). The microfiber pad is then wrung-out, such as by pressing the mop head against a plate. One issue with many mop and bucket combinations it that the same fluid is used to both clean and recharge the mop. However, this means that the fluid used for recharging is dirty after the first time the mop is cleaned. Thus, after only a short while the user is left with a bucket of dirty fluid. If the fluid in this bucket is continued to be used, dirty fluid will be spread on the floor being cleaned.

A second issue that arises with current flat mops is the amount of fluid contained in the microfiber pad. Depending on the type of floor being cleaned, the desired amount of fluid will change. For example, when cleaning wood floors, it is desired to have only a small amount of fluid when compared to cleaning tile floors. The technique of pressing the mop against a plate or in a press requires significant effort.

Accordingly, while existing floor cleaning systems are suitable for their intended purposes the need for improvement remains, particularly in providing a floor cleaning system having the features described herein.

BRIEF DESCRIPTION

According to one aspect of the disclosure, a floor cleaning system having a flat headed mop is provided. The system includes a frame having a first portion and a second portion. At least one compartment removably coupled to the first portion a wringing assembly coupled to the frame. Wherein at least one of the frame or the wringing assembly includes at least one clip holder configured to receive at least one accessory item.

In addition to one or more of the features described herein, or as an alternative, further embodiments of the system may include at least one accessory holder coupled to the at least one clip holder, wherein the accessory holder includes at least one of a bottle holder, a toilet bowl brush holder, or a dust pan holder. In addition to one or more of the features described herein, or as an alternative, further embodiments of the system may include the at least one accessory holder being disposed vertically above the second portion. In addition to one or more of the features described herein, or as an alternative, further embodiments of the system may include the at least one accessory item having at least one of a storage bin, caddy, a garbage bin, or a storage container.

In addition to one or more of the features described herein, or as an alternative, further embodiments of the system may include a garbage bin removably coupled to the wringing assembly. In addition to one or more of the features described herein, or as an alternative, further embodiments of the system may include the garbage bin having a u-shaped handle coupled to the wringing assembly.

In accordance with another embodiment a floor cleaning system having a flat headed mop is provided. The system including a frame having a first portion and a second portion. At least one compartment is removably coupled to the first portion. A wringing assembly is fluidly coupled to the at least one compartment and disposed between the first portion and the second portion. A post extends from the wringing assembly. A handle is coupled to the end of the post.

In addition to one or more of the features described herein, or as an alternative, further embodiments of the system may include the post being rotatable from a first position with the handle positioned at least partially over the wringing assembly to a second position. In addition to one or more of the features described herein, or as an alternative, further embodiments of the system may include the post having a first portion and a second portion, the first portion being coupled to the wringing assembly, the second portion being offset from the first portion. In addition to one or more of the features described herein, or as an alternative, further embodiments of the system may include the being extendable from a first length to a second length.

In addition to one or more of the features described herein, or as an alternative, further embodiments of the system may include the handle being comprised of a c-shaped member. In addition to one or more of the features described herein, or as an alternative, further embodiments of the system may include the handle being comprised of a cross-member having a first c-shaped portion and a second c-shaped portion.

According to another embodiment, a floor cleaning system having a flat headed mop is provided. The system having at least one compartment. A wringing assembly is fluidly coupled to the at least one compartment, the wringing assembly having a housing with a slot, the slot being defined by a first wall, a second wall and a pair of side walls, the second wall extends vertically farther from the at least one compartment than the first wall.

In addition to one or more of the features described herein, or as an alternative, further embodiments of the system may include the pair of sidewalls extending vertically farther from the at least one compartment than the first wall. In addition to one or more of the features described herein, or as an alternative, further embodiments of the system may include the wringer assembly further having at least one roller disposed at least partially within the slot and operably coupled to the housing to move from a first position to a second position when the flat headed mop is withdrawn from the slot. In addition to one or more of the features described herein, or as an alternative, further embodiments of the system may include a blade disposed within the slot opposite the at least one roller.

According to another embodiment, a floor cleaning system having a flat headed mop is provided. The system including a frame and at least one compartment removably coupled to the frame, the at least one compartment having a length and a width. A member is disposed within the at least one compartment, the member having a plurality of walls spaced apart from each other along the length of the at least one compartment. A wringing assembly is fluidly coupled to the at least one compartment, the wringing assembly having a housing with a slot sized to receive the flat headed mop and configured to extract fluid therefrom.

In addition to one or more of the features described herein, or as an alternative, further embodiments of the system may include the member having a scrubbing plate portion. In addition to one or more of the features described herein, or as an alternative, further embodiments of the system may include the member having a first wall and a second wall extending along the length of the at least one compartment, the second wall having a relief area sized to receive the handle of the flat headed mop. In addition to one or more of the features described herein, or as an alternative, further embodiments of the system may include the plurality of walls being parallel to the width of the at least one compartment.

In accordance with another embodiment, a floor cleaning system having a flat headed mop is provided. The system including a frame and at least one compartment removably coupled to the frame. A wringing assembly is coupled to the frame, the wringing assembly comprising: a housing with a slot sized to receive the flat headed mop; an extractor element disposed within the slot and configured to extract fluid from the flat headed mop; and a drip tray disposed in fluid communication with the slot and the extractor element, the drip tray including at least one channel that at least partially defines a flow path from the slot to an outlet, the outlet being in fluid communication with the at least one compartment.

In addition to one or more of the features described herein, or as an alternative, further embodiments of the system may include the at least one channel having a first channel and a second channel arranged on opposite sides of the outlet. In addition to one or more of the features described herein, or as an alternative, further embodiments of the system may include the drip tray having a surface that at least partially defines the outlet, the surface having at least one rib, the rib sized to space a mop head of the flat headed mop apart from a bottom of the at least one channel when the mop head is fully inserted into the wringing assembly.

According to another embodiment, a floor cleaning system having a flat headed mop is provided. The system including a frame and at least one compartment removably coupled to the frame, the at least one compartment having pair of sidewalls disposed on an angle relative to each other, the sidewalls defining a hollow interior with an open end that is sized to receive a mop head of the flat headed mop. A wringing assembly is fluidly coupled to the at least one compartment, the wringing assembly having a housing with a slot sized to receive the flat headed mop and configured to extract fluid therefrom.

In addition to one or more of the features described herein, or as an alternative, further embodiments of the system may include the sidewalls at a first end are adjacent the open end are father apart than a second end distal from the open end. In addition to one or more of the features described herein, or as an alternative, further embodiments of the system may include at least one of the side walls having indicia indicating a volume of the hollow interior. In addition to one or more of the features described herein, or as an alternative, further embodiments of the system may include the at least one compartment having a length and a width, the at least one compartment further including an element disposed on one side along the length, the element being sized and positioned engage the frame and prevent insertion of the at least one compartment onto the frame, when the side is facing the wringing assembly.

In addition to one or more of the features described herein, or as an alternative, further embodiments of the system may include the at least one compartment further comprises an insert disposed in the hollow interior, wherein the element is coupled to the insert. In addition to one or more of the features described herein, or as an alternative, further embodiments of the system may include the insert having a scrubbing plate portion, the element being adjacent the scrubbing plate portion. In addition to one or more of the features described herein, or as an alternative, further embodiments of the system may include the insert having a wall having a relief portion sized to receive a handle of the flat headed mop, the relief portion being adjacent the element.

Technical effects of embodiments of the present disclosure include a floor cleaning system that allows a floor to be cleaned or mopped while reducing or eliminating the spreading of contaminated or dirty fluid.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
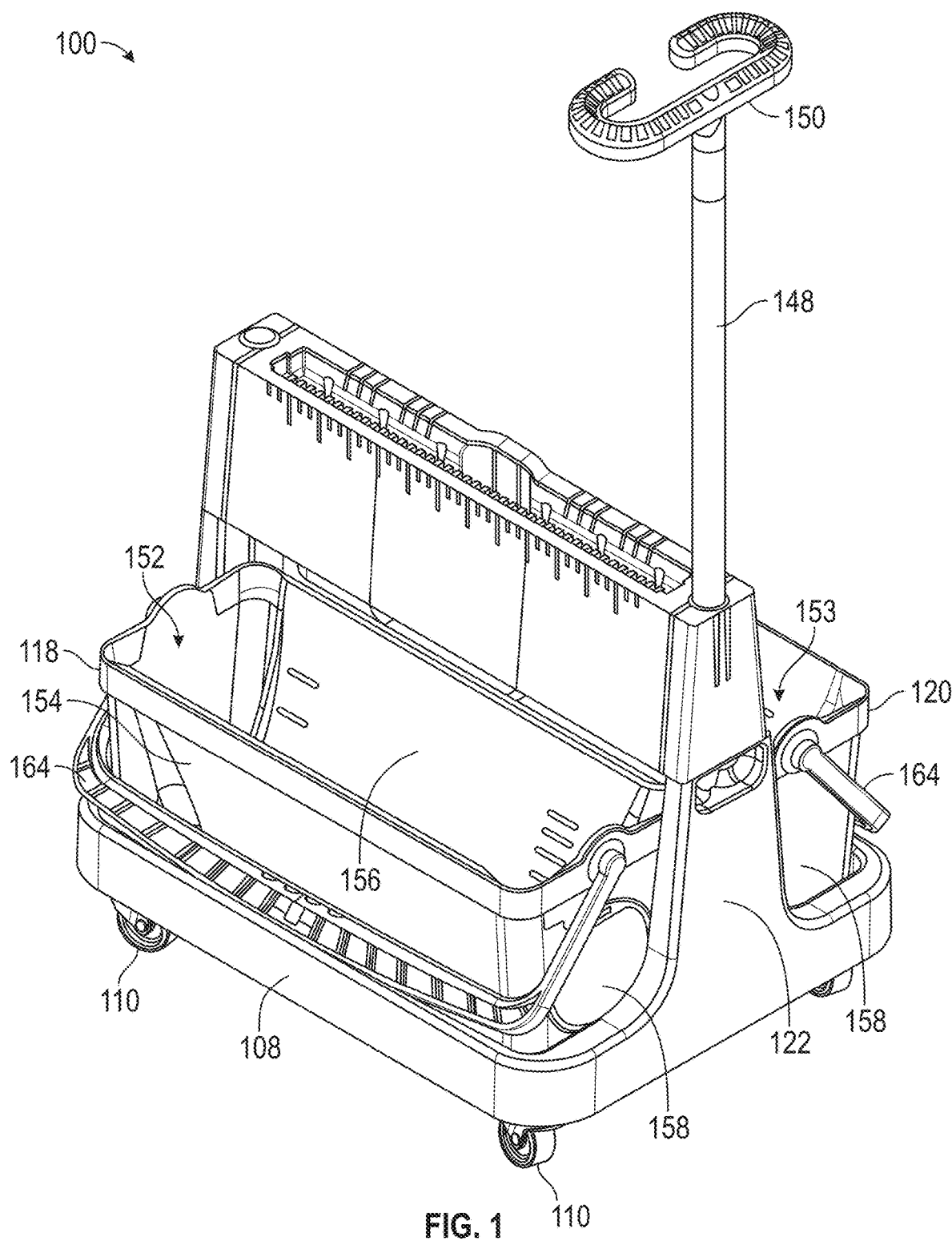
FIG. 1 is a perspective view of a two-compartment bucket assembly for a floor cleaning system in accordance with an embodiment.

The detailed description explains embodiments of the disclosure, together with advantages and features, by way of example with reference to the drawings.

DETAILED DESCRIPTION

Embodiments disclosed herein provide for a floor cleaning system having a flat mop with a microfiber pad and a bucket cleaning assembly. The bucket cleaning assembly includes a one or more compartments and provides advantages in separating the dirty fluid used to rinse the flat mop from the clean fluid used to recharge the mop pad. Embodiments disclosed herein provide advantages in providing a wringing assembly that removes dirty fluid from the mop pad. Still further embodiments disclosed herein provide advantages in providing a wringing assembly that defines a desired amount of fluid in the mop pad when the mop pad is recharged (based on number of times mop is wrung). Still further embodiments provide for a bucket cleaning assembly configured to receive accessories, such as cleaning fluid containers and receptacles. Still further embodiments provide for a bucket cleaning assembly that may be integrated into a larger cleaning system to facilitate transportation.

As discussed herein, it should be appreciated that previous floor cleaning systems do not clean as well as desired, add unnecessary time, and/or complexity to the process of cleaning a floor. These solutions either result in dirty fluid being spread on the surface resulting in floors that are not as clean. Further, they may increase the time and the number of steps used to clean and recharge the mop. Embodiments disclosed herein reduce the number of steps required for cleaning, which in turn reduces the time and complexity to clean the floor. In some embodiments, the time is also reduced as the end user does not need to go through the wringing process as often as prior art system.

Referring now to FIGS. 1-11, an embodiment of a bucket assembly 100 is shown for a floor cleaning system. The bucket assembly 100 is used with a flat headed mop 102, such as that shown in FIG. 32 and FIG. 33 for example, having a microfiber pad disposed thereon. The mop 102 has a head 104 positioning assembly that allows the planar head 104 of the mop 102 to rotate between a vertical or a horizontal position. The mop 102 may be connected to the planar head 104 by a hinge assembly such as that described in commonly owned U.S. Provisional Applications 62/677, 376, 62/695,486, 62/767,579, 62/795,239, each entitled "Floor Cleaning System" the contents of which are incorporated herein by reference. The mop 102 may further be that described in commonly owned and concurrently filed United States patent application entitled "Flat Headed Mop" (Attorney Docket UMI0007US6), the contents of which is incorporated by reference herein. The mop 102 will include a mop pad (not shown) that is removably coupled to the planar head. In an embodiment, the mop pad and the planar head are coupled by a hook and loop type fastener. When in the normal position, the planar head is generally parallel with the floor or surface that is being cleaned with the pole extending upward therefrom. As used herein, the term "vertical position" is where the mop head 102 is rotated to the position shown in FIG. 33 where the planar bottom surface head member 218 is generally or substantially parallel to the centerline of the mop handle 106. As used herein, the term "operating position" or "horizontal position" is where the mop head 104 is rotated to the position shown in FIG. 32 where the planar bottom surface the head member 104 is generally perpendicular, or on an angle relative to the centerline of the mop handle 106. It should be appreciated that while embodiments described herein may illustrate the mop head 104 rotated to the vertical or horizontal position, this for exemplary purposes and the claims should not be so limited.

The bucket assembly 100 includes a trolley 108 having a plurality of wheels 110. It should be appreciated that the wheels 110 allow the bucket assembly 100 to be easily moved across the floor. In the embodiment of FIGS. 1-11, the trolley 108 includes a pair of recesses 112 (FIG. 9) disposed on opposite sides of a center wall 114. The recesses 112 are further defined by sidewalls 116. The recesses 112 are sized to removably receive compartments 118, 120 as will be discussed in more detail herein. The trolley 108 further includes a pair of upstanding posts or end walls 122, 124 on either end of the center wall 114. The end walls 122, 124 are configured couple with a drain tray 126 that is positioned adjacent to and vertically above the center wall 114. As will be discussed in more detail herein, the drain tray receives extracted fluid from a wringing assembly 128 and defines a flow path into the first compartment 118, sometimes referred to as the "dirty fluid" compartment. As used herein, the fluid may be water, a chemical cleaning solution or a combination of the foregoing. The compartments 118, 120 may both include a fluid that is comprised of water, a cleaning solution or a combination of the foregoing.

In an embodiment, the drain tray 126 includes a plurality of walls 127a, 127b, 127c (FIG. 10) that define a pair of opposing channels 129a, 129b. The channels 129a, 129b direct the extracted fluid towards the center of the drain tray where an outlet 141 extends over the first compartment 118 to allow the extracted fluid to drained into the first compartment. In an embodiment, the outlet is at least partially defined by a surface 143. In an embodiment, the surface 143 may include at least one rib 145 that extends from the surface 143. The rib 145 being sized to engage the mop head 104 when the mop head 104 is fully inserted into the wringing assembly 128, such that the mop head 104 is spaced apart from the bottom of the channels 129a, 129b. Thus the rib 145 prevents or reduces the risk of the mop pad being in contact with fluids draining through the channels 129a, 129b.

In an embodiment, the end walls 122, 124 each include a recess 125. The recess 125 may be sized to receive a user's fingers and provide a location for the user to lift the bucket assembly 100.

Figure 2:
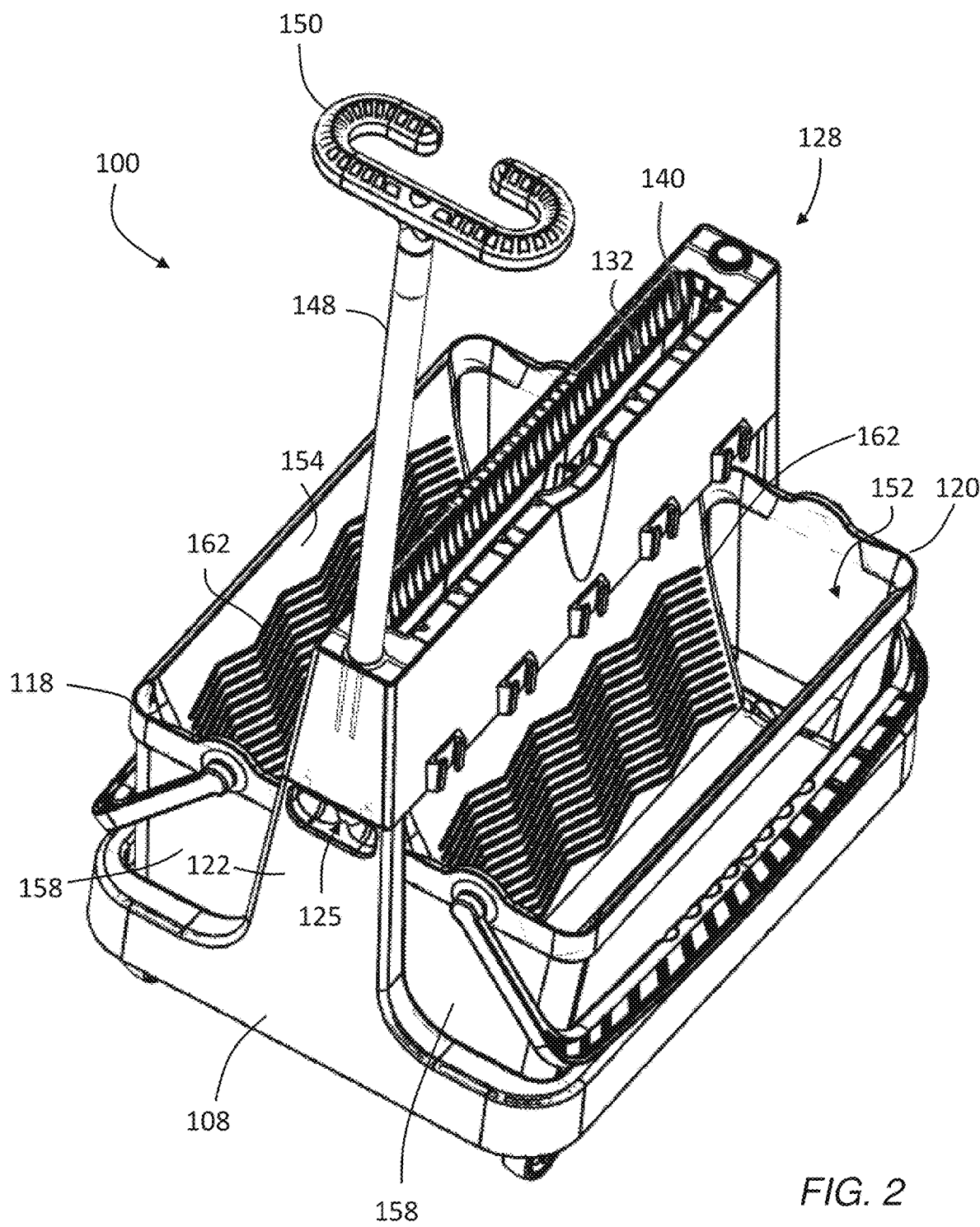
FIG. 2 is another perspective view of the bucket assembly of FIG. 1.
Figure 3:
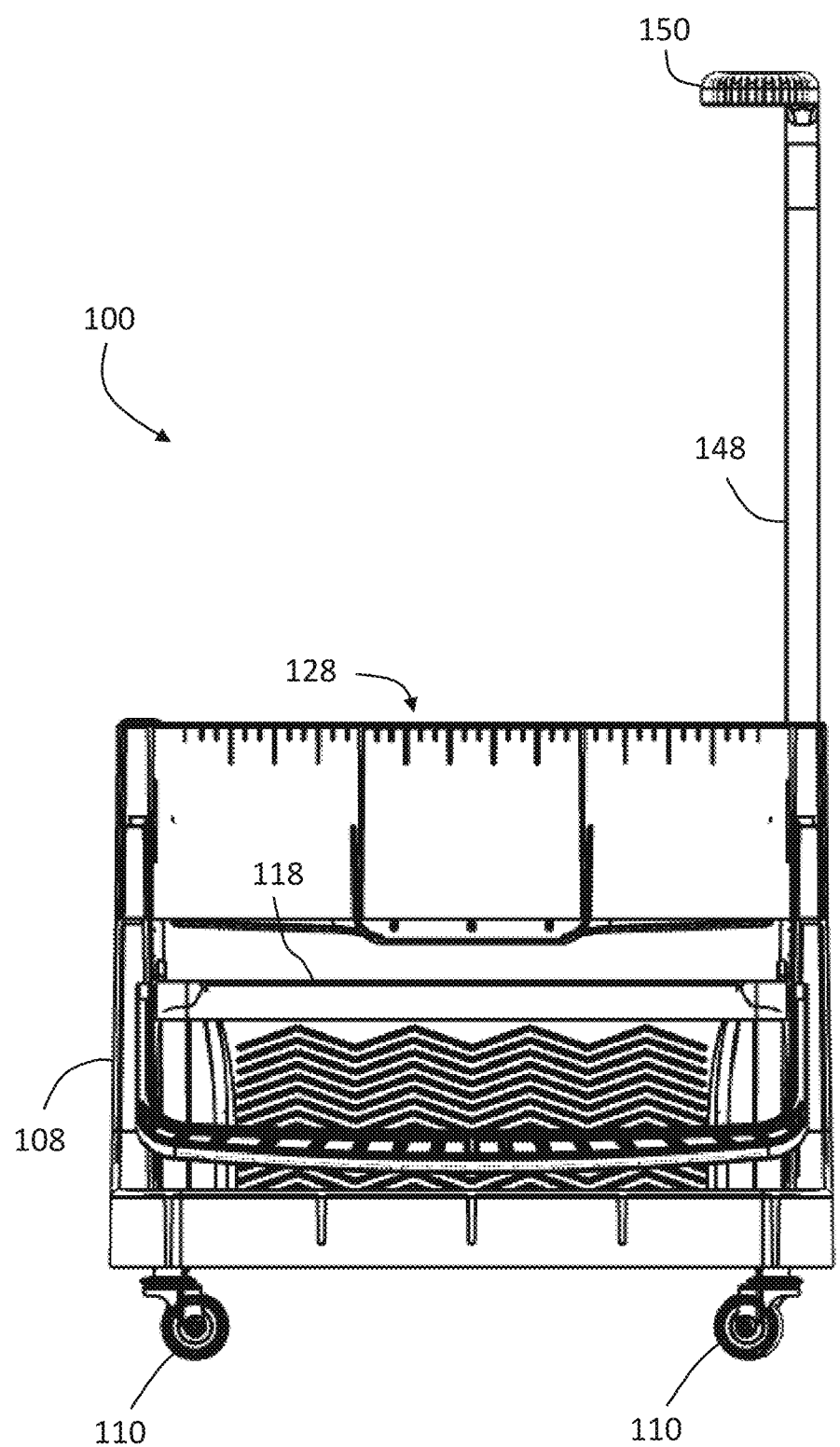
FIG. 3 is first side view of the bucket assembly of FIG. 1.
Figure 4:
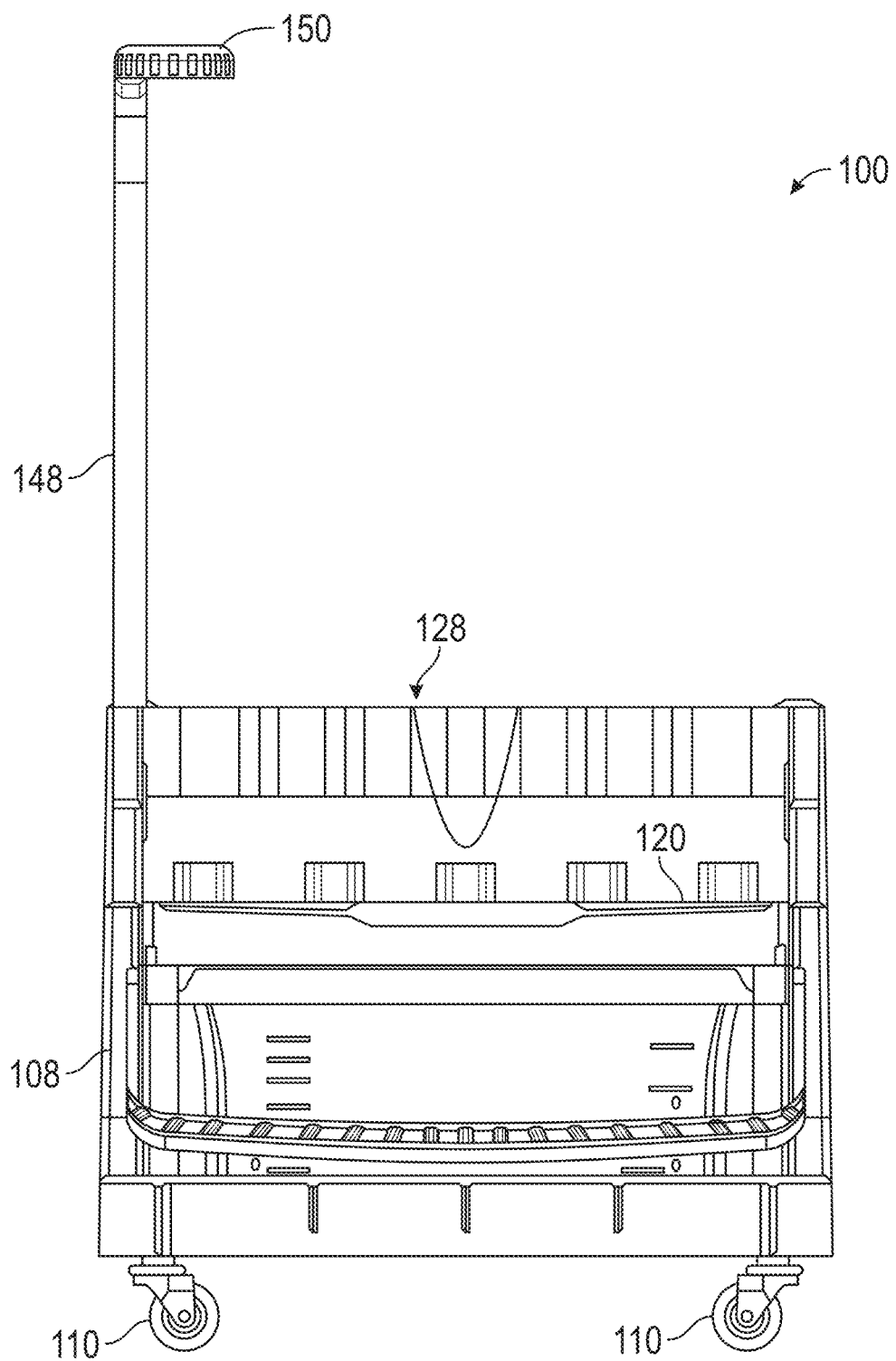
FIG. 4 is a second side view of the bucket assembly of FIG. 1.
Figure 5:
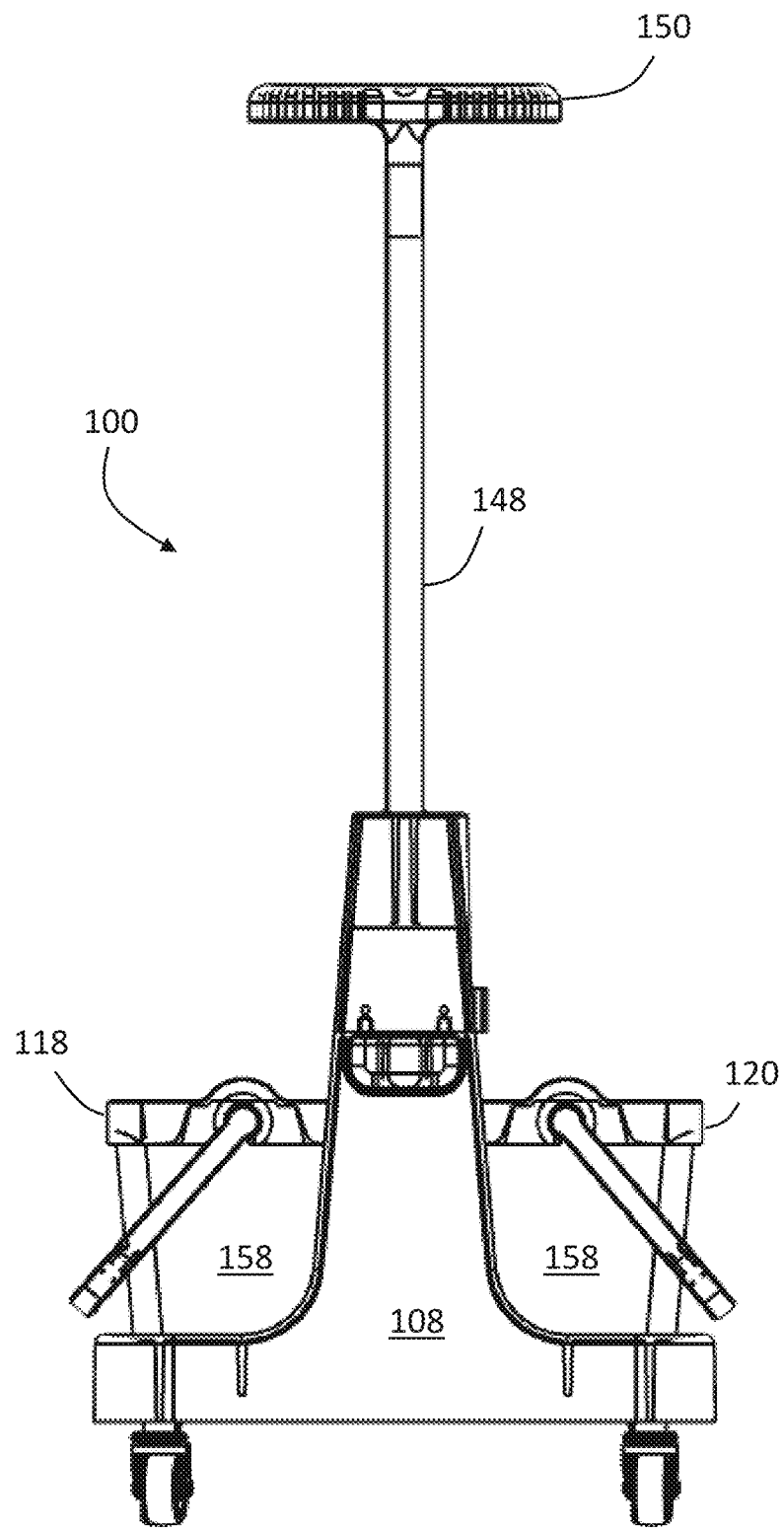
FIG. 5 is a first end view of the bucket assembly of FIG. 1.
Figure 6:
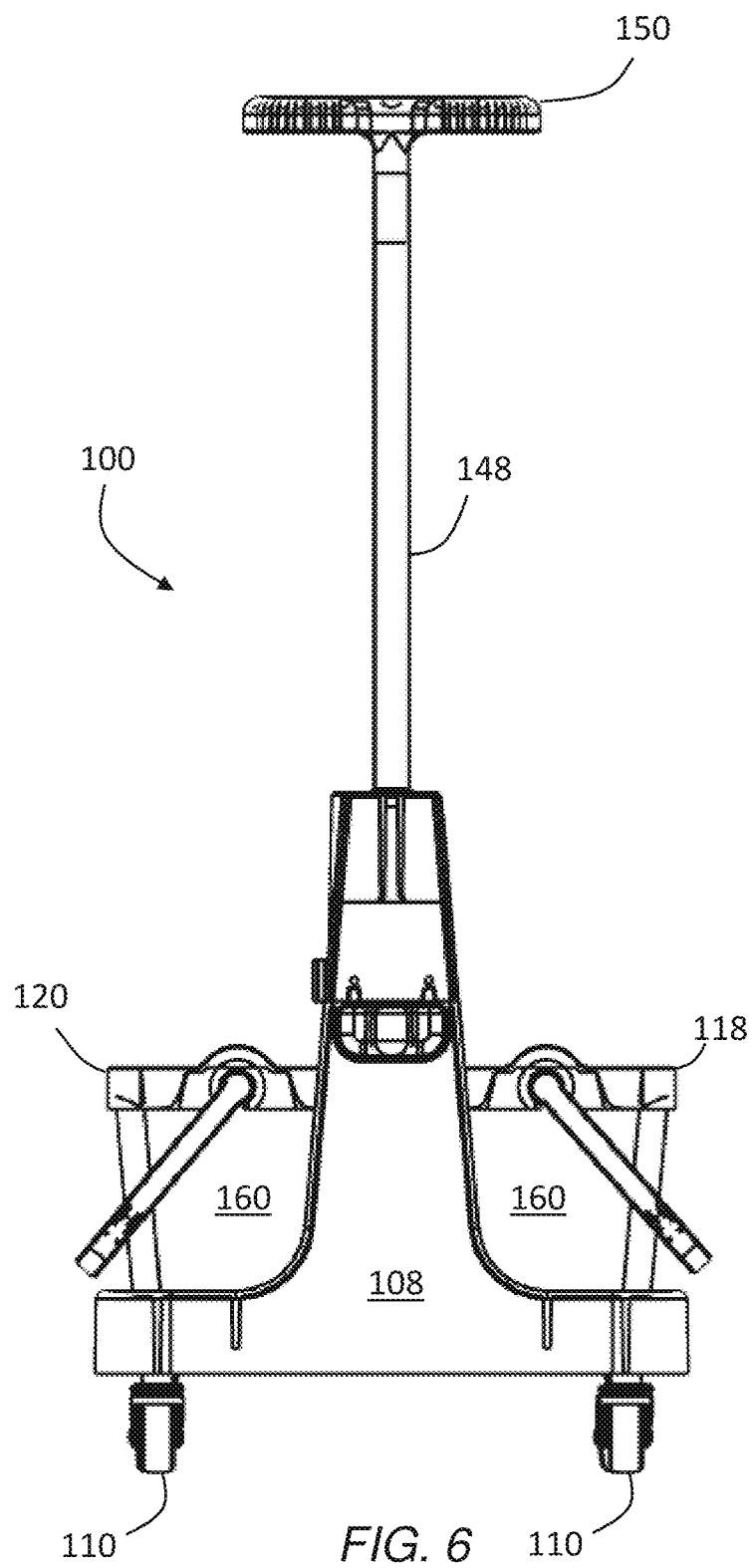
FIG. 6 is a second end view of the bucket assembly of FIG. 1.
Figure 7:
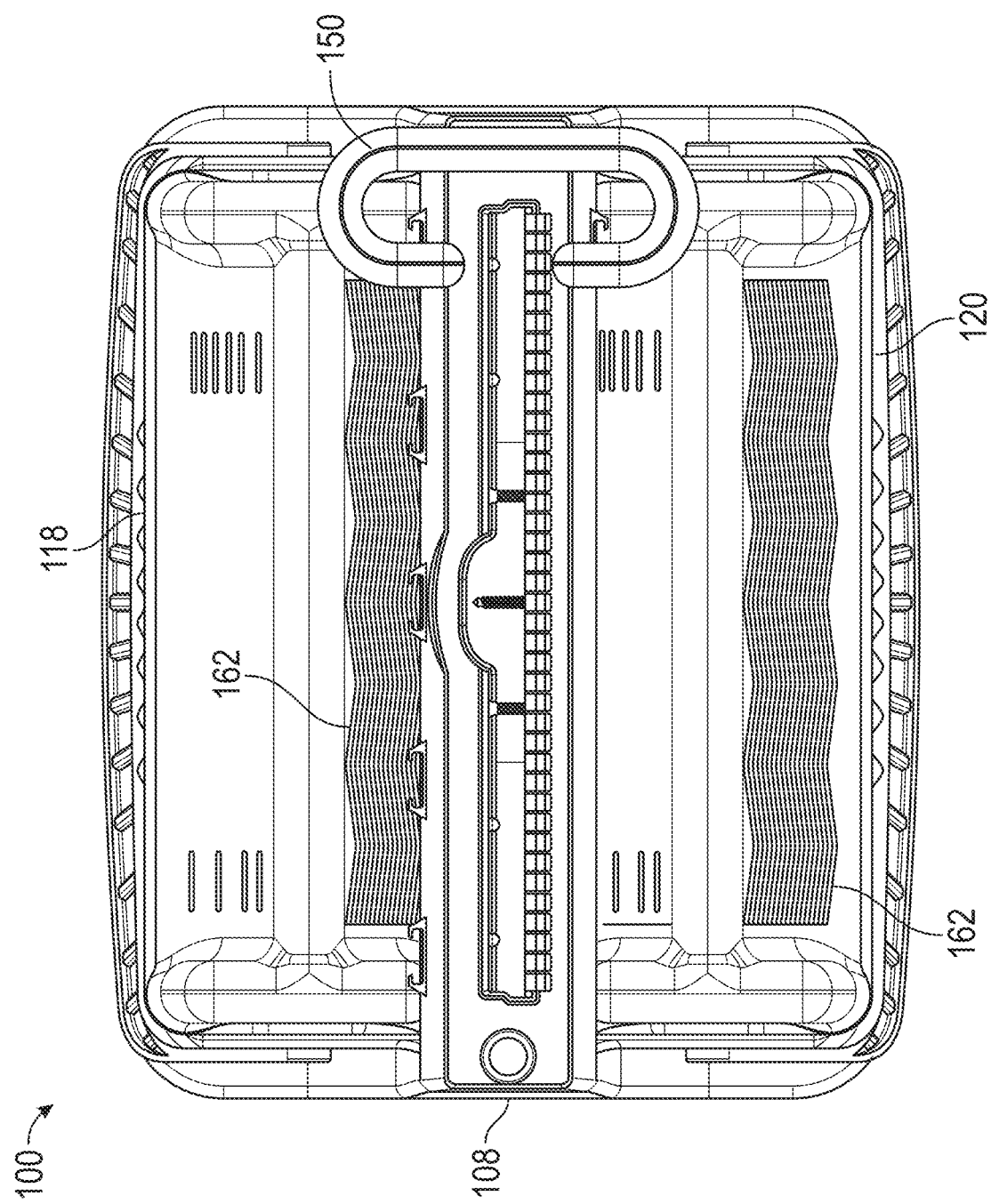
FIG. 7 is a top view of the bucket assembly of FIG. 1.
Figure 8:
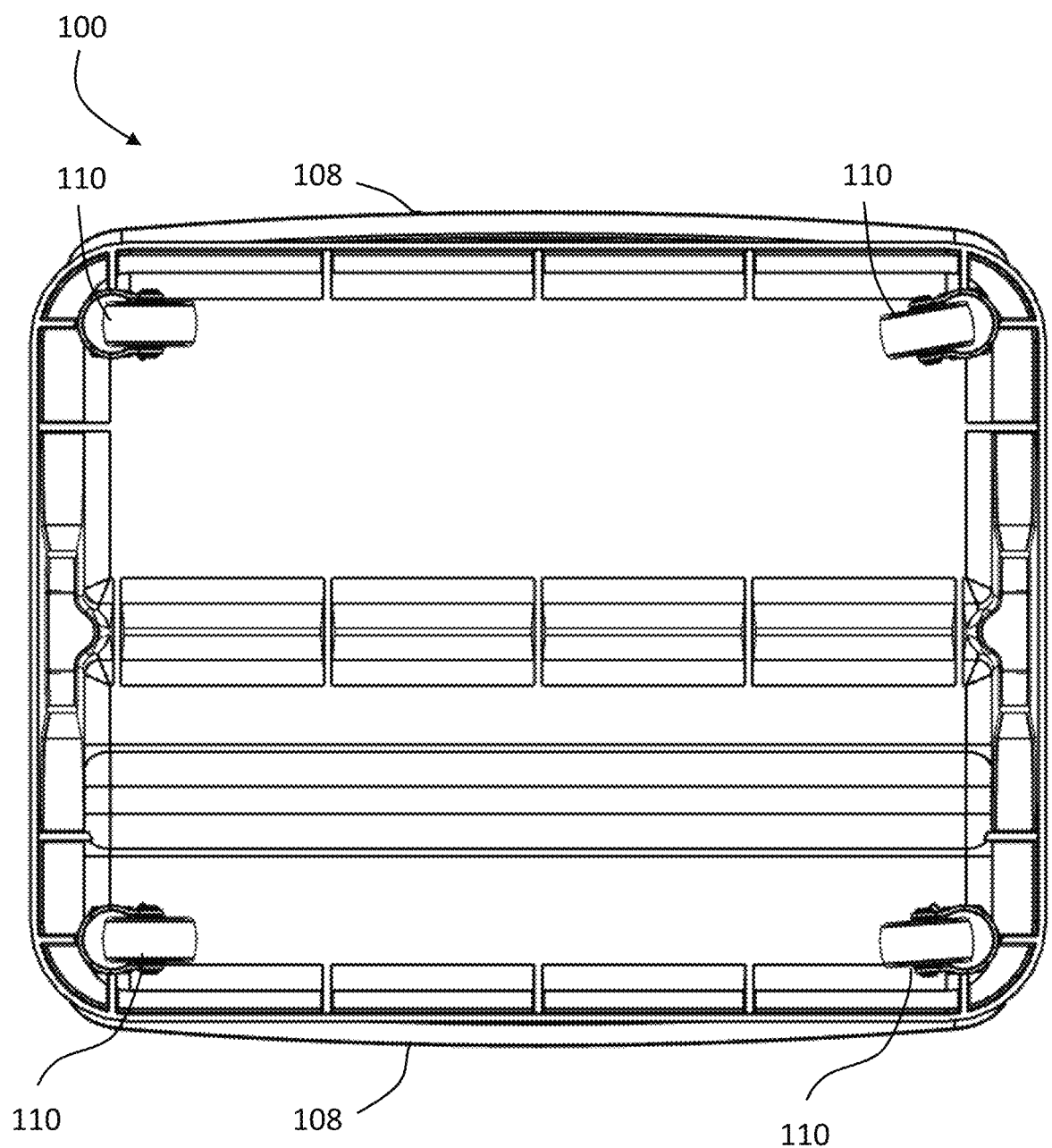
FIG. 8 is a bottom view of the bucket assembly of FIG. 1.
Figure 9:
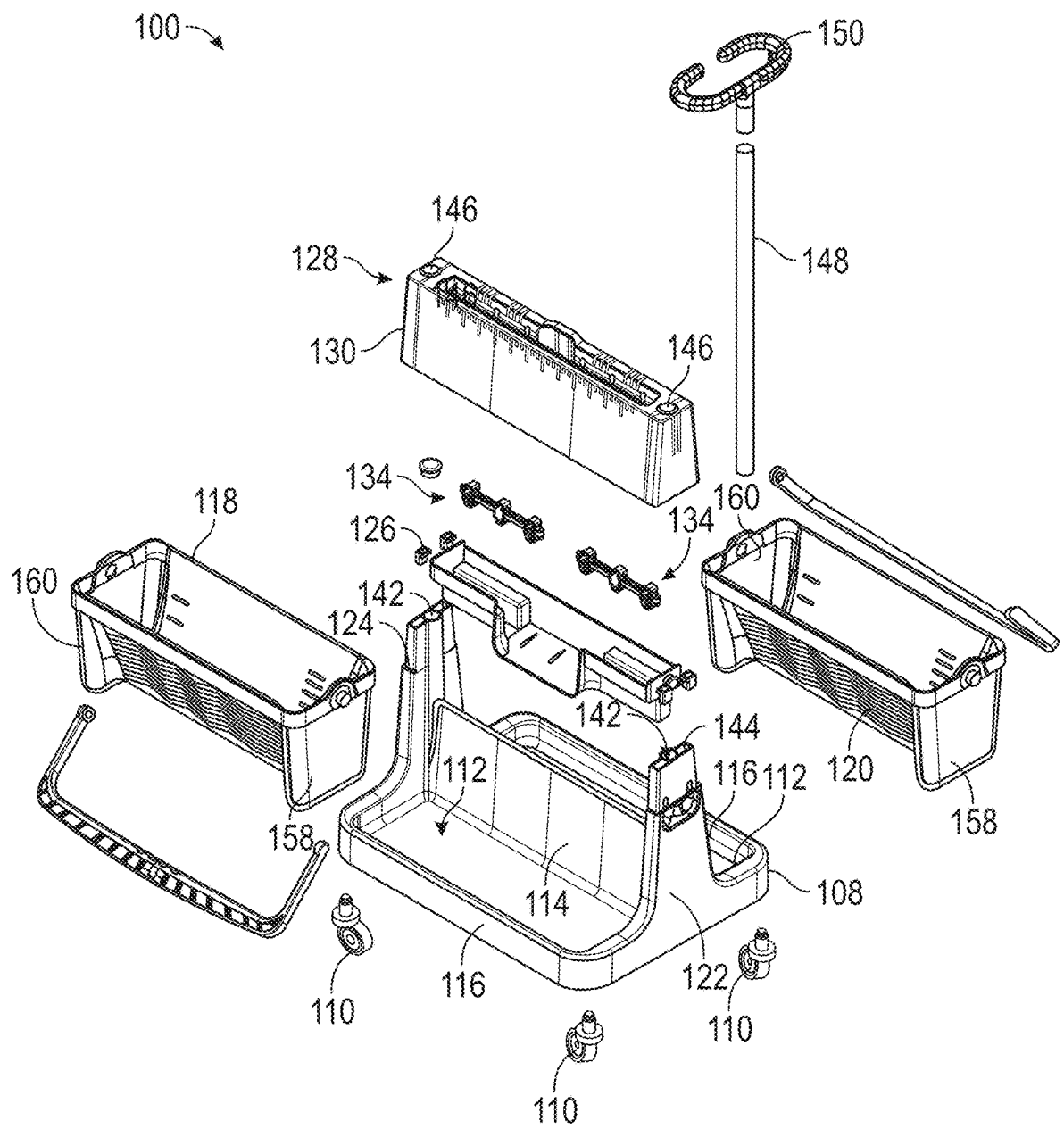
FIG. 9 is an unassembled perspective view of the bucket assembly of FIG. 1.
Figure 10:
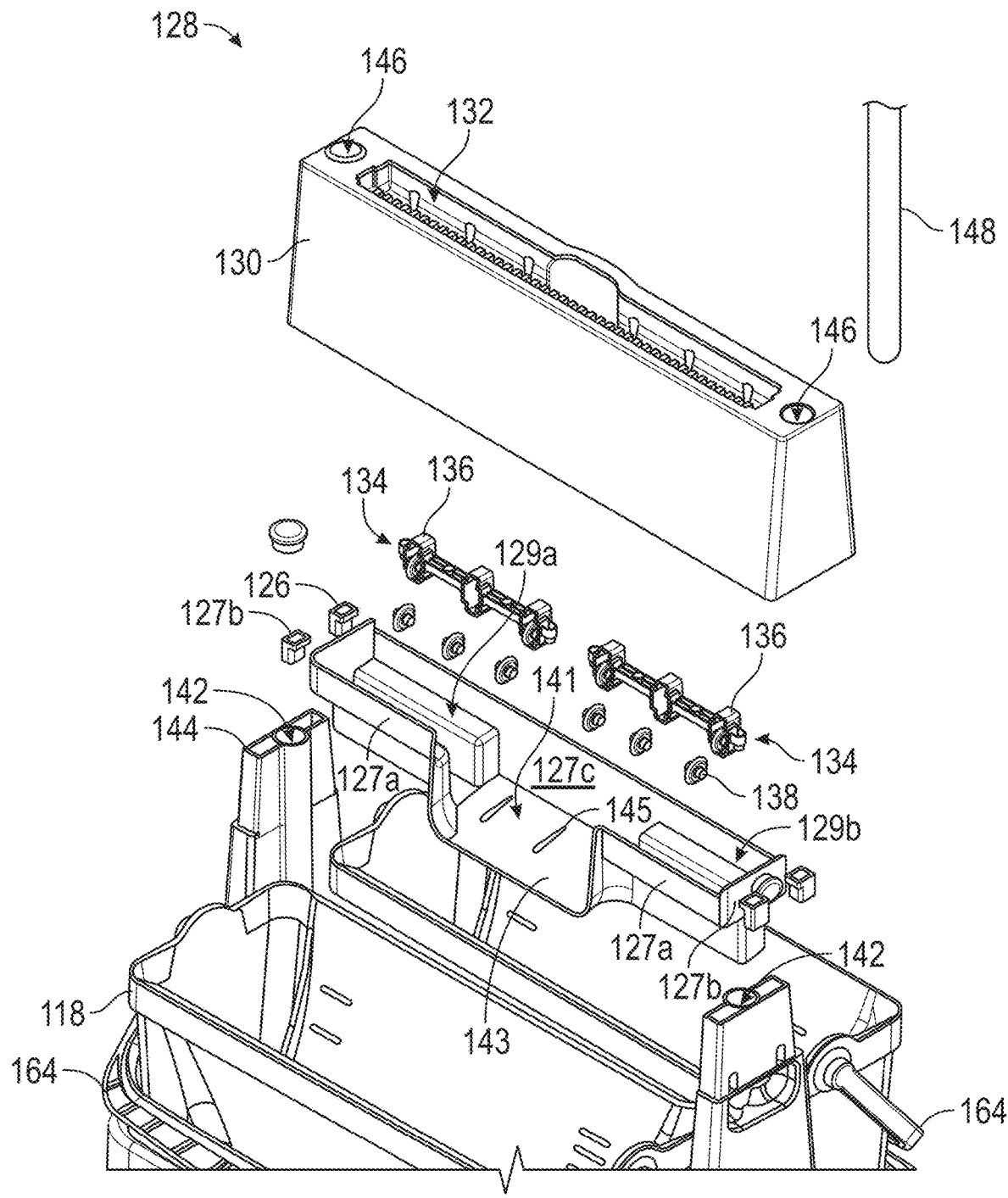
FIG. 10 is a partial unassembled perspective view of the bucket assembly of FIG. 1.

Also coupled to the end walls 122, 124 is the wringing assembly 128. In an embodiment, the wringing assembly 127 is removably coupled to the end walls 122, 124 to facilitate cleaning of the wringing assembly. However, in an embodiment, when the wringing assembly 128 is coupled to the walls 122, 124 or the trolley 108, the connection is a rigid coupling and the wringing assembly functions as an integral part of the trolley 108. The wringing assembly 128 includes a housing 130 having a slot 132 on an end. The slot 132 is sized to receive the mop head 104 and a portion of the mop handle 106 that is adjacent the mop head. Coupled to the housing 130 is one or more roller assemblies 134 (FIG. 10). The roller assemblies 134 include a frame 136 with movable wheels 138. In the illustrated embodiment, the wringing assembly 128 includes a pair of roller assemblies 134 each having three wheels 138. It should be appreciated that this is for example purposes and the claims should not be so limited. In other embodiments, the wringing assembly 128 may include more or fewer roller assemblies 134 or wheels 138. In the illustrated embodiment, the housing 130 includes an integral blade portion 140 (FIG. 2). As will be discussed in more detail, as the mop head 104 is inserted into the slot 132, the wheels 138 bias the mop head 104 to engage the mop pad against the blade portion 140. The compression of the mop pad by the wringing assembly 128 extracts fluid/fluid from the mop pad. This extracted fluid/fluid flows through the wringing assembly 128 and the drain tray 126 into the first compartment 118.

In an embodiment, the end walls 122, 124 each further include a circular opening 142 on an end 144. The openings 142 are aligned or co-axial with openings 146 in the housing 130. The openings 142, 146 are sized to receive a post 148. Coupled to the post 148 is a grip or handle 150. In the illustrated embodiment, the handle 150 is "C" shaped such that it defines a slot sized to receive a portion of the mop handle 106. It should be appreciated that this provides a convenient means to secure the mop handle when not in use. It should be appreciated that handles 150 having other shapes may also be used. In an embodiment, the post 148 may be of an adjustable length to allow the handle 150 to be placed at different heights relative to the floor to accommodate different users. In an embodiment, the post 148 may be telescopic, allowing the length to be changed. In another embodiment, the length of the post 148 may be changed by increasing or decreasing the amount of the post 148 that is inserted into the openings 142, 146.

In an embodiment, the housing 130 further includes at least one or a plurality of clip holders 133. As will be discussed in more detail herein, the clip holders 133 are configured to receive accessory items (e.g. buckets, receptacles, storage containers, caddy, bins, cleaning fluid containers, brushes, dust pan, etc.,) that a user may desire to use in connection with cleaning activities. Clip holders can be located on multiple surfaces on the system i.e. the side of the housing 130 (FIG. 11A) or on the ends of the housing 13 (FIG. 11D). It should be appreciated that in some embodiments, the clip holders 133 may be configured to receive a holding device, such as a bottle holder, a toilet bowl brush holder, a dust pan holder, storage containers, bins, a caddy, or a broom holder for example. In an embodiment, the holders are configured to position the accessory vertically above the recess 112. In this way, any fluid or debris that accumulates on the accessory will fall into the recess 112 rather than onto the surface being cleaned.

In the embodiment of FIGS. 1-11, the bucket assembly 100 includes a pair of compartments 118, 120. The compartments 118, 120 are sized to fit within the recesses 112. In an embodiment, the compartments 118, 120 include a generally triangularly shaped interior area 152. The interior area 152 is defined by a side walls 154, 156 that are angled relative to each other such that a first end of the side walls 154, 156 adjacent the bottom are closer together than a second or opposite end at the entrance to the interior area. In an embodiment, the first ends of the side walls 154, 156 are connected by a curved surface. In this embodiment, the compartments 118, 120 may include end walls 158, 160 that have a flat bottom surface to allow the compartments 118, 120 to remain stable when placed on a surface or in the recesses 112. It should be appreciated that the angled side walls 154, 156 allow for a reduced amount of fluid (e.g. to reduce weight) while still allowing the mop head 104 to be fully inserted into the compartments 118, 120. In another embodiment, a standard (rectangular) shaped bucket can be used.

Figure 11A:
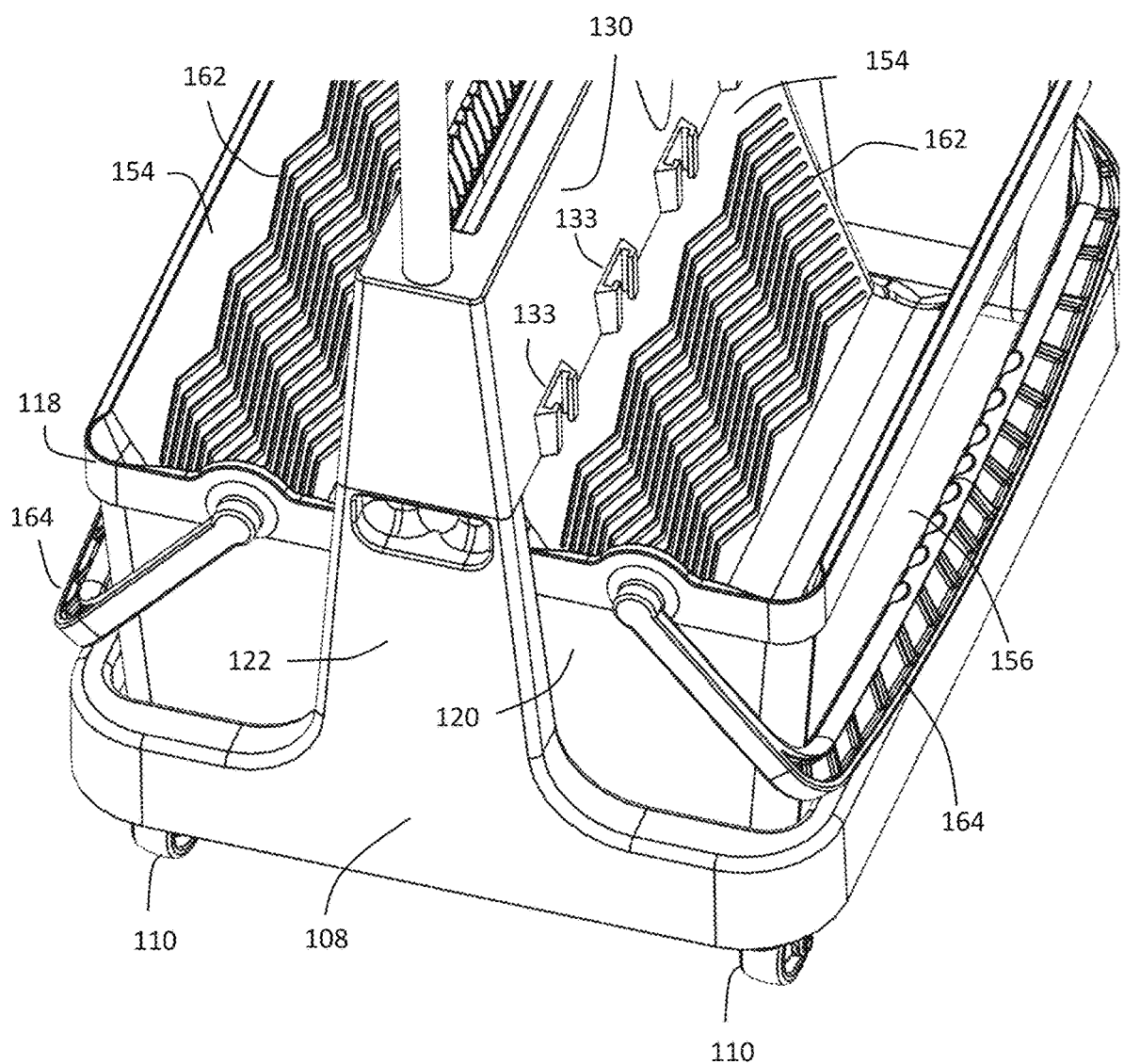
FIG. 11A is a partial perspective view of the compartment portion of FIG. 1.

In an embodiment, one side wall (e.g. side wall 154) includes an optional cleaning element 162 (FIG. 11A). The cleaning element 162 may be a plurality of ribs that are integrally formed in the side wall 154. The cleaning element 162 includes features (e.g. ribs) that engage the fibers of the microfiber mop pad when the mop head 104 is moved against the cleaning element 162. This allows the cleaning of the mop pad and the removal of particles such as dirt/debris, hair and fur. It should be appreciated that while the illustrated embodiments show the cleaning element 162 as being a plurality of integral ribs arranged in saw-tooth configuration (e.g. a plurality of connected peaks and valleys), this is for example purposes and the claims should not be so limited. In other embodiments, the ribs may be formed in a different shape for example.

Figure 11B:
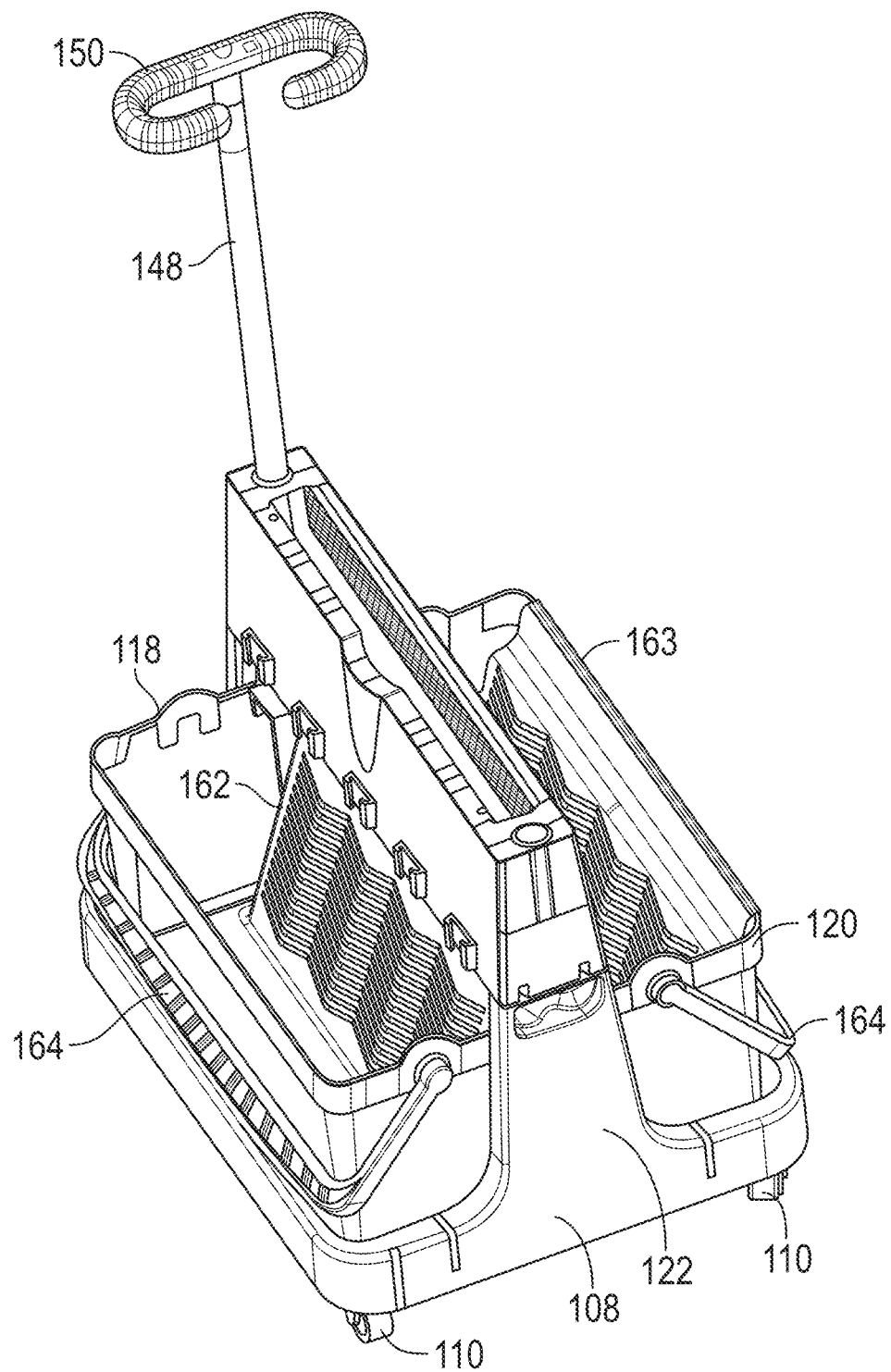
FIG. 11B and FIG. 11C are a perspective view of the bucket assembly in accordance with another embodiment.
Figure 11C:
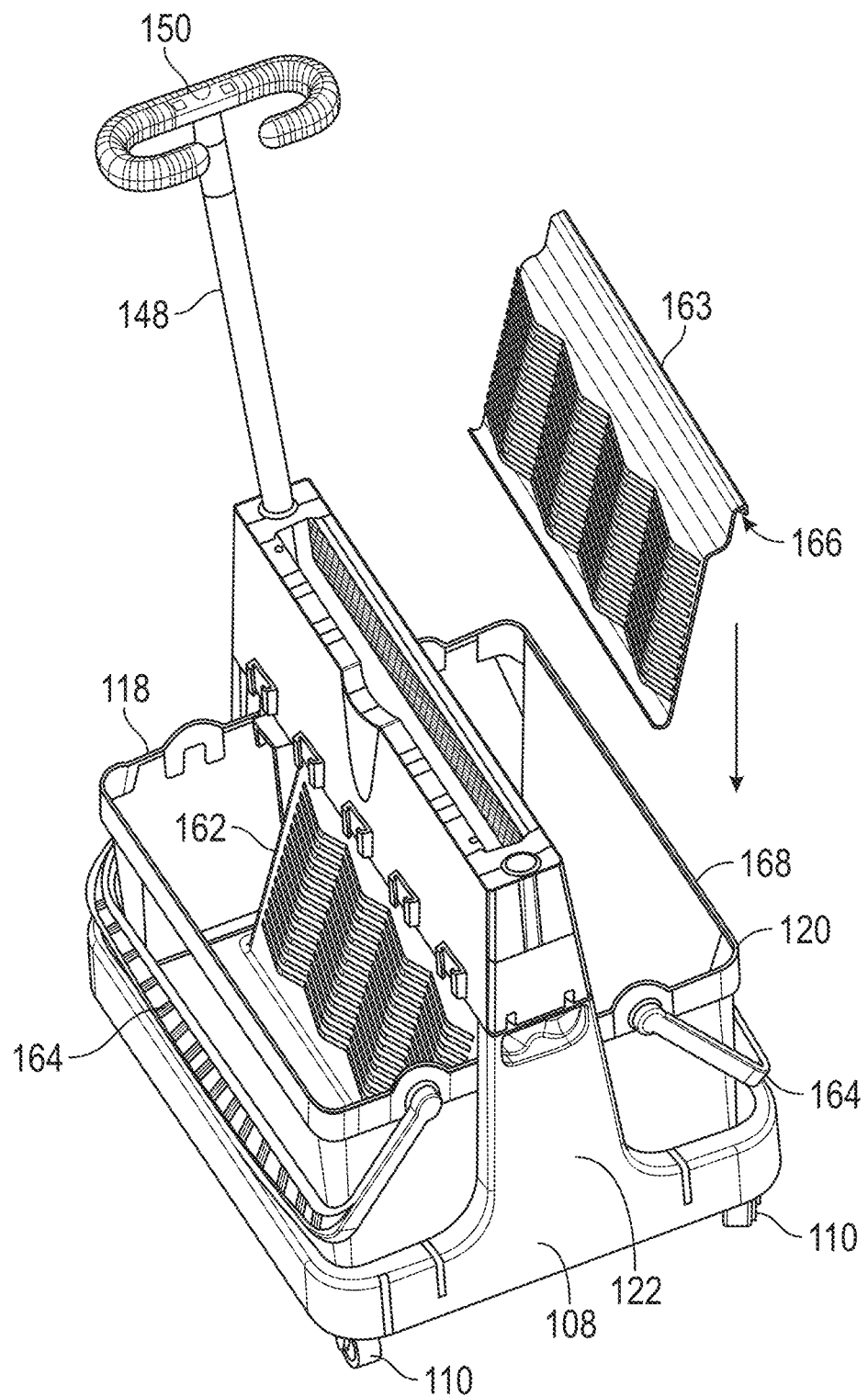
Figure 11D:
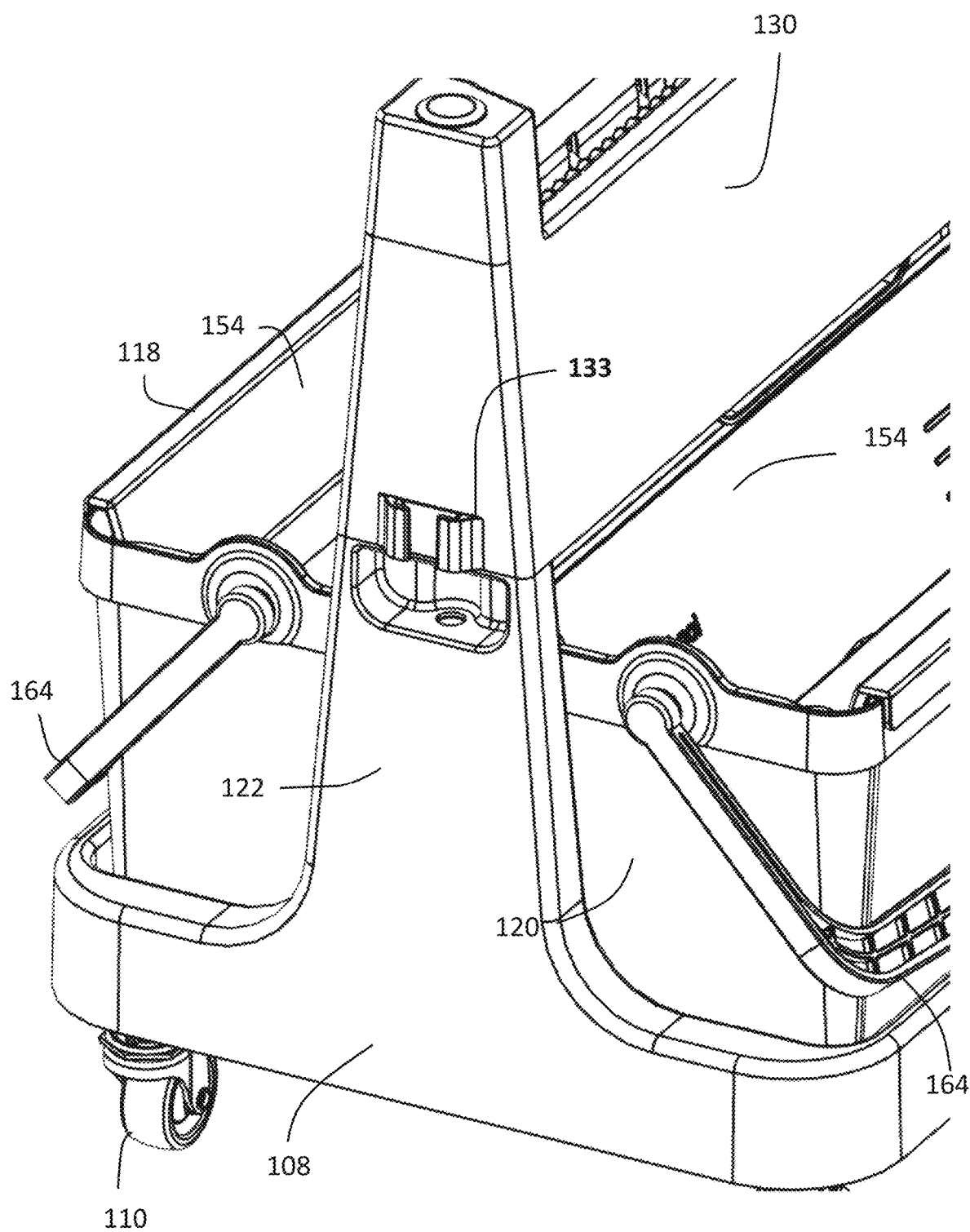
FIG. 11D is a partial perspective view of the bucket assembly having an end clip holder in accordance with an embodiment.

In still other embodiments, in one or both compartments 118, 120 the cleaning element may be formed from a separate member that is coupled to or placed within the compartment 118, 120. As shown in FIG. 11B and FIG. 11C, the separate cleaning element 163 includes a slot 166 that couples with the edge 168 of the compartment 120. The separately formed cleaning element 163 may have a plurality of features, such as but not limited to, ribs, projections, slots and holes for example. It should be appreciated that while the embodiment of FIGS. 11B and 11C illustrate the separate cleaning element 163 as being installed within the second compartment 120, with the first compartment 118 having an integral cleaning element 162, this is for example purposes and the claims should not be so limited. In other embodiments, the both compartments 118, 120 may have a separate cleaning element 163. In some embodiments, the separate cleaning element 163 may be a different color to assist the user in distinguishing the first compartment 118 (with dirty fluid) from the second compartment 120 (with the clean fluid or cleaning solution).

In the illustrated embodiment, first compartment 118 is used to remove contaminants (e.g. dirt and hair) from the mop pad after the mop has been used to clean a surface. The first compartment 118 may be referred to as the "dirty fluid" compartment because the fluid (e.g. fluid) within the first compartment will quickly become contaminated with dirt, particulates or debris during use. As described in more detail herein, the wringing assembly 128 removes fluid from the microfiber mop pad as the mop head 104 is moved through the wringing assembly 128. It should be appreciated that the dirty fluid in the mop pad will be removed from the mop pad and drain back into the first compartment 118 via the drain tray 126. In this way, when the mop pad is subsequently immersed in the fluid/cleaning-solution fluid in a second compartment 120, either no or very little contamination of the fluid/cleaning-solution fluid will occur. In an embodiment, wringing mop pad 1-3 times through the wringing assembly provides sufficient level of fluid or cleaning-solution on the mop pad to clean a floor.

The second compartment 120, sometimes referred to as the "clean" compartment, is used for recharging the mop pad with a fluid/cleaning-solution fluid. The second compartment 120 includes a generally hollow interior 153 having an open side sized to receive the mop head 104. In an embodiment, the second compartment is identical in size and shape to the first compartment 118. In another embodiment, the second compartment 120 may be a different shape from the first compartment 118. For example, the second compartment 120 may have a flat bottom on which the mop pad is placed. The interior 152 contains a volume of fluid, cleaning-solution fluid, or a combination of the foregoing. In an embodiment, the wringing assembly 128 may be used to remove a least a portion of the fluid from the mop pad when the mop head 104 is moved through the wringing assembly 128. It should be appreciated that this allows the user to adjust the amount of liquid contained within the mop pad. It should be appreciated that the more times the mop is wrung the less fluid/chemical is still held in the fibers of the mop.

In one embodiment, the first compartment 118 and the second compartment 120 may be made different colors to assist the user in quickly identifying which compartment to place the mop head 104. In an embodiment, the first or "dirty" compartment 118 may be a red color and the second or "clean" compartment 120 may be made from a gray or blue color for example. In an embodiment, each compartment 118, 120 further includes a handle 164 that is pivotally coupled to the end walls 158, 160 to facilitate the lowering and picking up of the compartments 118, 120.

Figure 12:
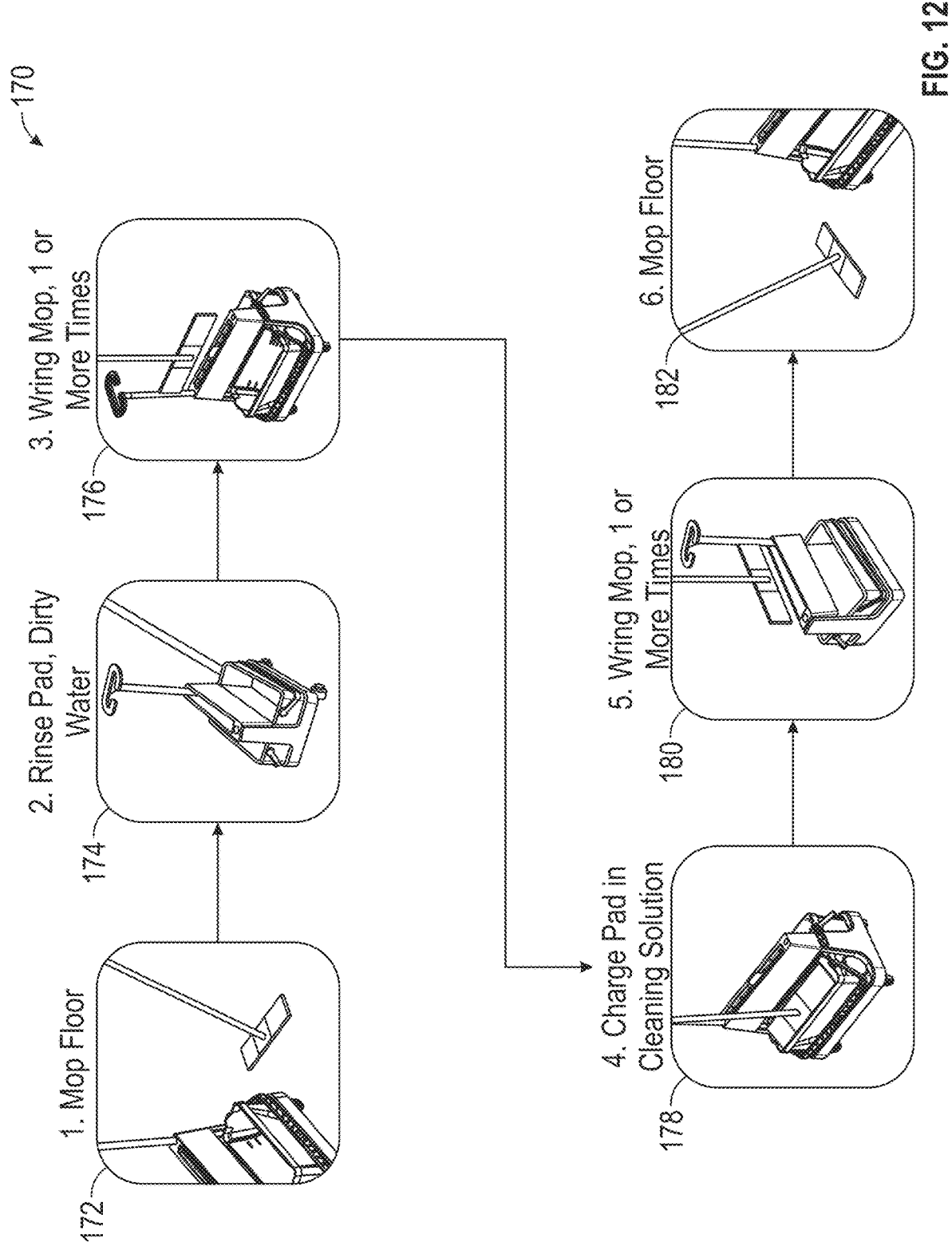
FIG. 12 is a flow diagram of a method of cleaning a floor.

Referring now to FIG. 12, a method 170 of using the floor cleaning system is shown. The method 170 begins in block 172 where the user mops the floor using mop 102 by wiping the mop pad across the surface. The method 180 then proceeds to block 174 where the user places the mop head 104 into the first compartment 118 which contains fluid. With the mop pad in the fluid, the user rubs the surface of the mop pad against the cleaning element 162 to loosen debris. The method then proceeds to block 176 where the user removes the mop head 104 from the first compartment 118 and inserts the mop head into the wringing assembly 128. It should be appreciated that the mop head 104 is in the vertical position when it is inserted into the wringing assembly 128. The user may wring or move the mop head 104 past the blade portion 140 one or more times to remove the dirty fluid from the mop pad. As fluid is extracted from the mop pad, the fluid flows along a flow path through the wringing assembly 128, into the drain tray 126, and into the first compartment 118. As will be discussed in more detail herein, the wringing assembly 128 is configured to allow the user to maintain a portion of the mop head 104 within the slot 132 when the mop head 104 is withdrawn. It should be appreciated that that allows the user to subsequently move the mop pad back across the blade portion 140 without having to completely remove the mop head from the wringer assembly and/or re-orient the mop head 104.

With the dirty fluid extracted, the method 170 proceeds to block 178 where the mop pad is recharged with fluid, cleaning solution or a combination thereof. This is accomplished by removing the mop head 104 from the wringing assembly 128 and placing the mop pad into the fluid contained in the second compartment 120. When placed in the fluid of second compartment 120, the microfiber mop pad absorbs fluid. It should be appreciated that different floor surfaces (e.g. tile vs. hard wood) may result in different levels of fluid loading in the mop pad. When a saturated mop pad is not desired, the method 170 proceeds to block 180 where the user inserts the mop head 104 back into the wringing assembly 128. The mop pad may be inserted one or more times until the desired fluid level or fluid volume in the mop pad is achieved. The method 170 then proceeds to block 182 where the user continues to mop the floor. It should be appreciated that this process continues until the user completes cleaning the floor, the cleaning fluid in the second compartment 120 is depleted, or the fluid/fluid level in the first compartment is above a desired level (e.g. full)

Figure 13:
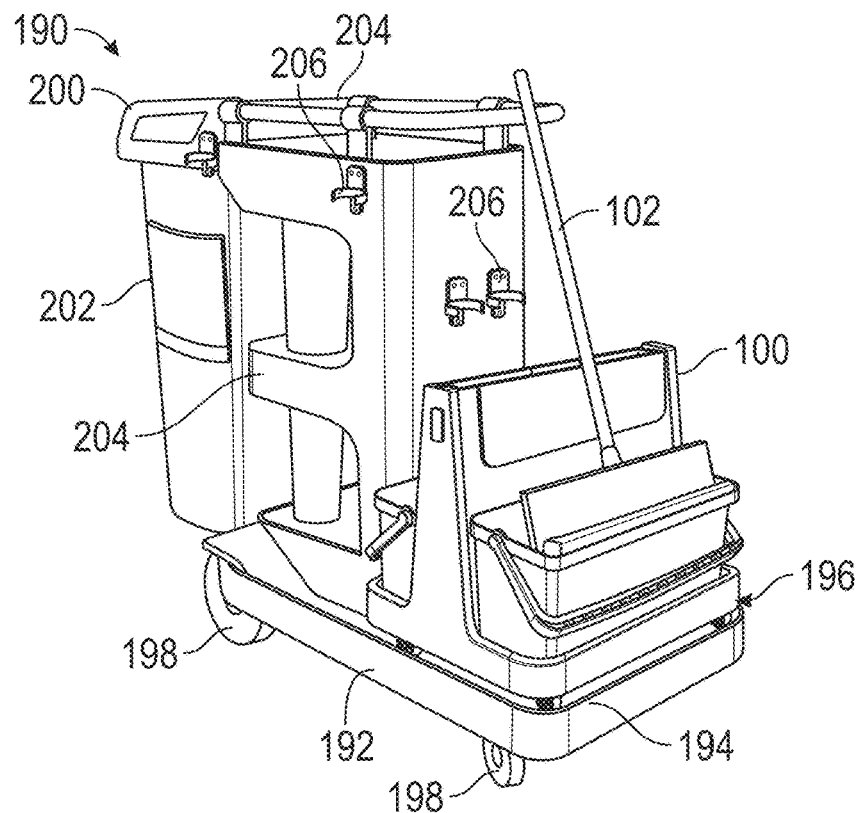
FIG. 13 is a perspective view of a cleaning system that incorporates the bucket of FIG. 1.

Referring now to FIG. 13, an embodiment of a cleaning system 190 is shown. In this embodiment, the system 190 includes a cart 192. The cart 192 includes a base 194 having an area 196 sized to receive and securely hold the bucket assembly 100. A plurality of wheels 198 that allow the user to easily move the cleaning system 190 to locations where cleaning activities are to be performed. The cart 192 may include additional features, such as but not limited to: a handle 200, a trash receptacle 202, and shelves 204. In an embodiment, the cart 192 may further include clip holders 206 that are configured similar to, or the same as, the clip holders 133. The clip holders 206 allow for accessories to be easily coupled to the cart 192.

Figure 14:
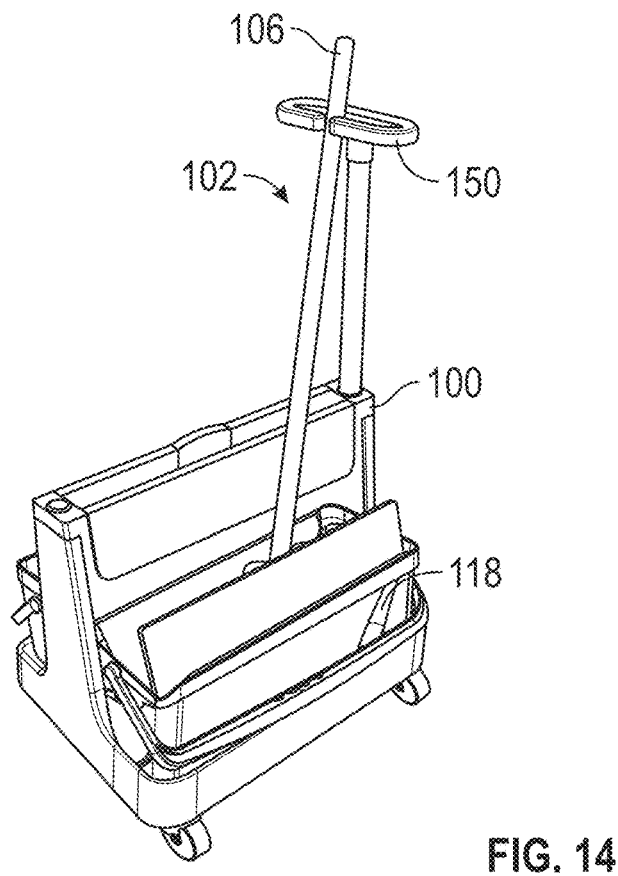
FIG. 14 is a perspective view of the bucket of FIG. 1 with a mop disposed in one of the compartments.
Figure 15:
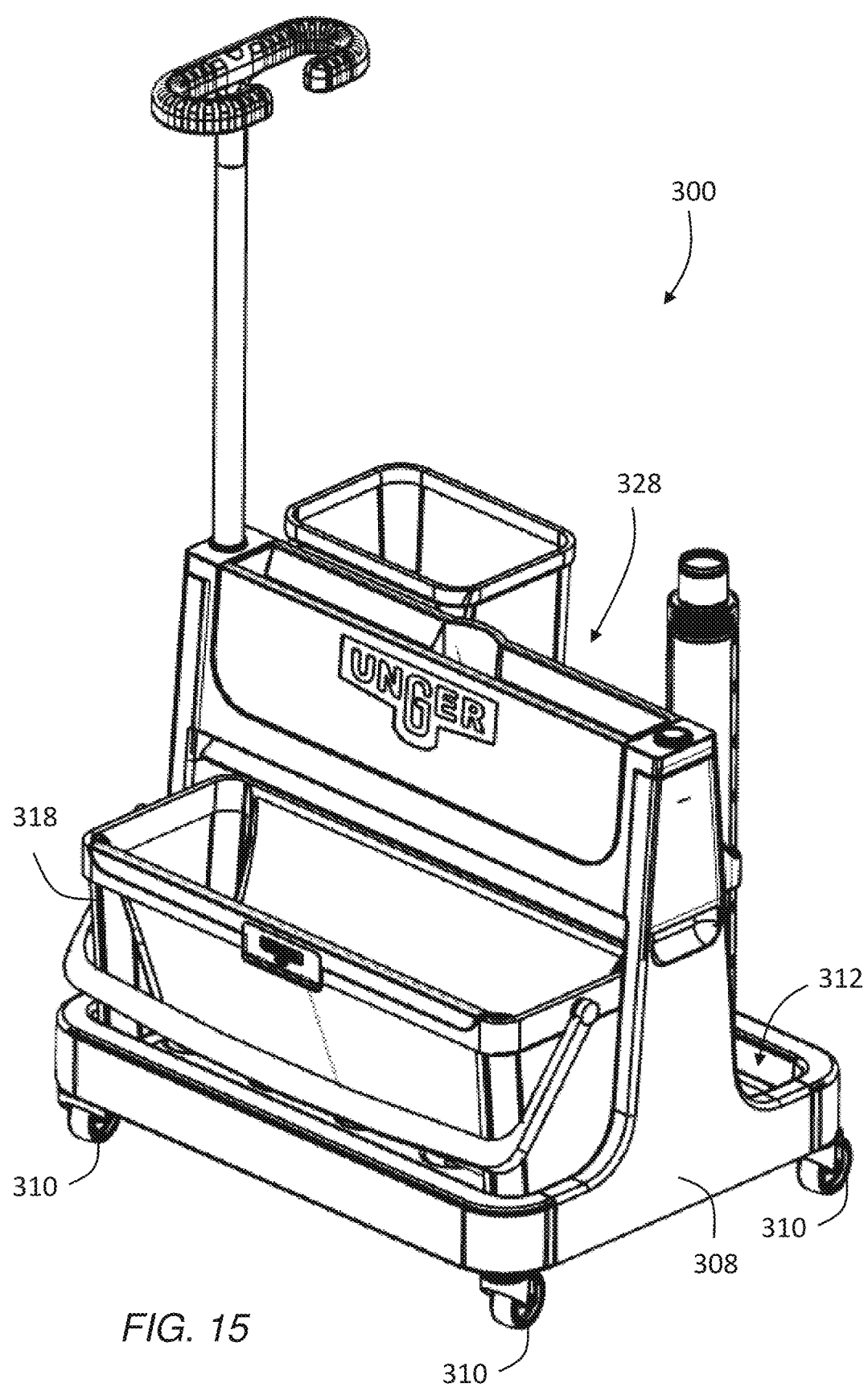
FIG. 15 is a perspective view of a single compartment bucket assembly for a floor cleaning system in accordance with an embodiment.
Figure 16:
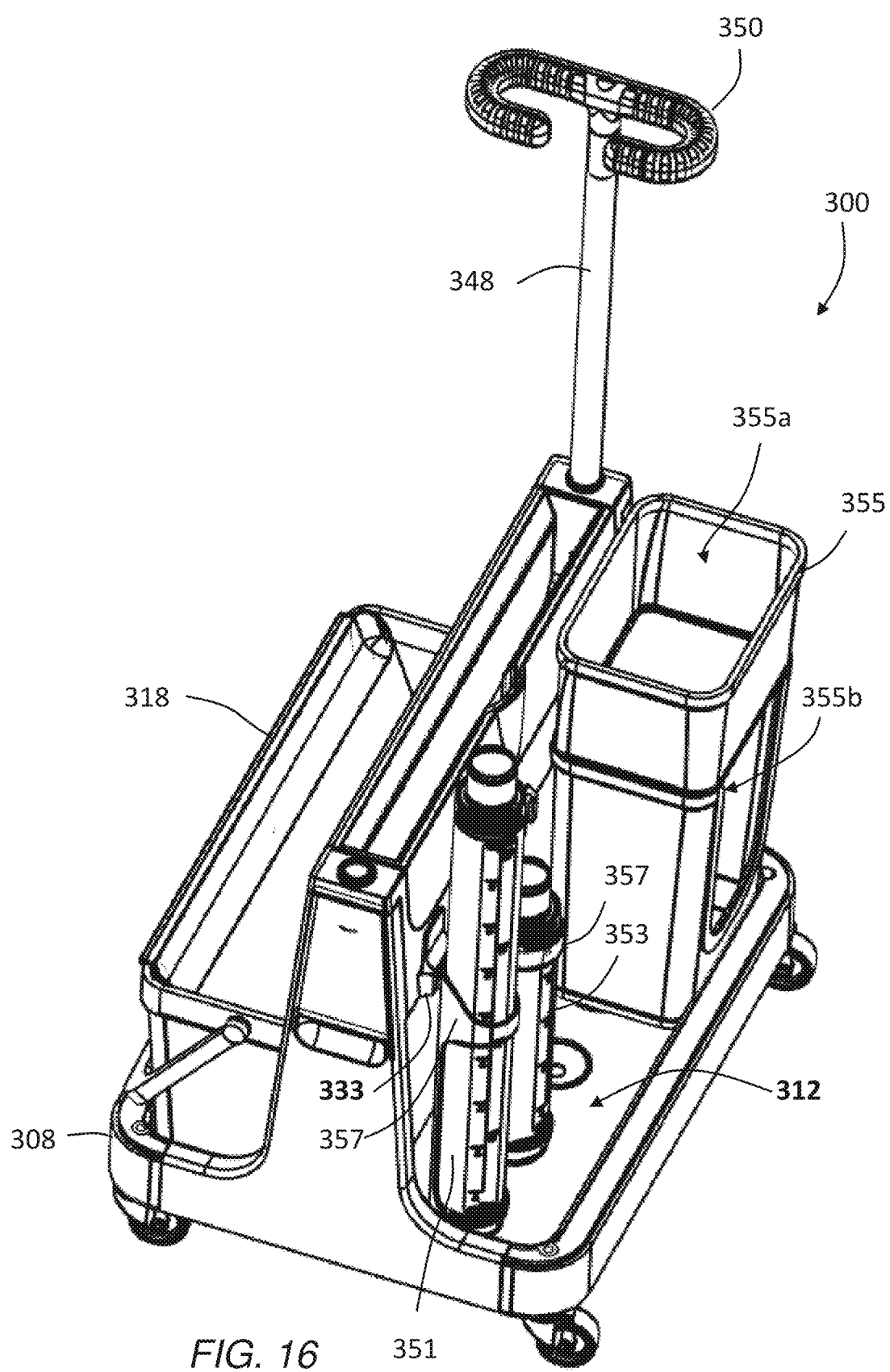
FIG. 16 is another perspective view of the bucket of FIG. 15.
Figure 17:
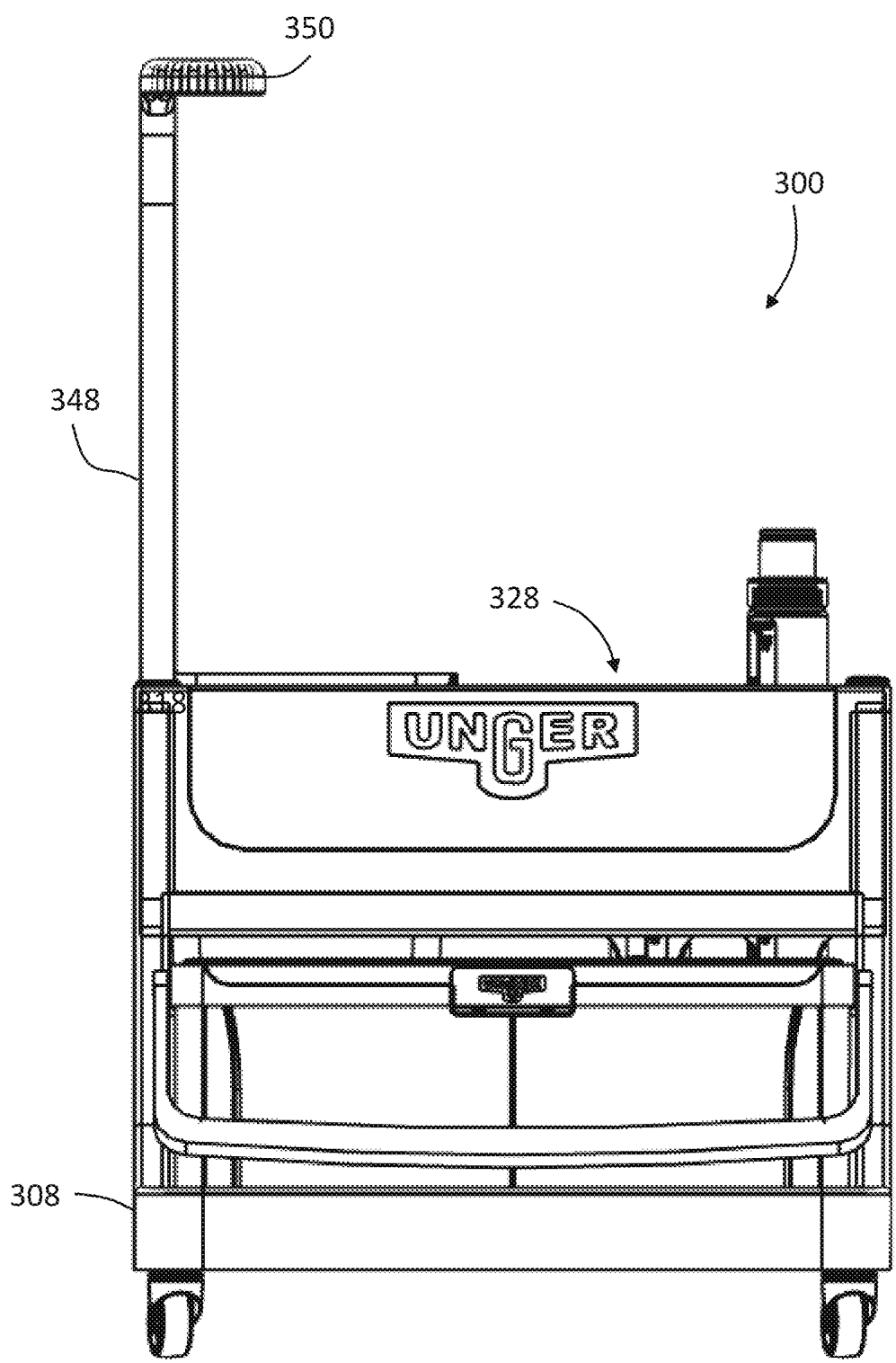
FIG. 17 is a first side view of the bucket assembly of FIG. 15.
Figure 18:
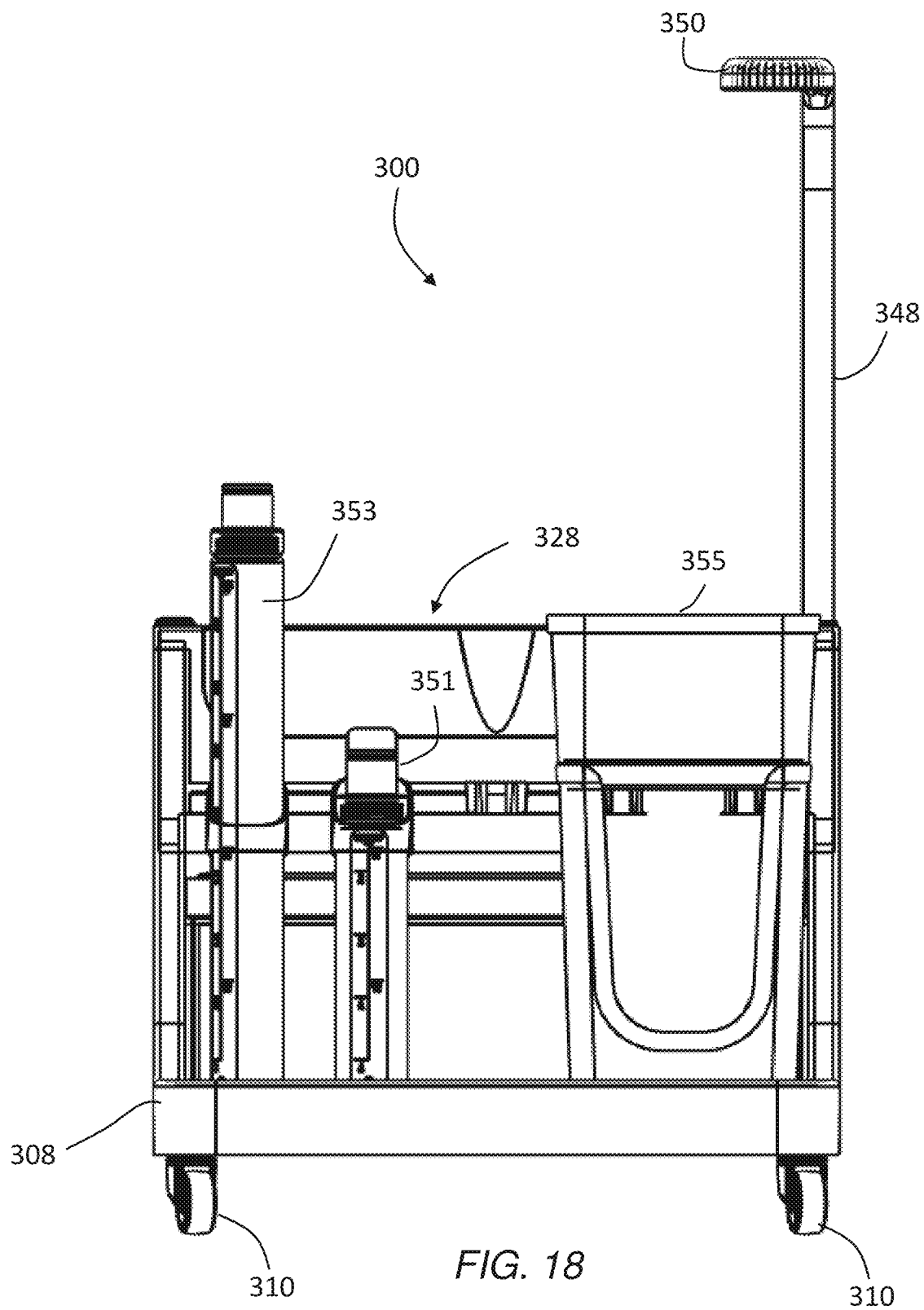
FIG. 18 is a second side view of the bucket assembly of FIG. 15.
Figure 19:
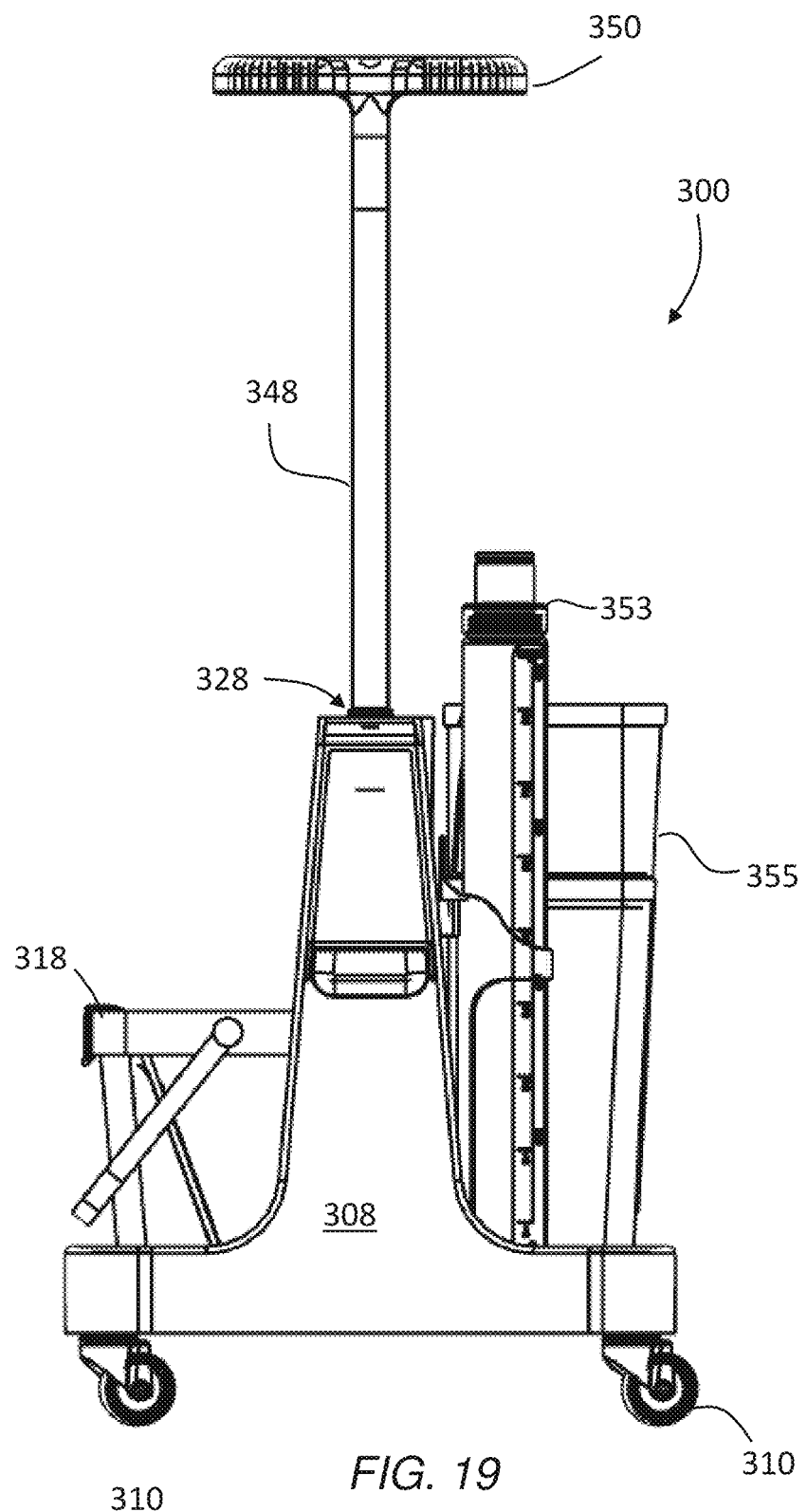
FIG. 19 is a first end view of the bucket assembly of FIG. 15.
Figure 20:
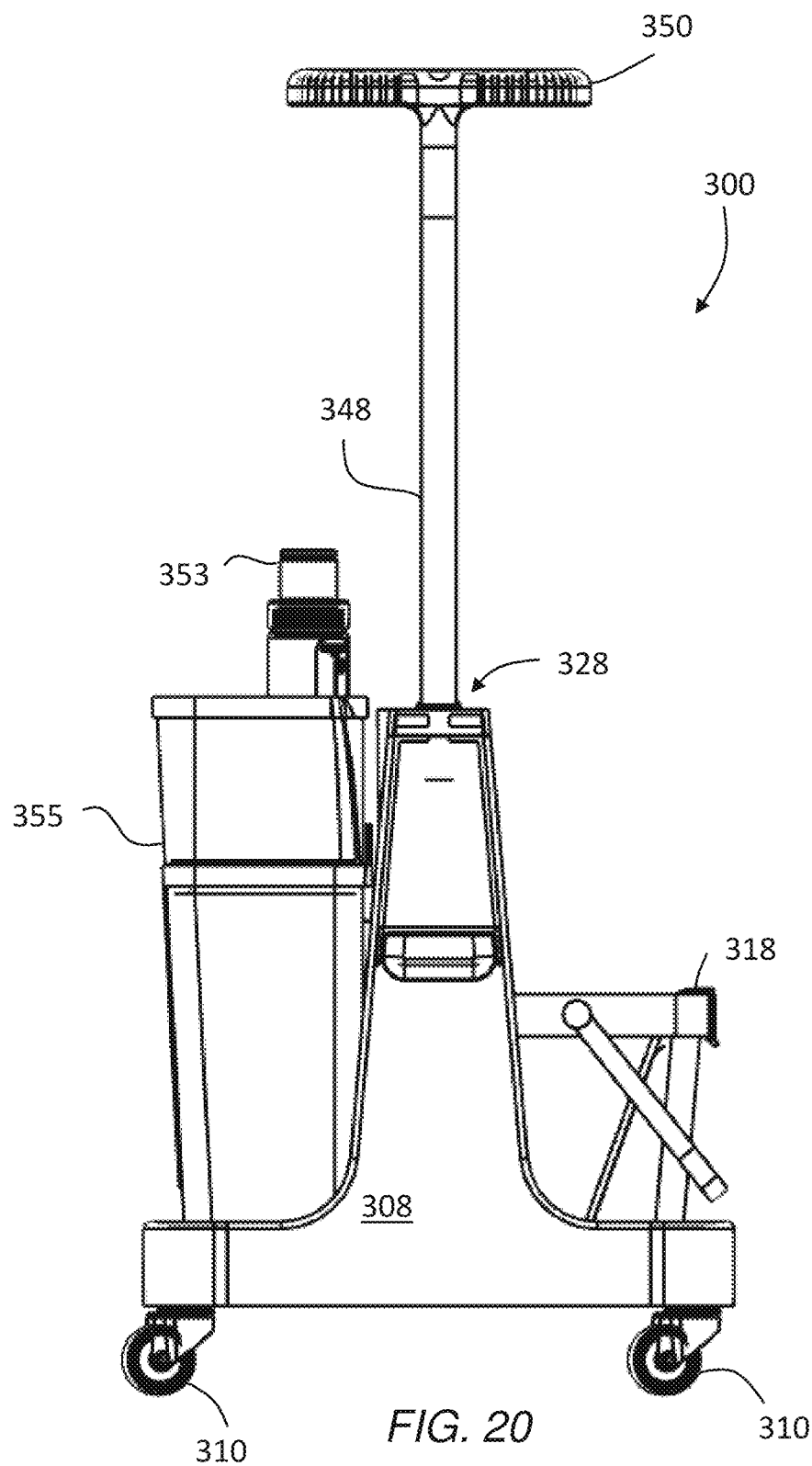
FIG. 20 is a second end view of the bucket assembly of FIG. 15.
Figure 21:
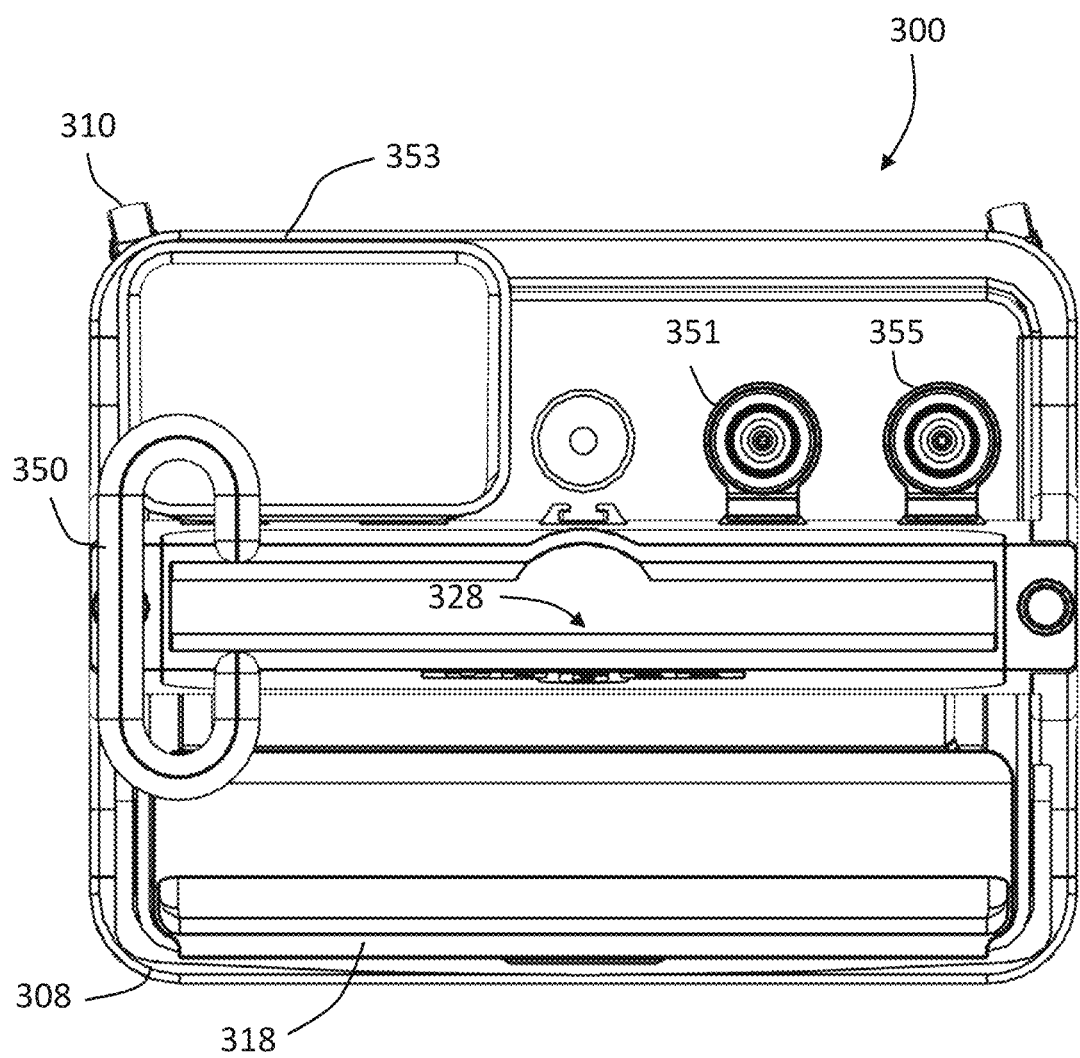
FIG. 21 is a top view of the bucket assembly of FIG. 15.
Figure 22:
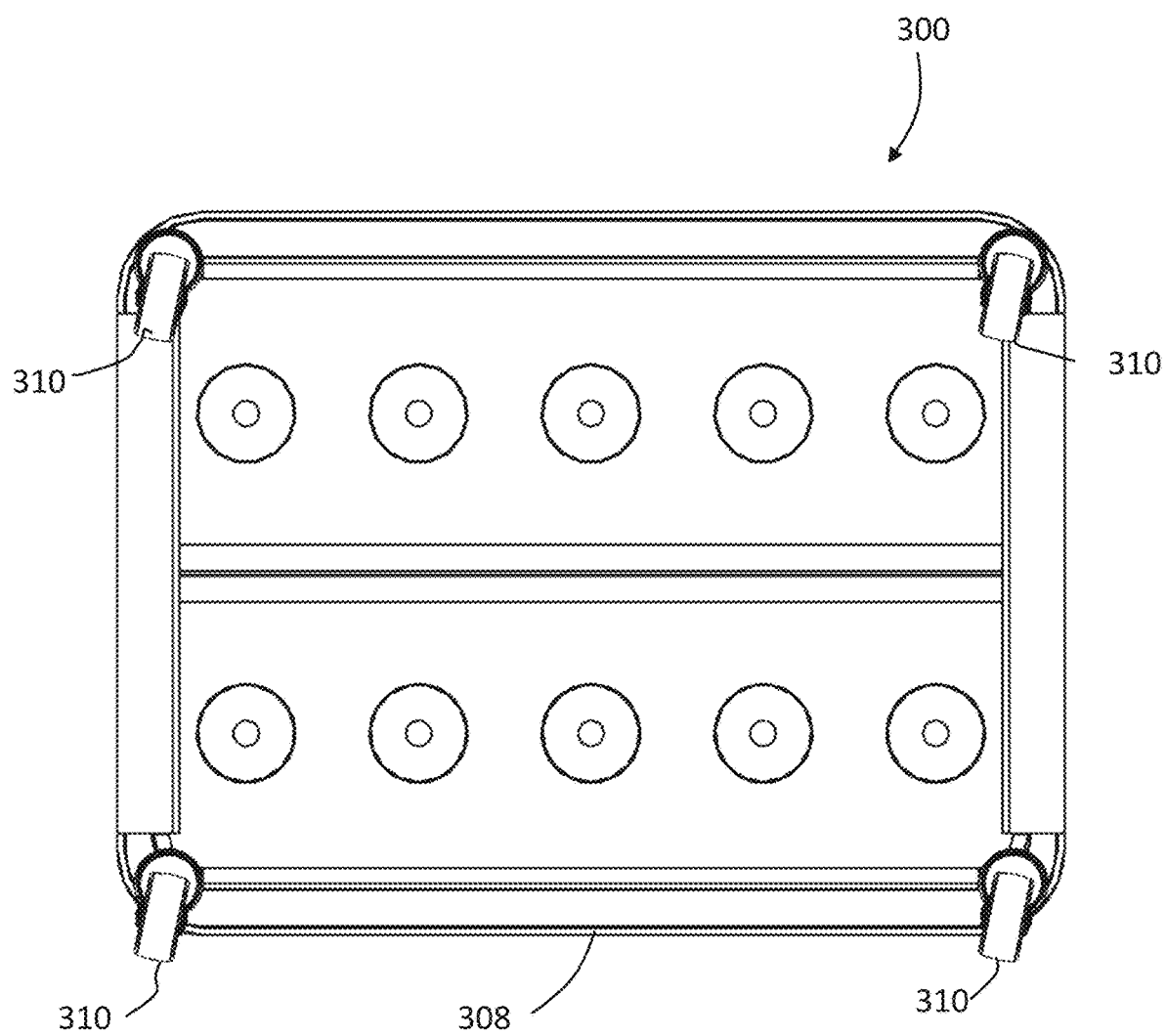
FIG. 22 is a bottom view of the bucket assembly of FIG. 15.
Figure 23A:
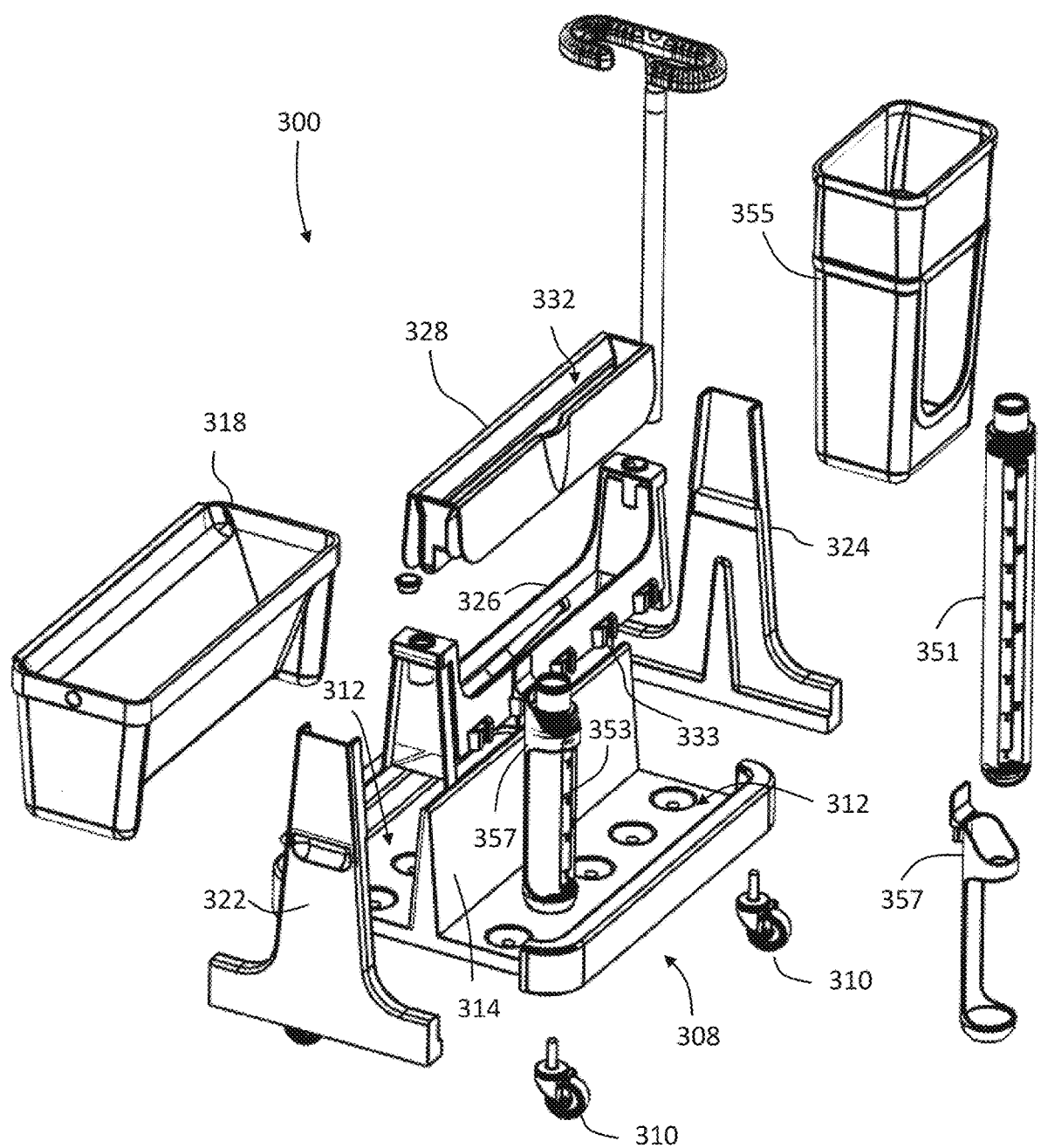
FIG. 23A is a perspective unassembled view of the bucket assembly of FIG. 15.
Figure 23B:
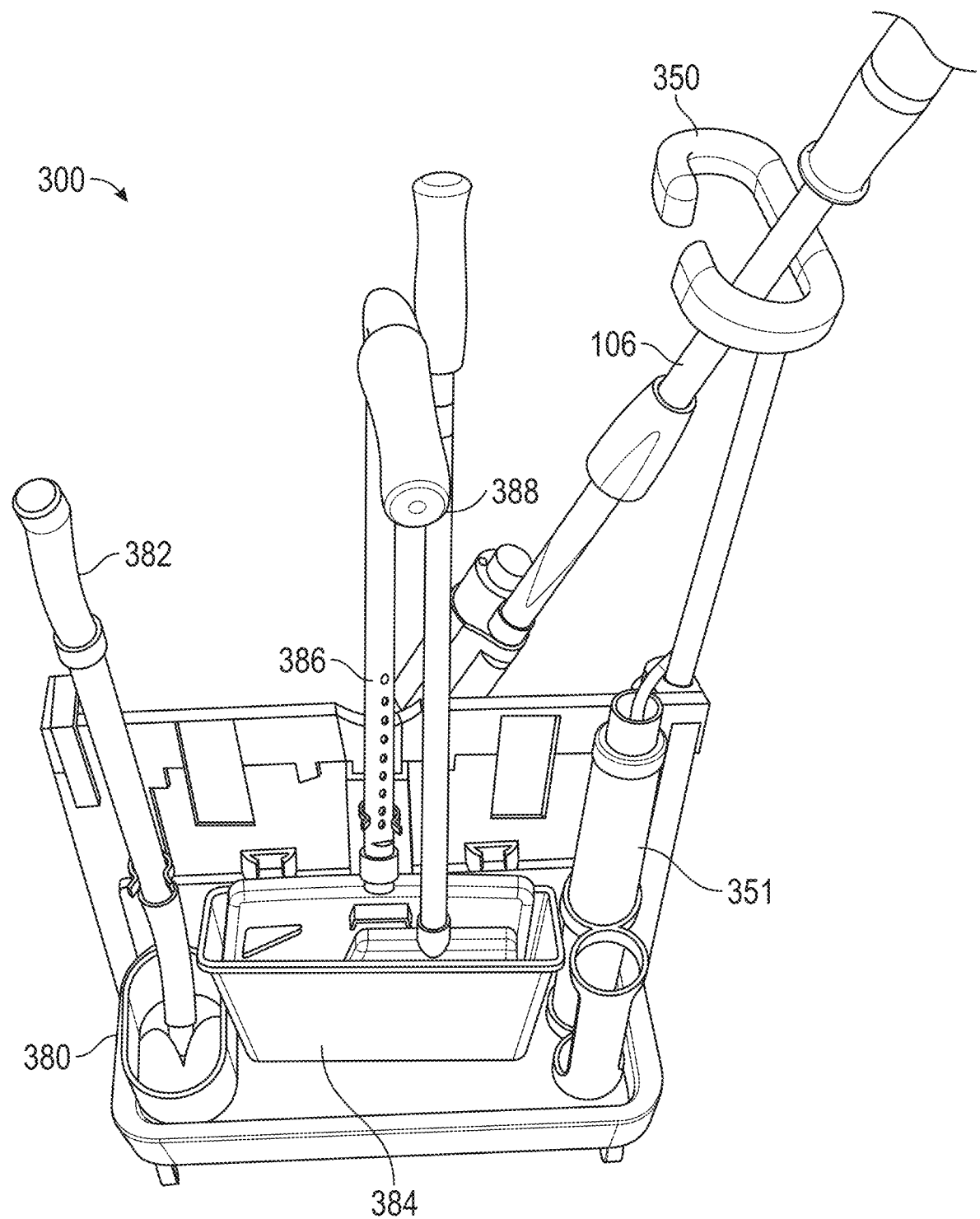
FIG. 23B-23F are various perspective views of the bucket assembly of FIG. 15 with different accessories attached thereto.
Figure 23C:
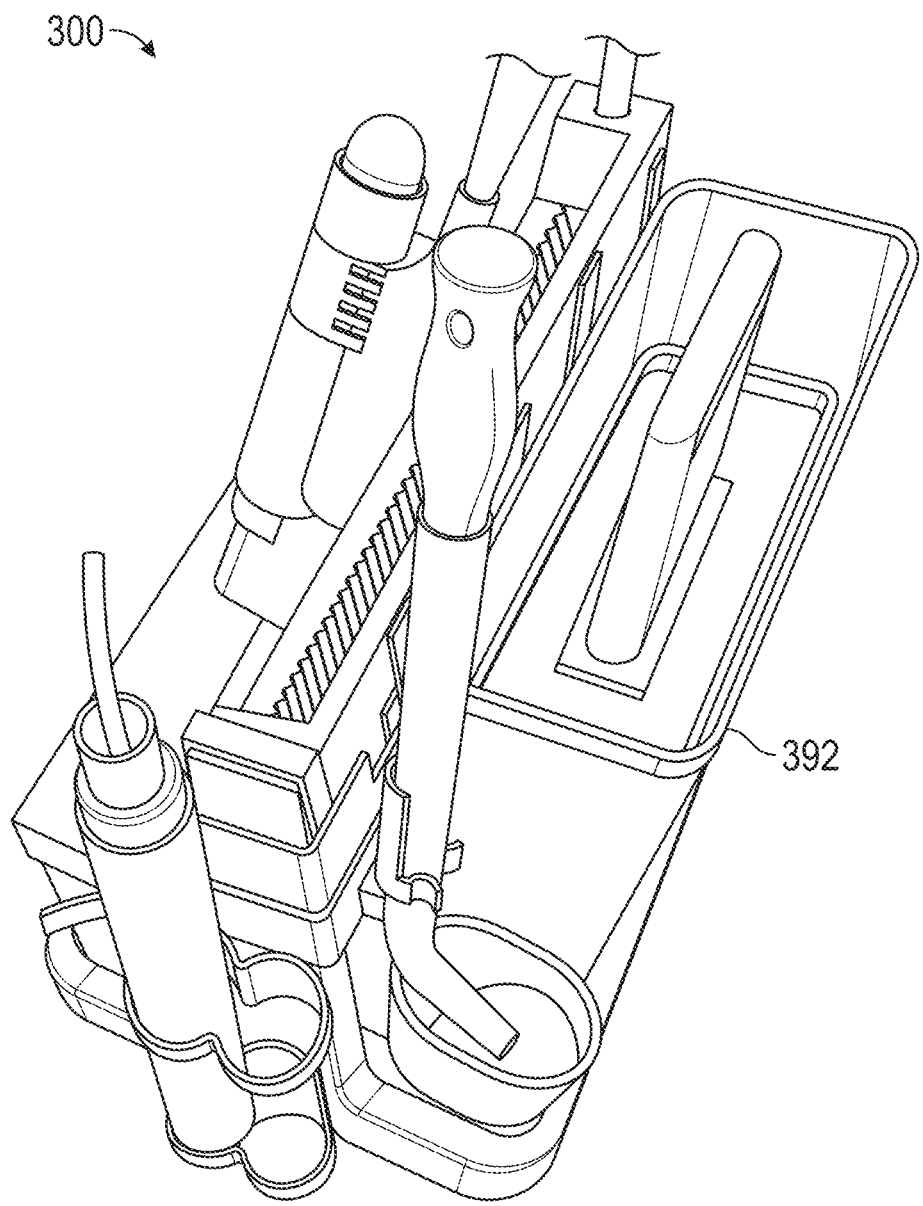
Figure 23D:
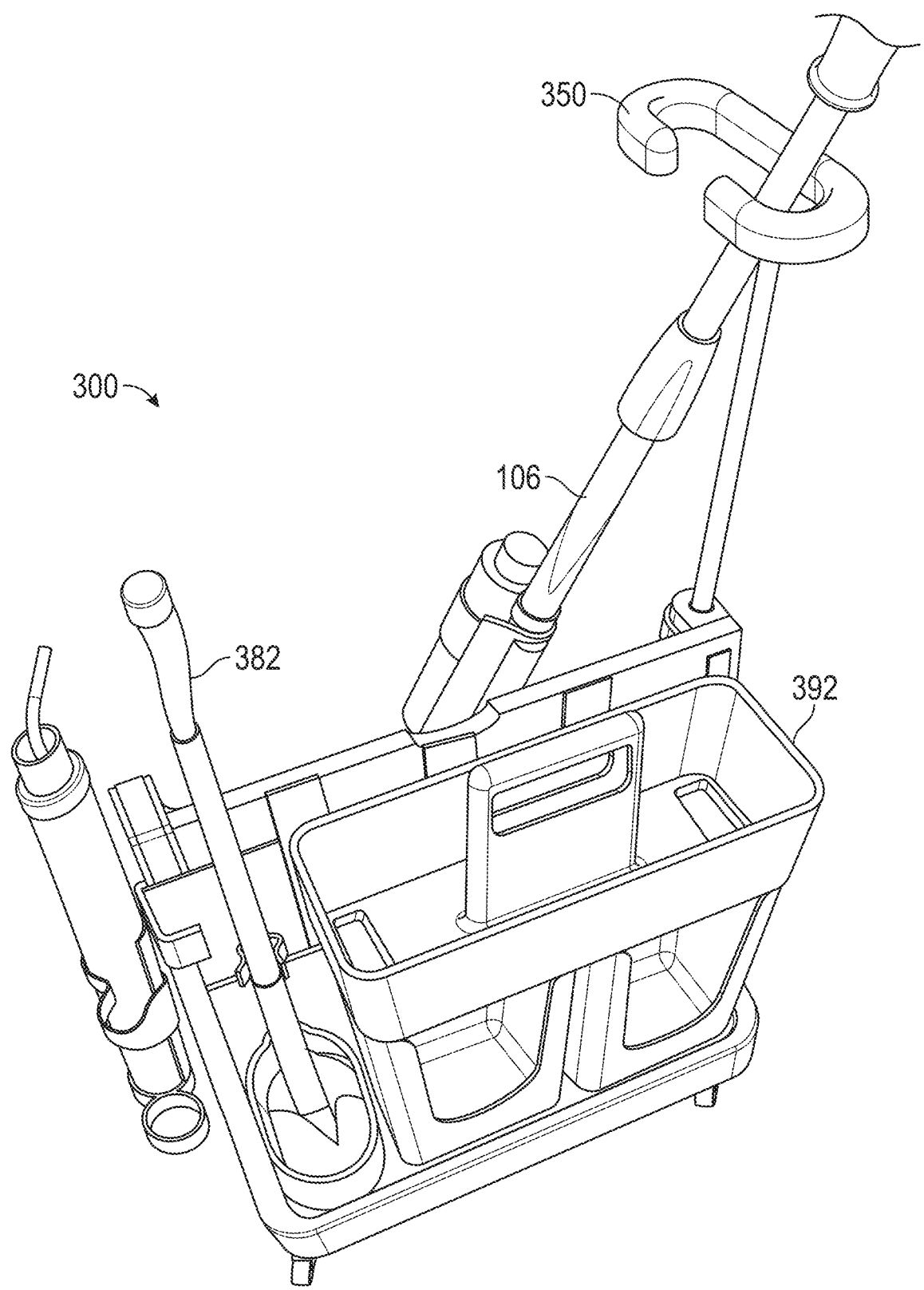
Figure 23E:
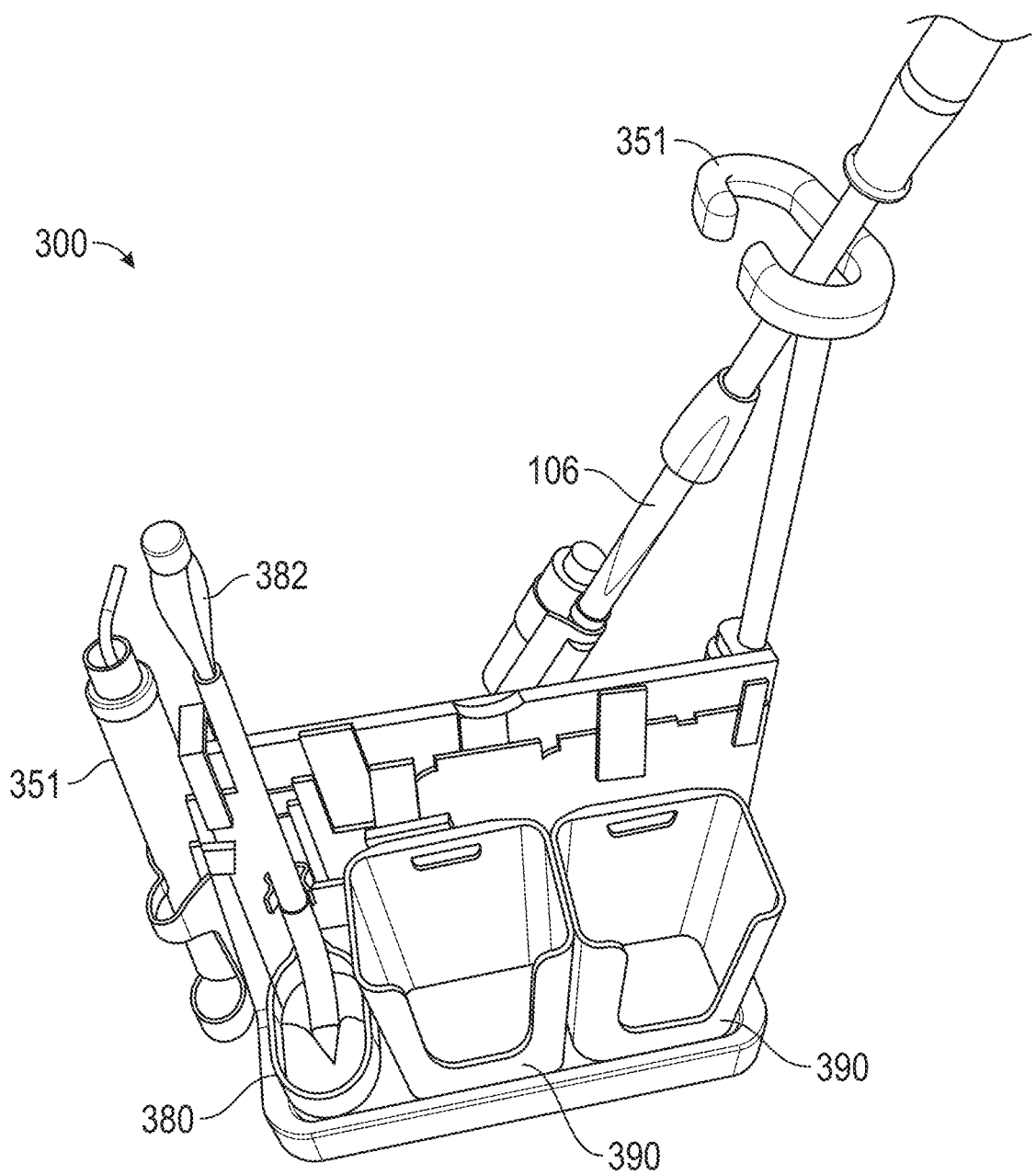
Figure 23F:
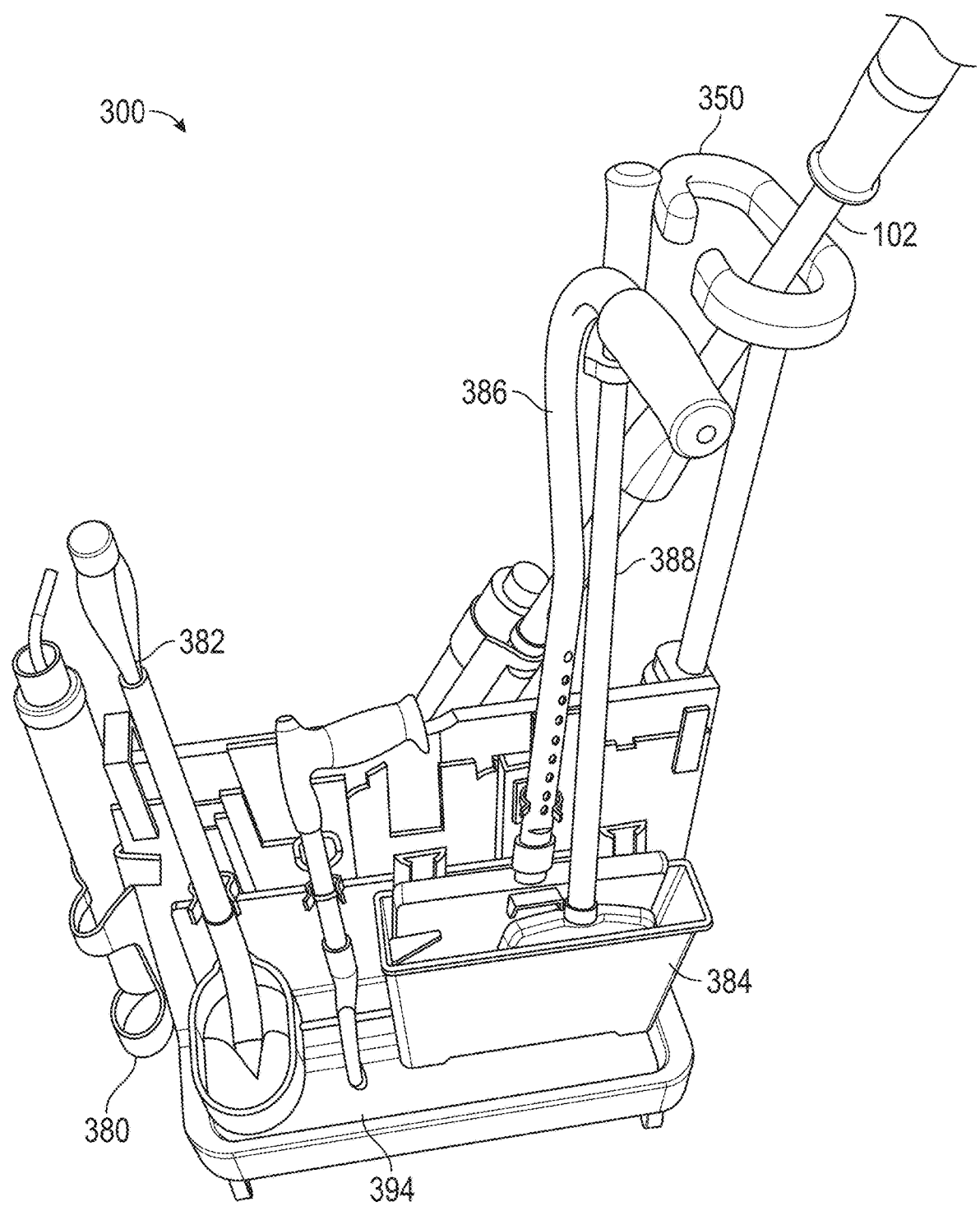

Referring to FIG. 14, the cleaning system of FIGS. 1-11 is shown with the mop 102 stored in the bucket assembly 100. It should be appreciated that with the mop head 104 placed in one of the compartments 118, 120, the handle 106 may be placed in a slot defined by the bucket handle 150. In an embodiment where the handle 150 is a "C" shape, the mop handle 106 is securely held during transportation and storage, but easily removed for use.

Figure 36:
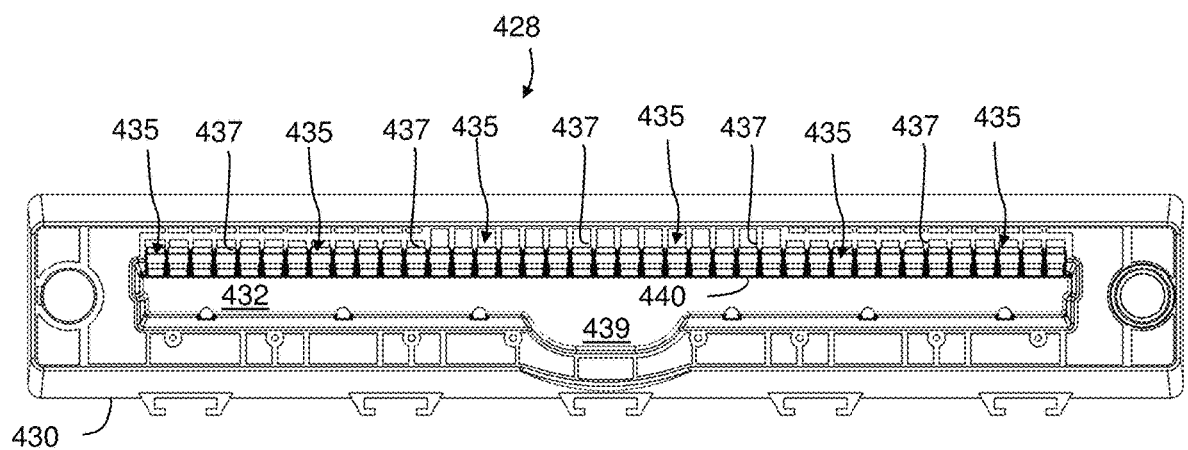
Figure 37:
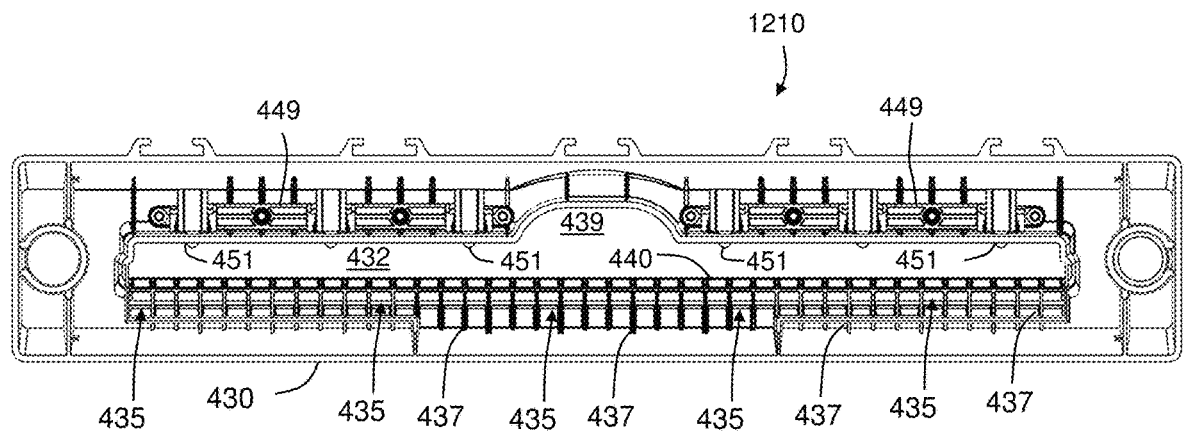

Referring now to FIGS. 15-23, another embodiment of a floor cleaning system having a bucket assembly 300 is shown. The bucket assembly 300 is similar to bucket assembly 100 of FIG. 1 and includes a trolley 308 having a plurality of wheels 310. The trolley 308 includes a pair of recesses 312 disposed on either side of a center wall 314. The recesses 312 are sized to removably receive a compartment 318. In this embodiment, the bucket assembly 300 includes only a single compartment 318. In this embodiment, the trolley 308 includes side walls 322, 324 that support the drain tray 326 and the wringing assembly 328. The wringing assembly 328 may be configured the same as wringing assembly 128 having a slot 332 that is sized to receive the mop head 104 and a blade portion 440 (FIGS. 36-38) that is positioned and configured to engage the mop pad. In one embodiment, the clip holders 333 are integrated into the trolley 308 instead of the housing 330 of the wringing assembly 328.

It should be appreciated that since the bucket assembly 300 includes only a single bucket, the recess 312 on the opposite side of the center wall 314 is open. In an embodiment, one or more accessories may be mounted to the clip holders 333. These accessories may include a first fluid container 351, a second fluid container 353, and a storage container 355 for example. In other embodiments, the clip holders 333 may be used hold tools (e.g. screwdrivers, hammers, pliers, wrenches), cleaning tools (sponges, brushes, brooms, dust pans), or cleaning supplies (e.g. wipes, mop pads, microfiber cloths, spray bottle with chemical, paper towels, soap, toilet paper, etc.), of a combination of any of the foregoing. In the illustrated embodiment, the clip holders 133, 333 includes a pair of opposing arms that define an opening. In an embodiment, the opening is a dovetail shaped and sized to receive a complementary shaped projection on a retaining device 357. In an embodiment, the clip holders and retaining devices may be the same as that described in commonly owned U.S. Pat. No. 9,216,751 entitled "Cleaning Cart", the contents of which are incorporated herein by reference. The clip holders may include a dovetail opening that receives a corresponding blade member on the accessory holder or tool.

The storage container 355 may be used for trash or debris, or to hold cleaning supplies or tools for example. In an embodiment, the storage container 355 may include an upper compartment 355a and a lower compartment 355b. It should be appreciated that the fluid containers 351, 353 may contain cleaning solutions. Such as to clean different types of surfaces for example. The containers 351, 353 may be configured to couple with the mop 102 to allow cleaning solution or fluid to be applied adjacent the mop head 104. In an embodiment, the containers 351, 353 are configured to couple with the mop 102 in the same manner as is described in commonly owned United States Patent Publication 2017/0049292 entitled "Hard Surface Cleaning and Conditioning Assemblies", the contents of which are incorporated by reference herein.

In one or more embodiments, the bucket assembly 300 may include other accessories or accessory holders as is shown in FIG. 23B-FIG. 23F. These accessory or accessory holders may include but are not limited to: a toilet bowl holder 380 and a toilet bowl brush 382, a dust pan holder 384 and a dust pan 386 and/or a broom 388, one or more bins 390, a tote or caddy 392, or a grabber device 394. In an embodiment, the accessory holders are configured to keep the accessory over or within the recess 312, such that any liquids or debris that may drip or fall off of the accessory is contained within the recess 312. Further, in still one or more other embodiments, the trolley 308 may include one or more clip holders 333 arranged on the ends of the trolley (FIG. 23C) to provide locations for additional accessories, such as container 351 for example.

Figure 24:
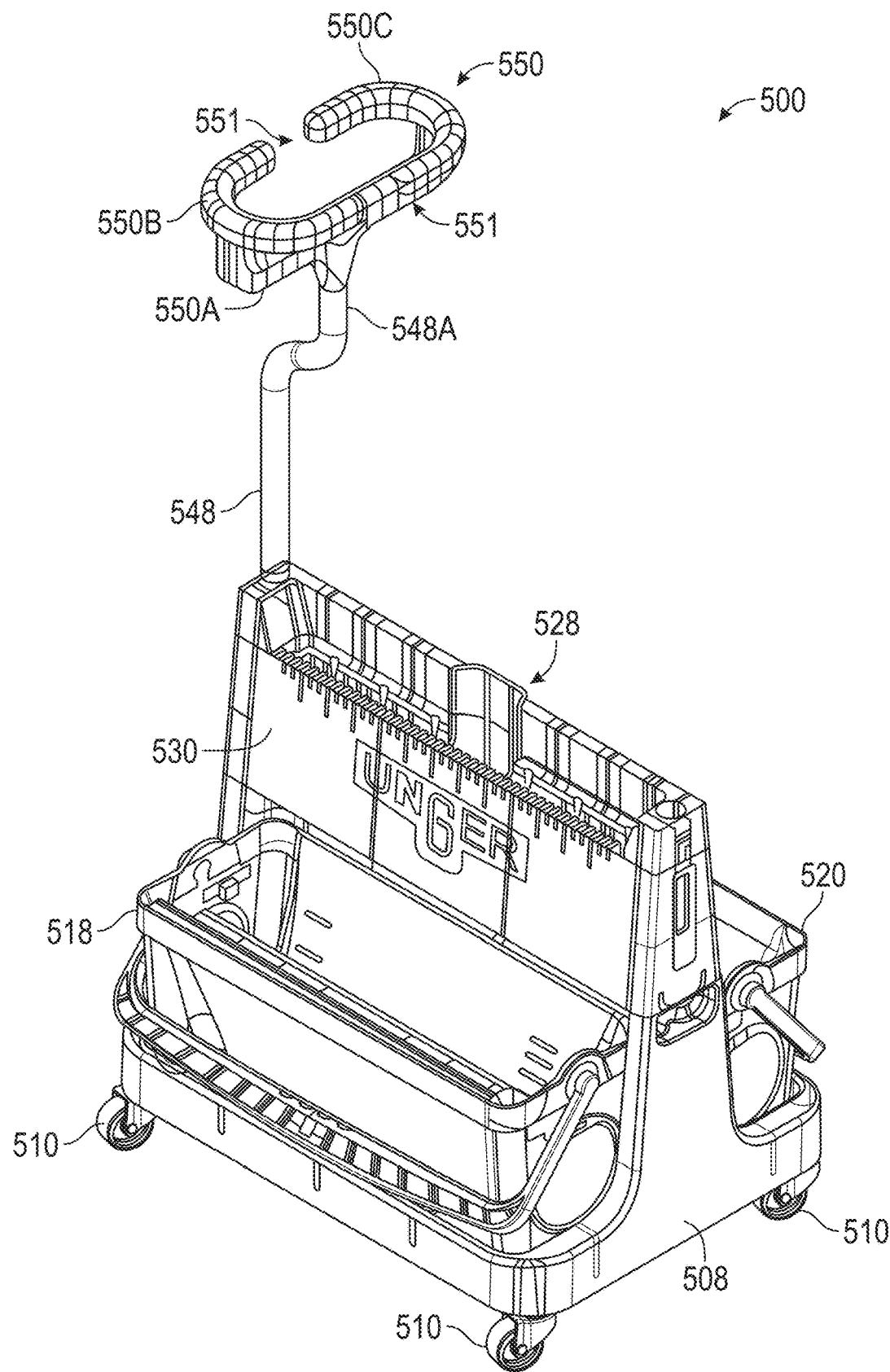
FIG. 24 is a perspective view of a bucket assembly in accordance with another embodiment.
Figure 25:
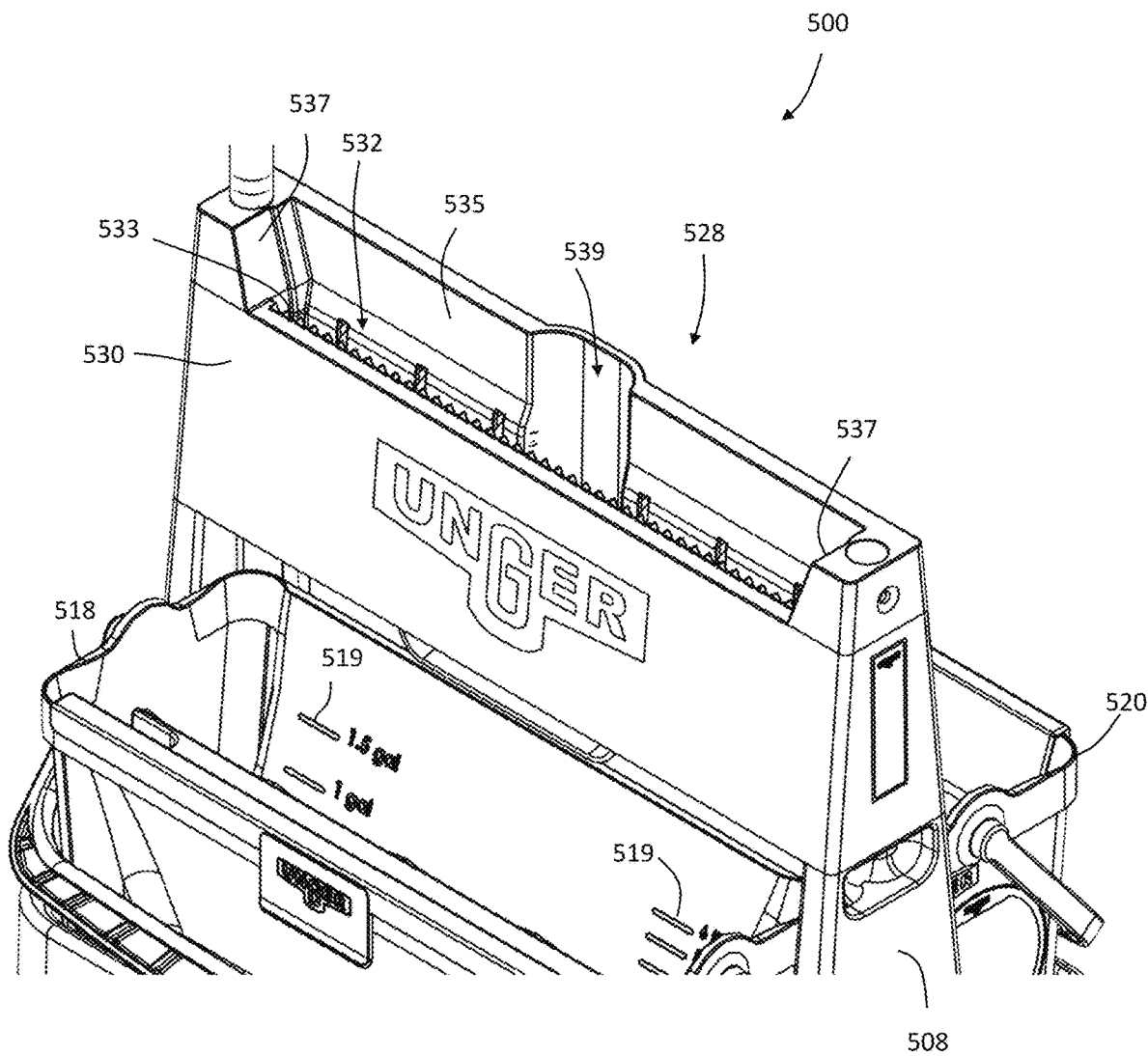
FIG. 25 is a partial enlarged view of the bucket assembly of FIG. 24.

Referring now to FIGS. 24-26, another embodiment is shown of a bucket assembly 500. The bucket assembly 500 is similar to bucket assembly 100 and bucket assembly 300 in that it has a trolley 508 having a plurality of wheels 510. The trolley 508 may be configured in the same manner as trolley 108, 308 and include a pair of recesses sized to receive a compartment 518, 520. It should be appreciated that that bucket assembly 500 may be configured in the same manner as bucket assembly 300 where the second compartment 520 is omitted to provide space to attach accessories such as brushes, brooms, bottles, dust pans, storage containers, tools, caddy, bins or a combination of the forgoing for example. In an embodiment, at least one of the sidewalls of the compartments 518, 520 includes one or more indicia 519 that indicate a volume of fluid within the hollow interior of the compartment.

Figure 26A:
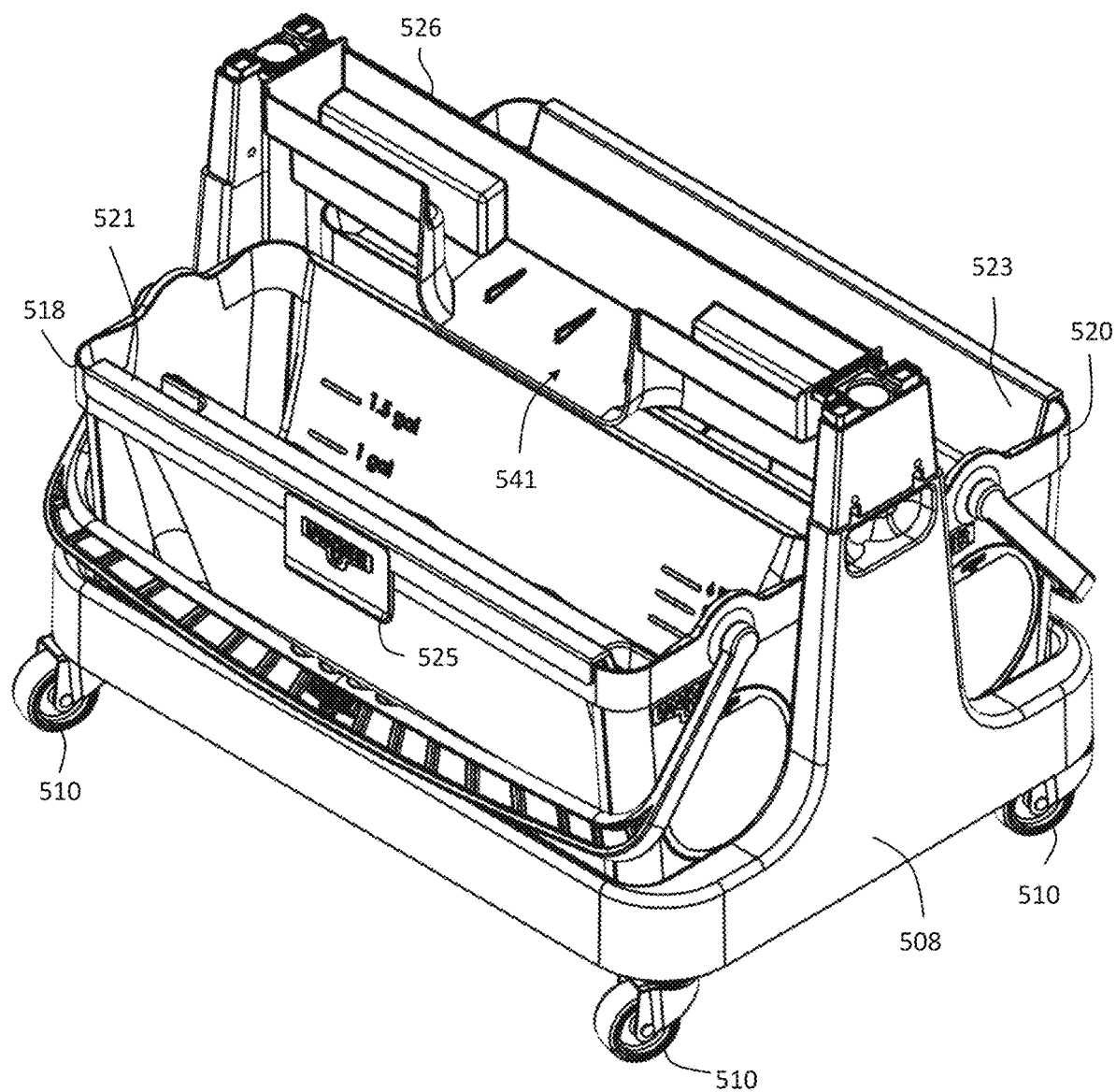
FIG. 26A is a perspective view of the bucket assembly of FIG. 24 with a portion of the wringer assembly removed.
Figure 26B:
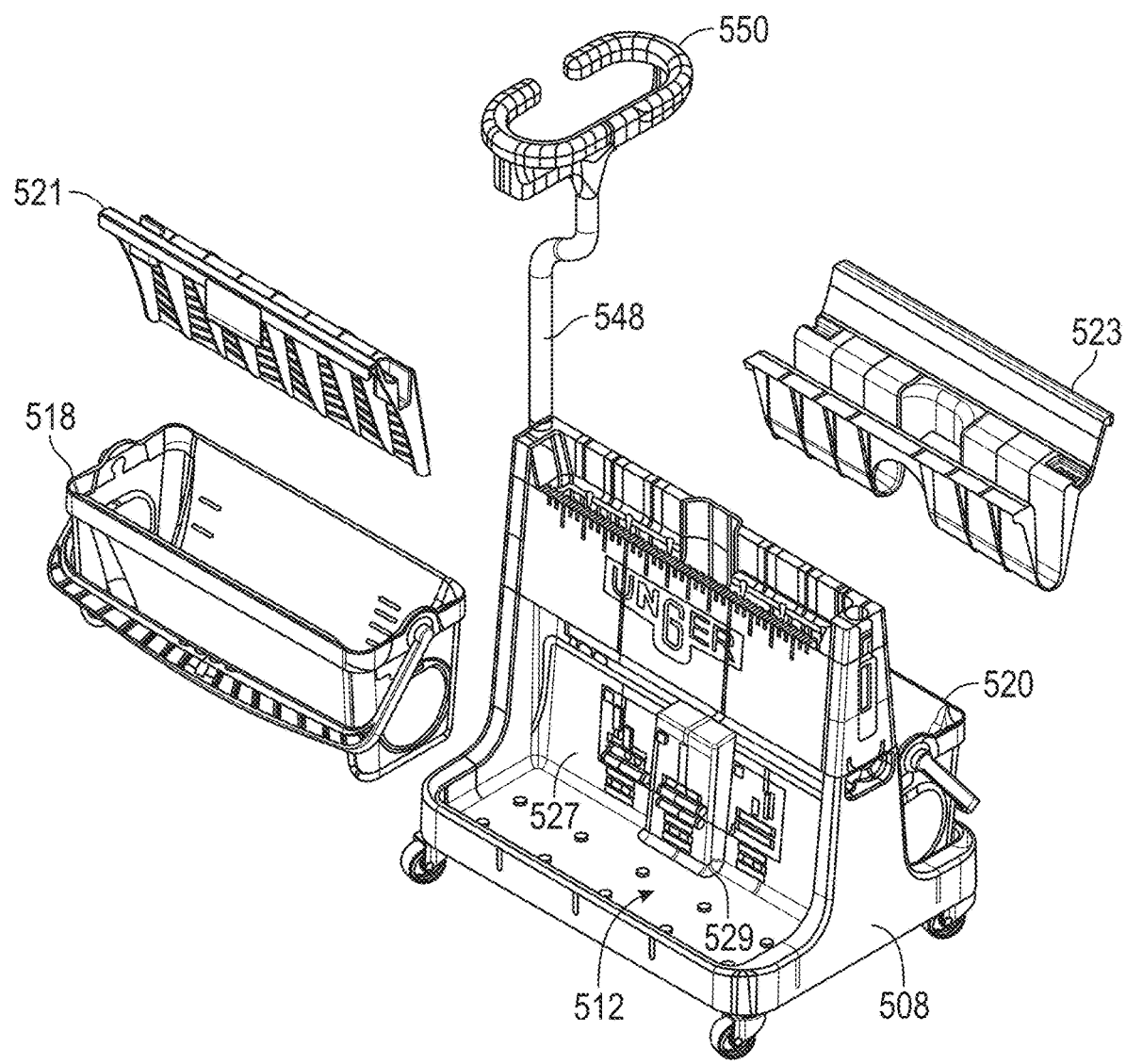
FIG. 26B is perspective view, partially unassembled, of the bucket assembly of FIG. 24.
Figure 26C:
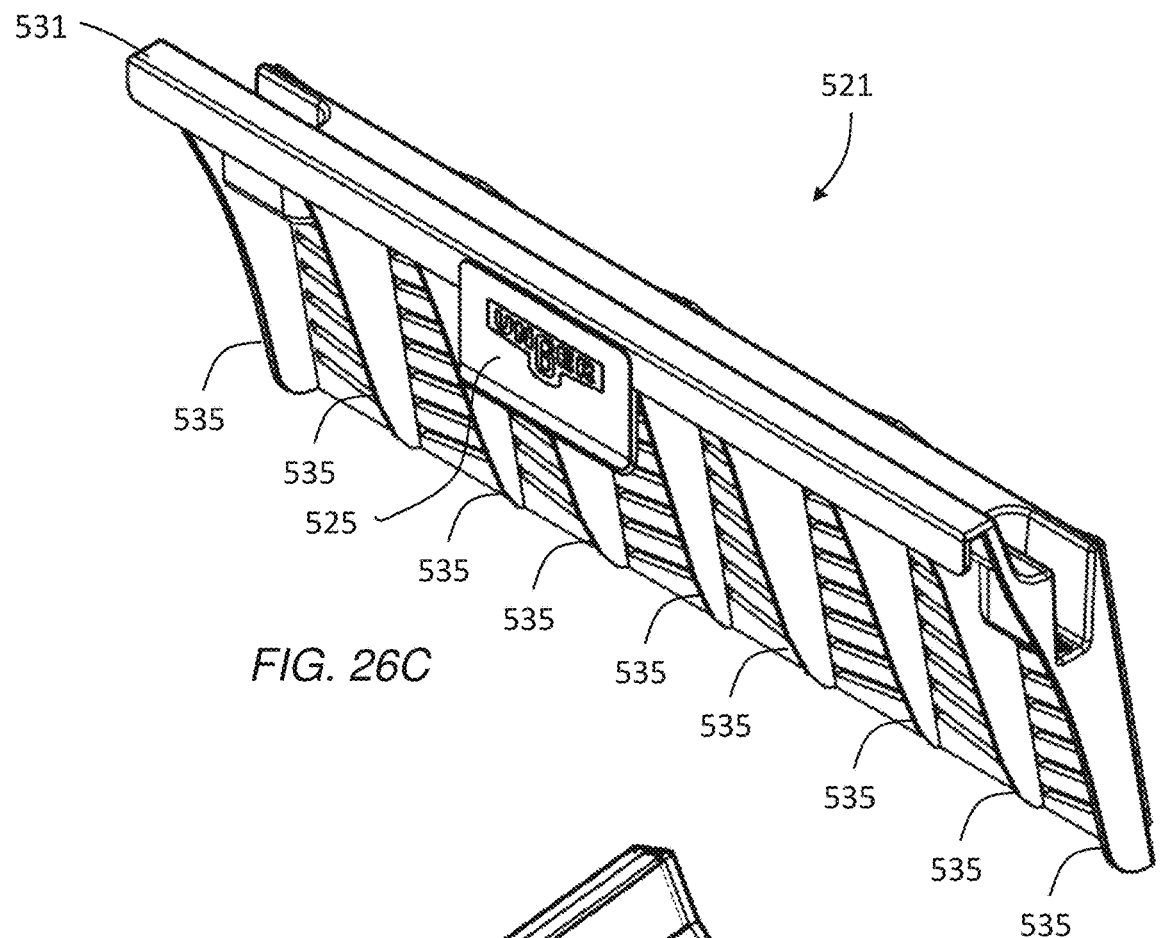
FIG. 26C and FIG. 26D are perspective views of an insert for the bucket assembly of FIG. 24 in accordance with an embodiment.
Figure 26D:
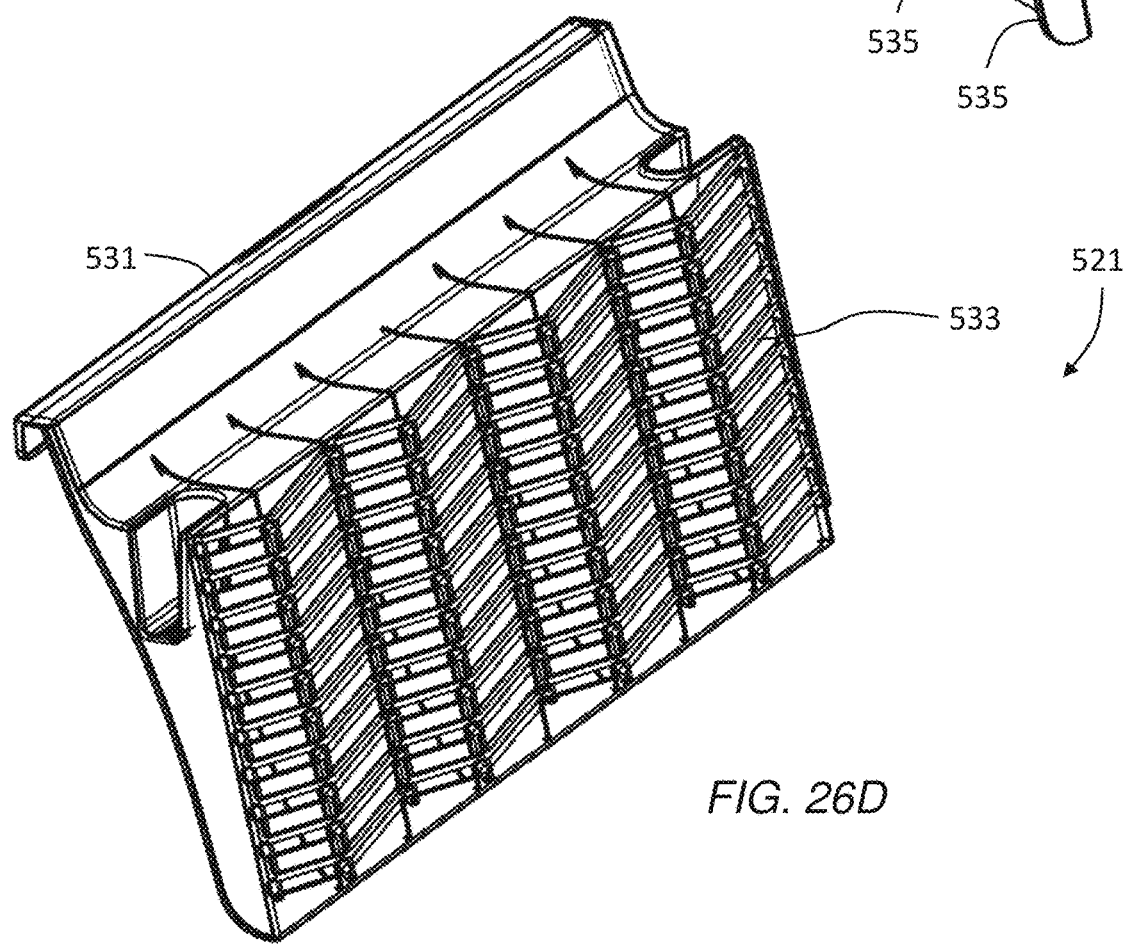
Figure 26E:
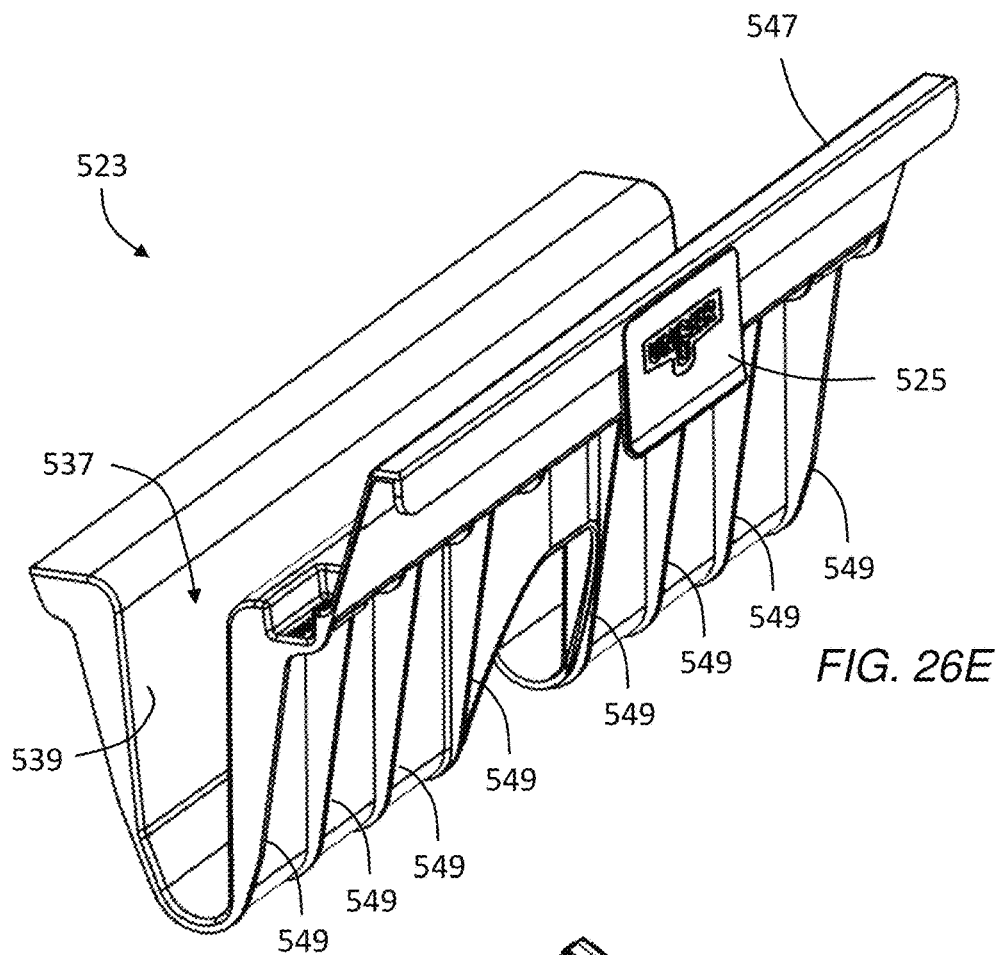
FIG. 26E and FIG. 26F are perspective views of an insert for the bucket assembly of FIG. 24 in accordance with another embodiment.
Figure 26F:
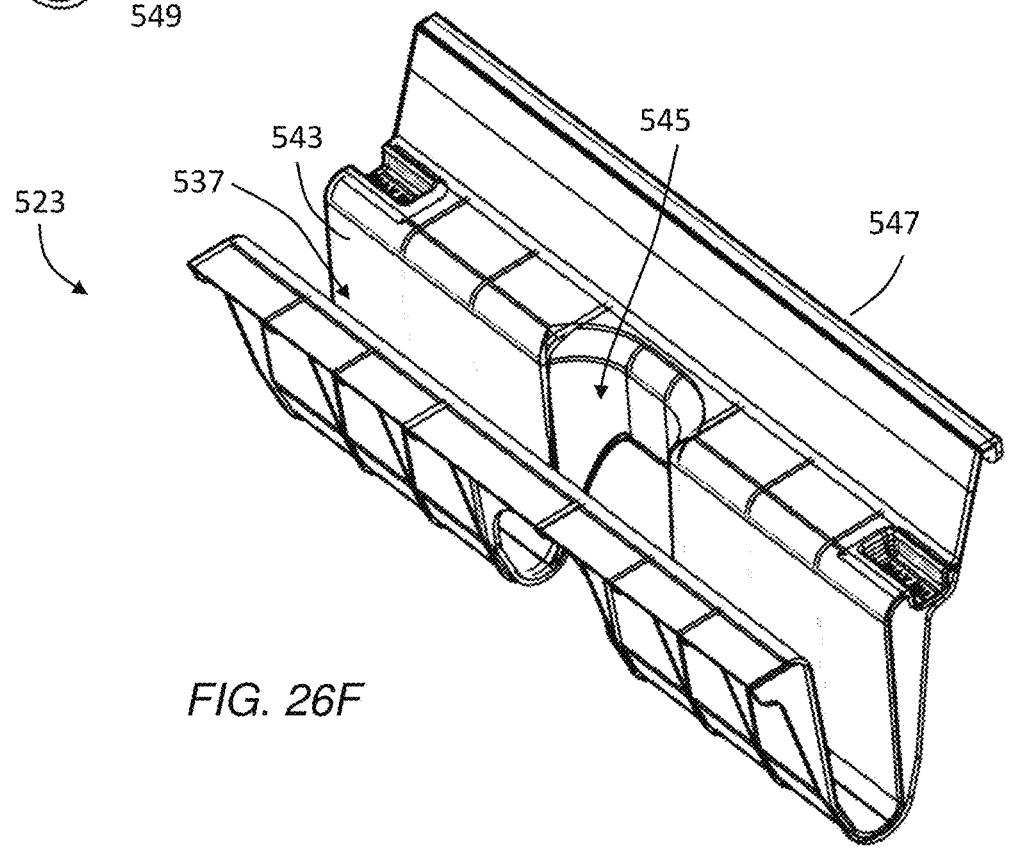

In an embodiment, each of the compartments 518, 520 include an insert 521, 523. Each of the inserts 521, 523 includes an element, such as tab 525 disposed on one side along the length of the insert. In the exemplary embodiment, the tab 525 engage the side of the compartment and couple the insert to the compartment 518, 520. In an embodiment the trolley 508 includes a center partition 527 that separates the recess portions 512. The center partition 527 includes a protrusion 529 (FIG. 26B). The protrusion 529 and the tab 525 are sized and positioned to cooperate to prevent the compartment 518, 520 from being inserted into the trolley 508 in the wrong orientation when the compartment is placed in the recesses 512. In an embodiment, when the compartment is placed in the recess 512 in the undesired orientation, the tab 525 contacts the protrusion 529 to prevent insertion of the compartment 518, 520. In this way, the features of the inserts are positioned in a desired orientation during operation of the bucket assembly 500.

In an embodiment, the insert 521 includes a u-shaped channel 531 that engages a lip of the compartment 518. In an embodiment, the insert 521 includes a washboard portion 533 that may be used to agitate the microfibers of the mop pad as is described herein. The insert 521 further includes a plurality of walls 535 that are distributed along the length of the insert 521 (and thus the compartment 518). In an embodiment, the walls 535 are disposed between the washboard portion 533 and the sidewall of the compartment 518. The plurality of walls 535 act as a baffle or suppressor of fluid movement to reduce, prevent, or inhibit the movement or sloshing of the fluid within the compartment 518.

In an embodiment, the insert 523 includes a channel or slot 537 (FIG. 26E) that is arranged parallel to the length of the insert 523 (and compartment 520). The slot 537 is defined by a pair of sidewalls 539, 543. In an embodiment the sidewall 543 includes a relief area 545. In an embodiment, the side walls 539, 543 may include slots or holes. In an embodiment, the insert 523 further includes a u-shaped channel 547 sized and shaped to engage the lip of the compartment 520. Similar to the insert 521, the insert 523 may include a plurality of walls 549 that are spaced apart along the length of the insert 523. In an embodiment, the walls 549 are disposed between the sidewall 543 and the sidewall of the compartment 520. In an embodiment, the insert 523 includes a second plurality of walls 549 disposed between the sidewall 539 and the adjacent sidewall of the compartment 520 (when the insert is installed in the compartment 520). The walls 549 act as a baffle or suppressor of fluid movement to reduce, prevent, or inhibit the movement or sloshing of the fluid within the compartment 520.

The bucket assembly 500 further includes a wringing assembly 528 having a housing 530. Coupled to the housing is a pole or post 548 having a handle 550 on an end opposite the housing 530. In an embodiment, the post 548 includes an offset portion 548A. The handle 550 may be shaped in the same manner has handle 150, 350 to allow for the securing of a mop or broom handle for example. In the embodiment of FIG. 24, the handle 550 is formed by a cross-member 550A, with a pair of opposing c-shaped portions 550B, 550C. The ends of the c-shaped portions 550B, 550C are spaced apart to define gaps 551. The gaps 551 are sized to allow a handle 106 of the mop 102 to pass therethrough. It should be appreciated that this allows the mop 102 to be secured to the bucket assembly 500 during transportation. Further, the arrangement of two opposing c-shaped portions 550B, 550C provides advantages in allowing the post 548 to be rotated 180 degrees between a first position where the offset portion 548A positions the handle 550 over the wringing assembly 528 as shown, or to a second position where the handle 550 extends beyond the side of the trolley 508. It should be appreciated that the structure for offsetting the c-shaped portions 550B, 550C of the handle 550 relative to the post 548 may be incorporated into the cross-member 550A, rather than the post 548.

In this embodiment, the housing 530 a slot 532 that is sized to receive the mop head 104. In this embodiment, the opening of the slot 532 is defined by a first wall 533, a second wall 535 and a pair of side walls 537. In an embodiment, the internal components (e.g blade, rollers) of the wringing assembly 528 may be the same as that described with respect to bucket assembly 100, 300 and as further described with reference to FIGS. 35-45. At the bottom of the wringing assembly 528 is a drain tray 526. The drain tray 526 may be configured in the same manner as drain tray 126 and include an outlet 541 that extends over the first compartment 518 to allow the extracted fluid to drained into the first compartment.

In an embodiment, the second wall 535 extends (vertically) higher than the first wall 533. In other words, the end surface of the second wall 535 is farther from the surface that the trolley 508 is resting the end surface of the first wall 533. Similarly, the sidewalls 537 may extend past the first wall 533. It should be appreciated that this defines a u-shaped opening. The first wall 533, the second wall 535 and sidewalls 537 may be tapered or angled to assist in guiding the mop head 104 into the slot 532. Providing the second wall 535 at a different height than the first wall 533 provides advantages in assisting the user in orienting the mop head 104 into the vertical position, such as when the mop pad is saturated with fluid. It should be appreciated that the different height walls are advantageous in aligning the mop head 104 in all scenarios, not just when the mop pad is saturated or partially saturated with fluid.

Figure 27A:
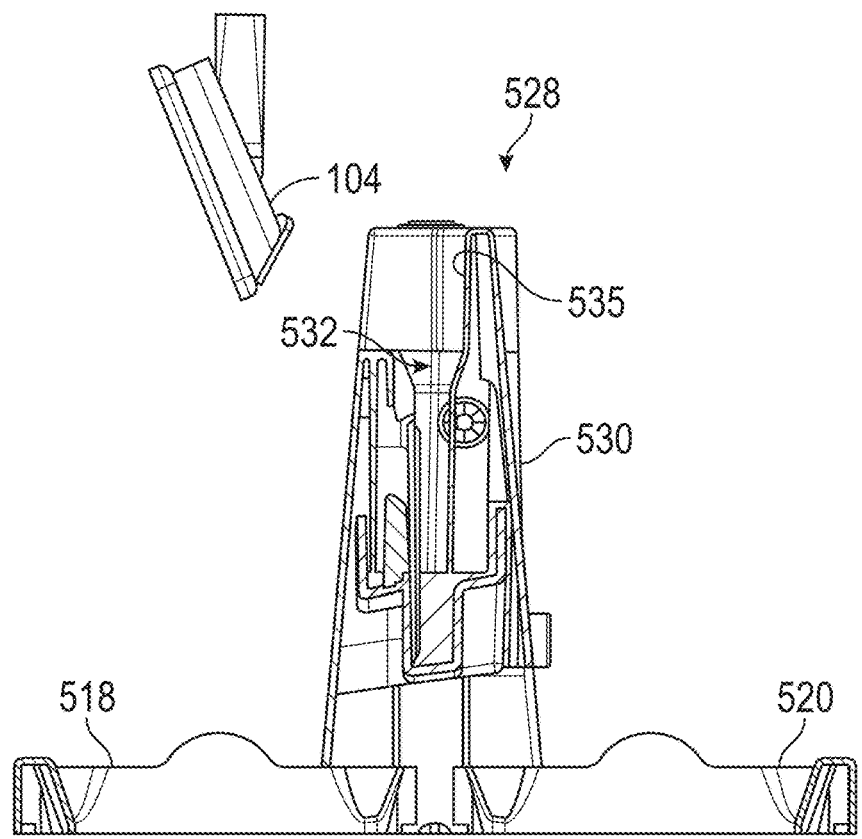
FIG. 27A-FIG. 27D are side views, partially in section, showing the alignment of the mop head with the wringer assembly in accordance with an embodiment.
Figure 27B:
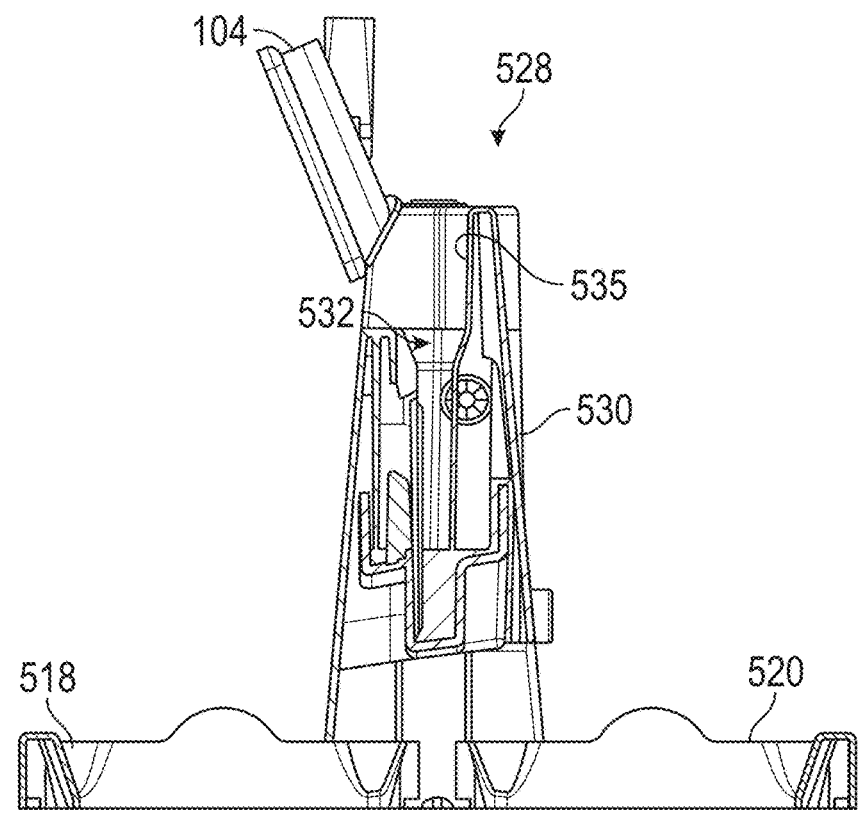
Figure 27C:
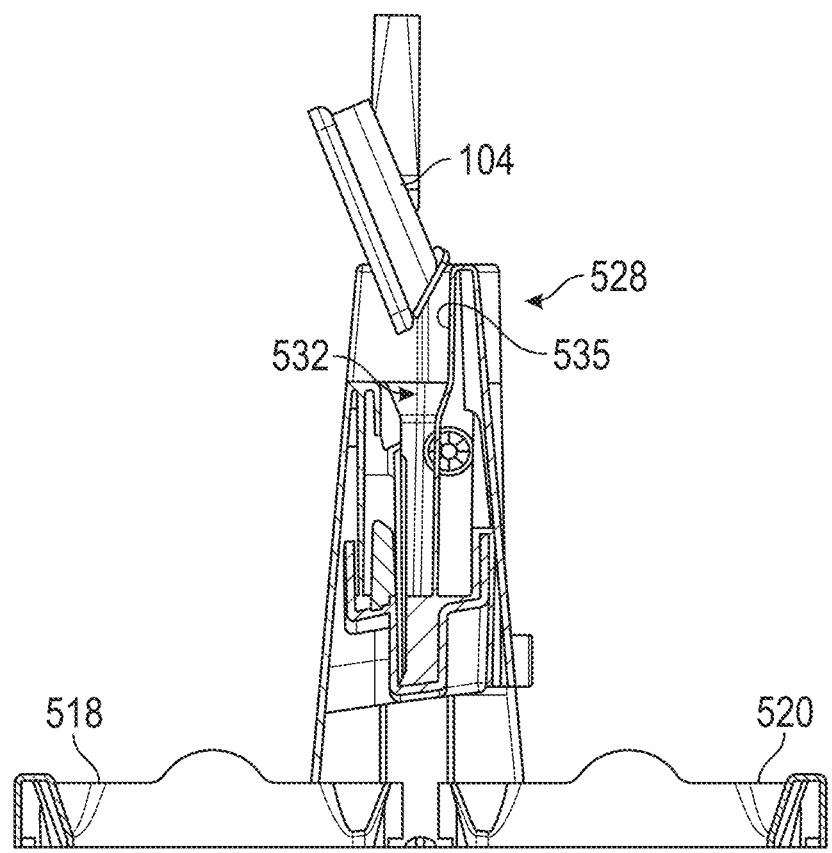
Figure 27D:
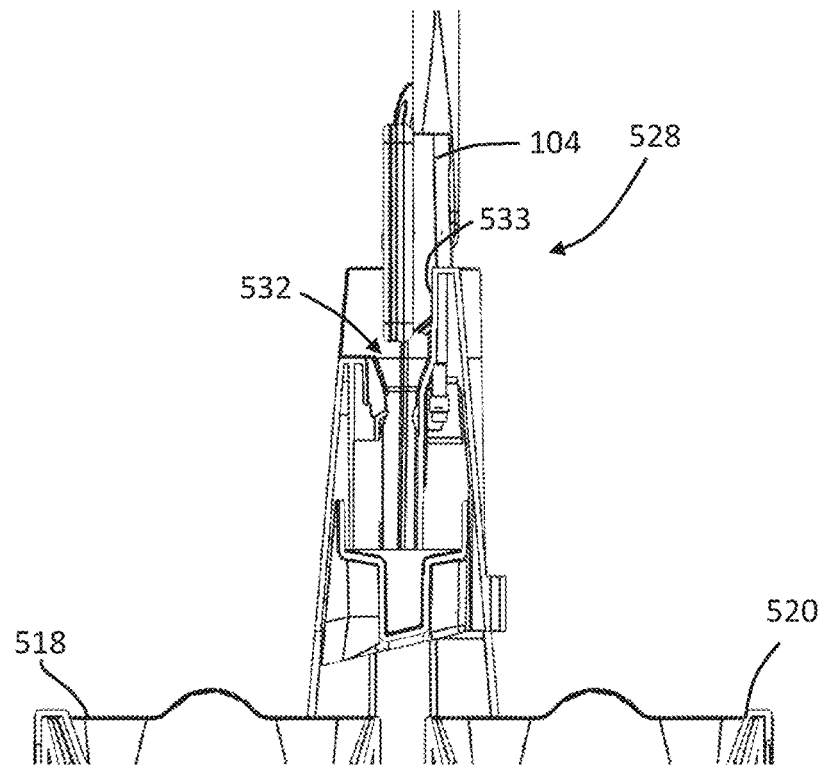

It should be appreciated that in some embodiments, when the mop pad is saturated with fluid, the weight of the fluid may overcome the biasing force of the biasing member in hinge assembly 107. As a result, when the user removes the mop head 104 from the compartments 518, 520, the mop head 104 may be angled relative to the handle 106 as shown in FIG. 27A. As the mop head 104 is moved towards the wringing assembly 528, the mop head 104 enters the u-shaped opening that that defines the entrance to the slot 532 (FIG. 27B). This movement continues until a surface on the mop head 104, contacts the second wall 535 (FIG. 27C). As the handle 106 continues to move into the relief area 539, the mop head 104 rotates to the vertical position (FIG. 27D), which aligns the mop head 104 with the slot 532.

It should be appreciated that the configuration of the walls 533, 535 and sidewalls 537 provides advantages in allowing the mop head to be automatically aligned with the slot 532 during the natural course of movement by the operator from the compartment 518, 520 to the wringing assembly 528.

Figure 28:
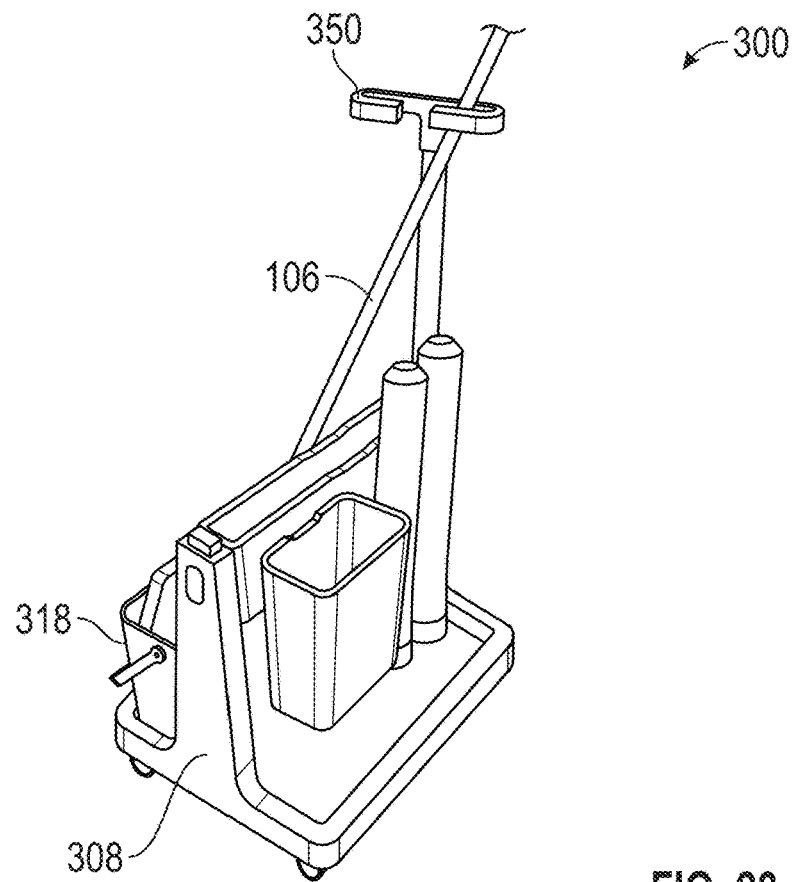
FIG. 28 is a perspective view of a bucket assembly with a set of accessory compartments in accordance with an embodiment.
Figure 29:
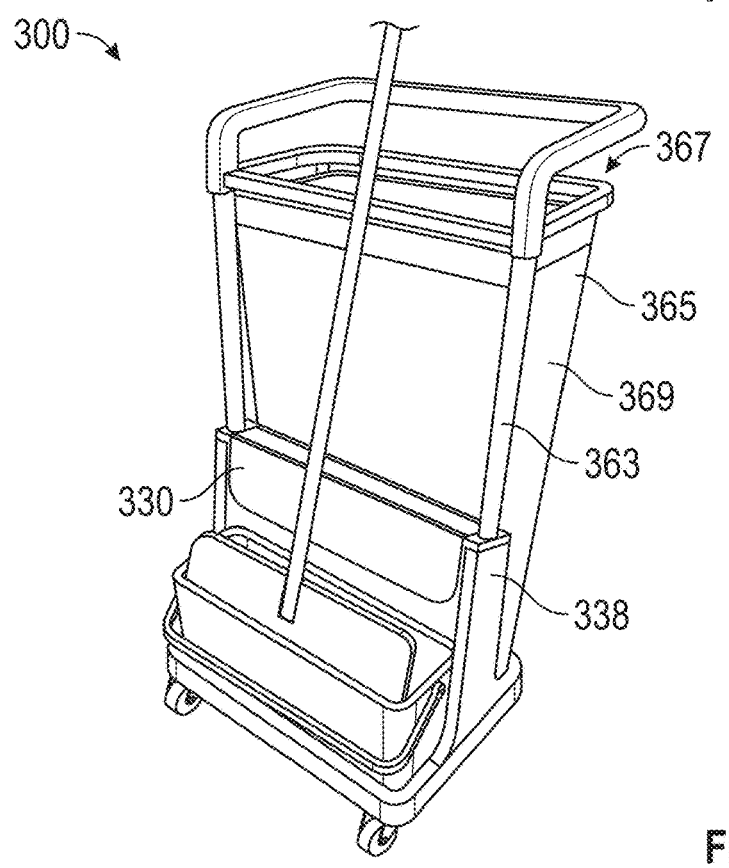
FIG. 29 is a perspective view of a bucket assembly with a trash bucket in accordance with an embodiment.

Referring to FIG. 28, an embodiment is shown of the cleaning system having the bucket assembly 300 with the mop 102 stored thereon. In this embodiment, the mop head 104 is disposed in the first compartment 318 and the handle 106 is disposed within a slot on the handle 350. As in the embodiment of FIG. 1, the handle 350 may be "C" shaped and coupled to a post 348 that is secured to the wringing assembly 328. It should be appreciated when the post 548 having the offset portion 548A is used, the handle 350 may be disposed on a more vertical orientation than is shown in FIG. 28. Referring to FIG. 29, an embodiment is shown of the cleaning system having a U-shaped handle 363 that is attached to opposite sides 338 of the wringing assembly housing 330. The U-shaped handle 363 includes a pair of posts that extend vertically from the housing 330. A u-shaped portion extends from the ends of the posts and defines a handle a at desired height from the floor that allows the user to push the bucket assembly 100, 300. In an embodiment the handle 363 may include a cross bar that includes a slot sized to receive the handle 106.

Figure 30:
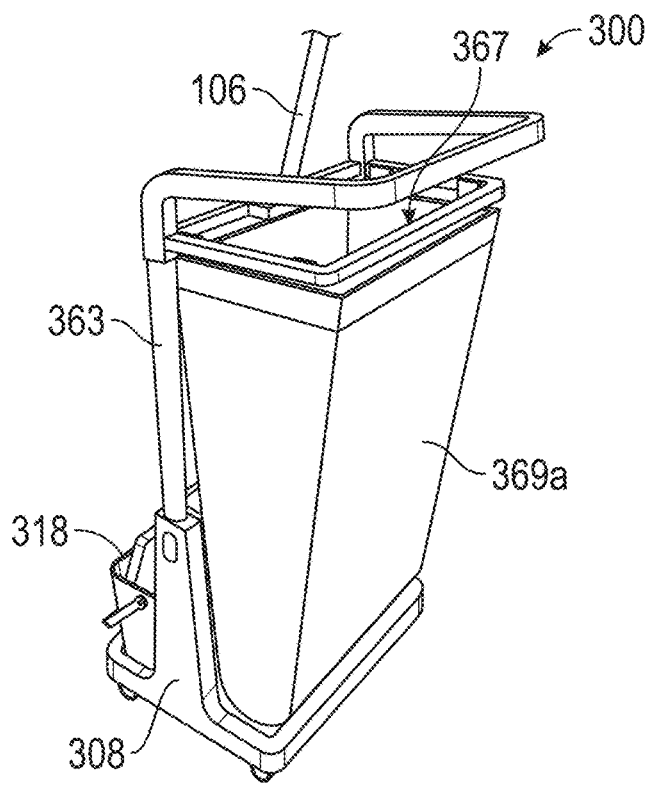
FIG. 30 is a reverse perspective view of the bucket assembly of FIG. 29 in accordance with an embodiment.
Figure 31:
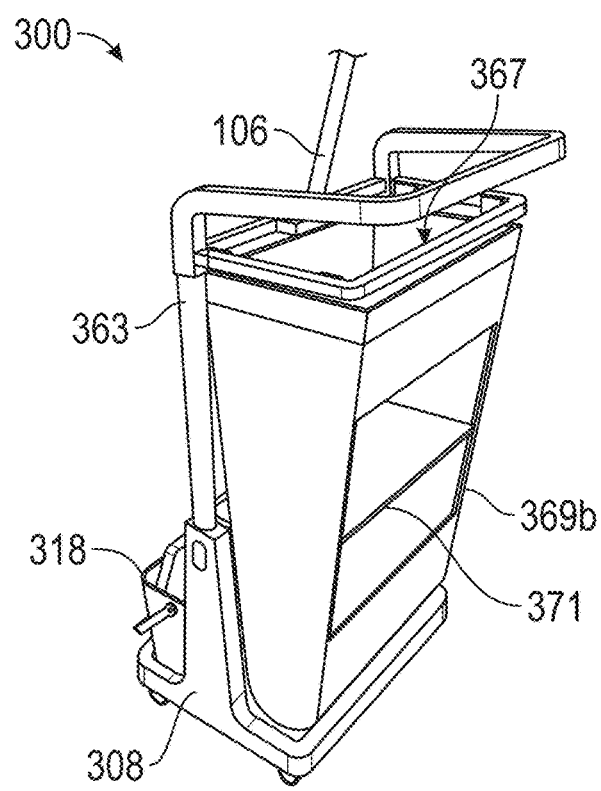
FIG. 31 is a reverse perspective view of the bucket assembly of FIG. 29 where the trash bucket includes shelves in accordance with an embodiment.

In an embodiment, coupled to the handle 363 is a receptacle 365 that includes an open end 367 and a hollow interior for receiving trash or long handled cleaning tools for example. In the illustrated embodiment, the receptacle 365 includes a body 369 that extends from the open end 367 to a bottom end disposed in the recess 312. In an embodiment, the body 369 may also attach to the clip holders 333. In one embodiment, (FIG. 30), the body 369a defines a hollow interior that extends to the bottom end. In another embodiment, the body 369b includes one or more shelves 371 that provide storage for the user, such as for cleaning supplies or tools for example.

It should be appreciated that the cleaning system disclosed herein provides advantages in allowing the user to configure the cleaning system for their application with different accessories or tools while remaining compact and mobile.

Figure 32:
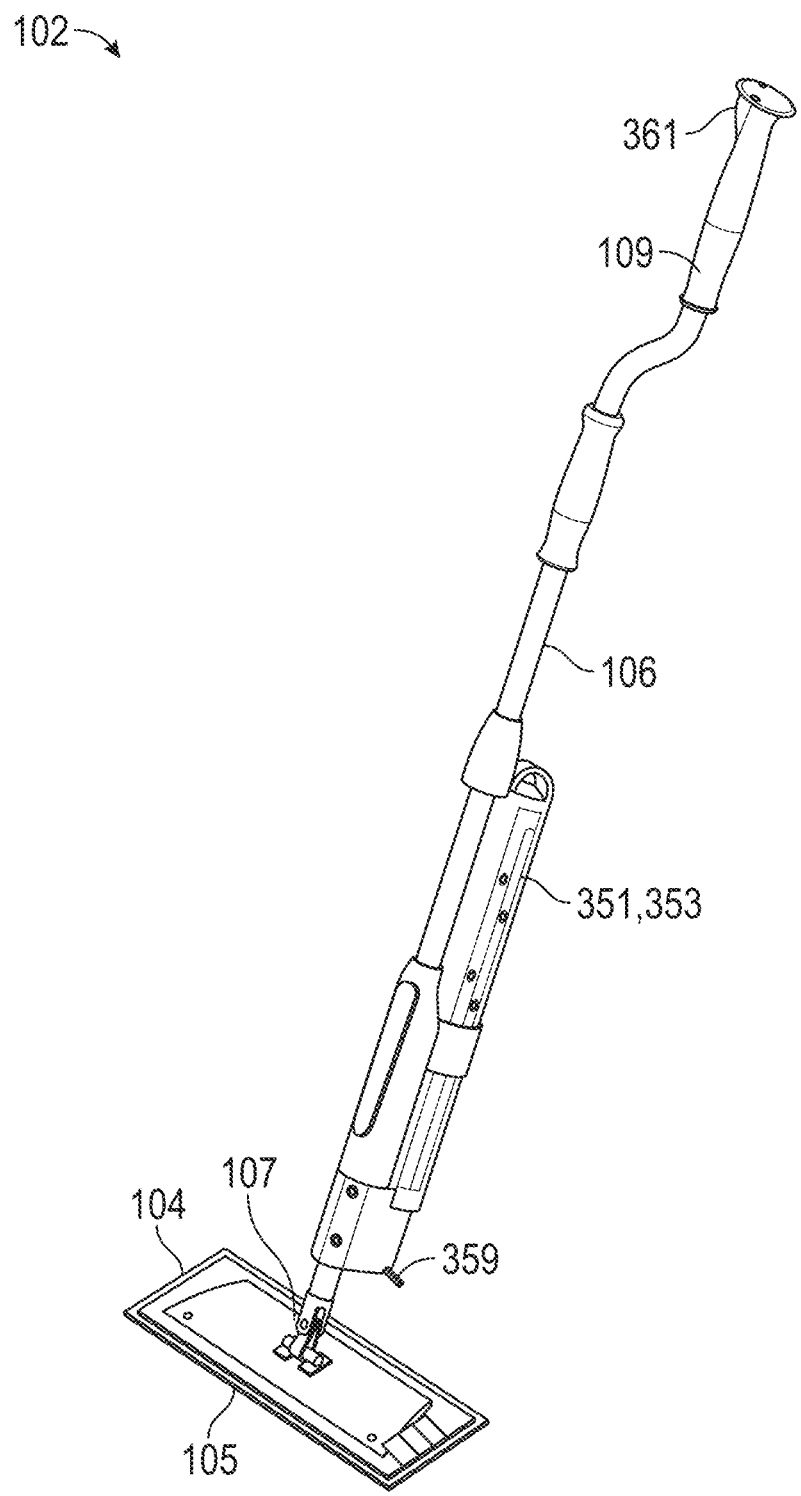
FIG. 32 is a perspective view of a mop for use with the bucket assemblies in accordance with an embodiment.
Figure 33:
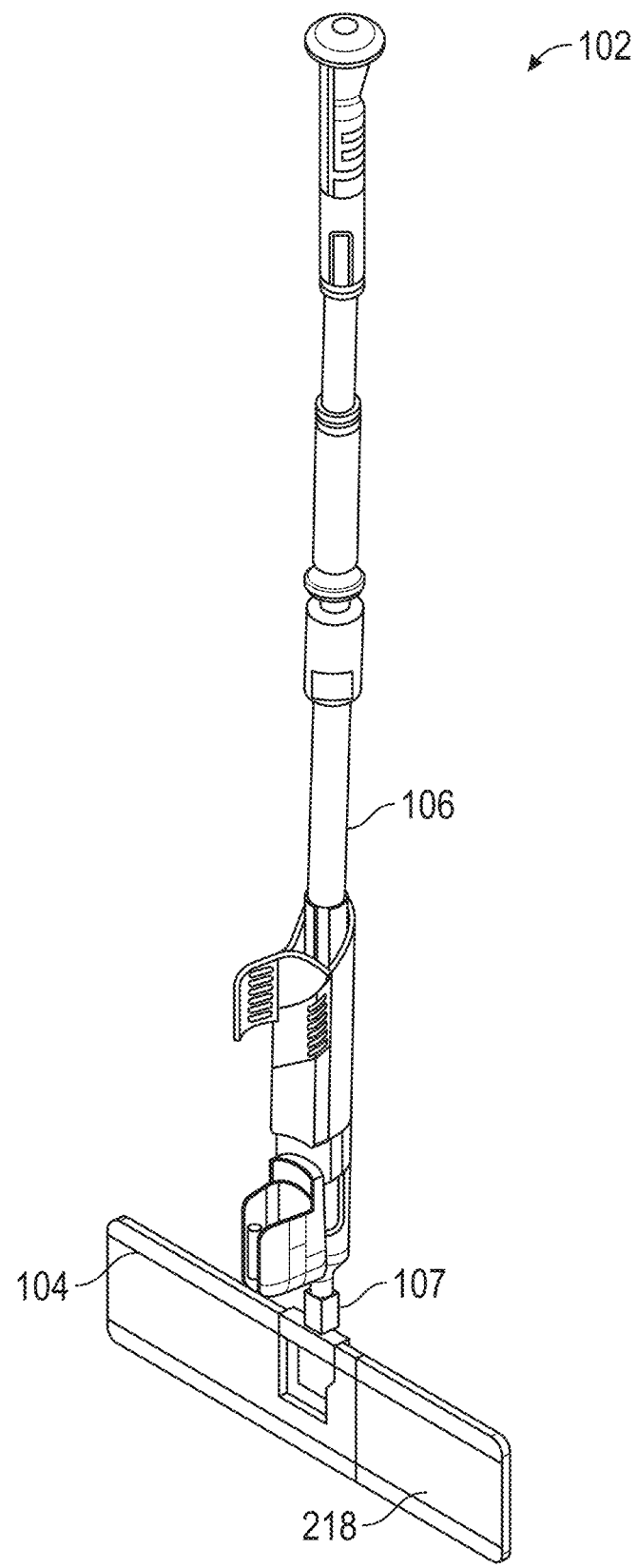
FIG. 33 is another view of the mop of FIG. 32 with the mop head in the folded position.

An embodiment of the mop 102 is shown in FIG. 32 and FIG. 33. In FIG. 28, the mop 102 is shown in the "horizontal" or operating position. In this position, the mop head 104 is positioned to place the mop pad 105 against the surface being cleaned (e.g. the floor). In an embodiment, the mop 102 may rotate in the same manner described in the aforementioned U.S. Provisional Applications 62/677,376, 62/695,486, 62/767,579, 62/795,239. In other embodiments, the mop 102 may be the same as that described in aforementioned United States patent application entitled "Flat Headed Mop" (Attorney Docket UMI0007US6). It should be appreciated that the operating position of the mop 102 places the mop head 104 on an angle relative to the pole or handle 106. In an embodiment, the angle is greater than zero degree. When the mop head 104 is folded to the position of FIG. 33, sometimes referred to as the "vertical" position, the short axis or centerline of the mop head 104 is parallel or substantially parallel with the axis of the handle 106. When in the vertical position, the mop head 104 may be placed into the slot 132, 332 for wringing.

In the illustrated embodiment, the connection or hinge assembly 107 between the mop head 104 and the handle 106 is a swivel joint, allowing the mop head 104 and handle 106 to rotate relative to each other about two axes. As discussed herein, in an embodiment, the hinge assembly 107 is the same as the aforementioned U.S. Provisional Applications 62/677,376, 62/695,486, 62/767,579, 62/795,239 or the aforementioned United States patent application entitled "Flat Headed Mop" (Attorney Docket UMI0007US6). In the illustrated embodiment, the hinge assembly 107 is configured to bias the mop head 104 to the vertical position (FIG. 33) when the mop head 104 is lifted from the surface being cleaned. Thus, the mop head 104 automatically moves to a position where it can be inserted into the slot 132, 332.

In the illustrated embodiment, the mop head 104 is what is sometimes referred to as a flat headed mop, having a microfiber mop pad 105. The mop pad 105, when moved across the surface to be cleaned, acquires dirt, contaminants, hair, fur, other debris, or a combination of the forgoing from the surface being cleaned. It should be appreciated that while embodiments herein refer to the mop pad 105 as being a microfiber or microfiber cloth, this is for example purposes and the claims should not be so limited. In other embodiments, the mop pad 105 may be made from other materials, such as but not limited to: cotton, polyester, textiles, foam materials, sponge materials, or a combination of the forgoing.

In an embodiment, the mop 102 is the same as that described in the afore mentioned United States Patent Publication 2017/0049292 and includes a swivel handle having an upper portion 109 that rotates relative to the handle 106. In an embodiment, the mop 102 may further include a container 351, 353 that is connected to a dispensing system with an outlet port 359 that dispenses fluid from the container 351, 353 adjacent the mop head 104. The activation of the dispensing system may be via an actuator, such as trigger 361. It should be appreciated that the combination of the mop 102, having a dispensing system, in combination with the bucket assembly 100, 300 provides advantages in reducing the amount of time used to clean and/or disinfect a floor. In some embodiments, the limiting parameter on how long a floor may be mopped before inserting the mop head into the compartment 118, 318 and wringing in the wringing assembly 128, 328 is the amount of fluid in the mop pad 105. In some embodiments, the amount of fluid being released by the mop pad 105 will fall below a desired level before the mop pad 105 is dirty. This may occur, for example, in a hospital or medical environment where the disinfecting functionality is desirable. When the amount of disinfecting agent in the mop pad 105 is below a threshold, the disinfection function of the mopping may be inhibited. In this embodiment, the disinfecting solution may be contained within the container 351, 353 and dispensed during the mopping operation. As a result, the amount of steps and time the user spends mopping relative to cleaning/wringing in bucket assembly 100, 300 may be increased, thus embodiments disclosed herein reduce labor costs associated with cleaning an environment (e.g. a surgical center or operating room).

Figure 34:
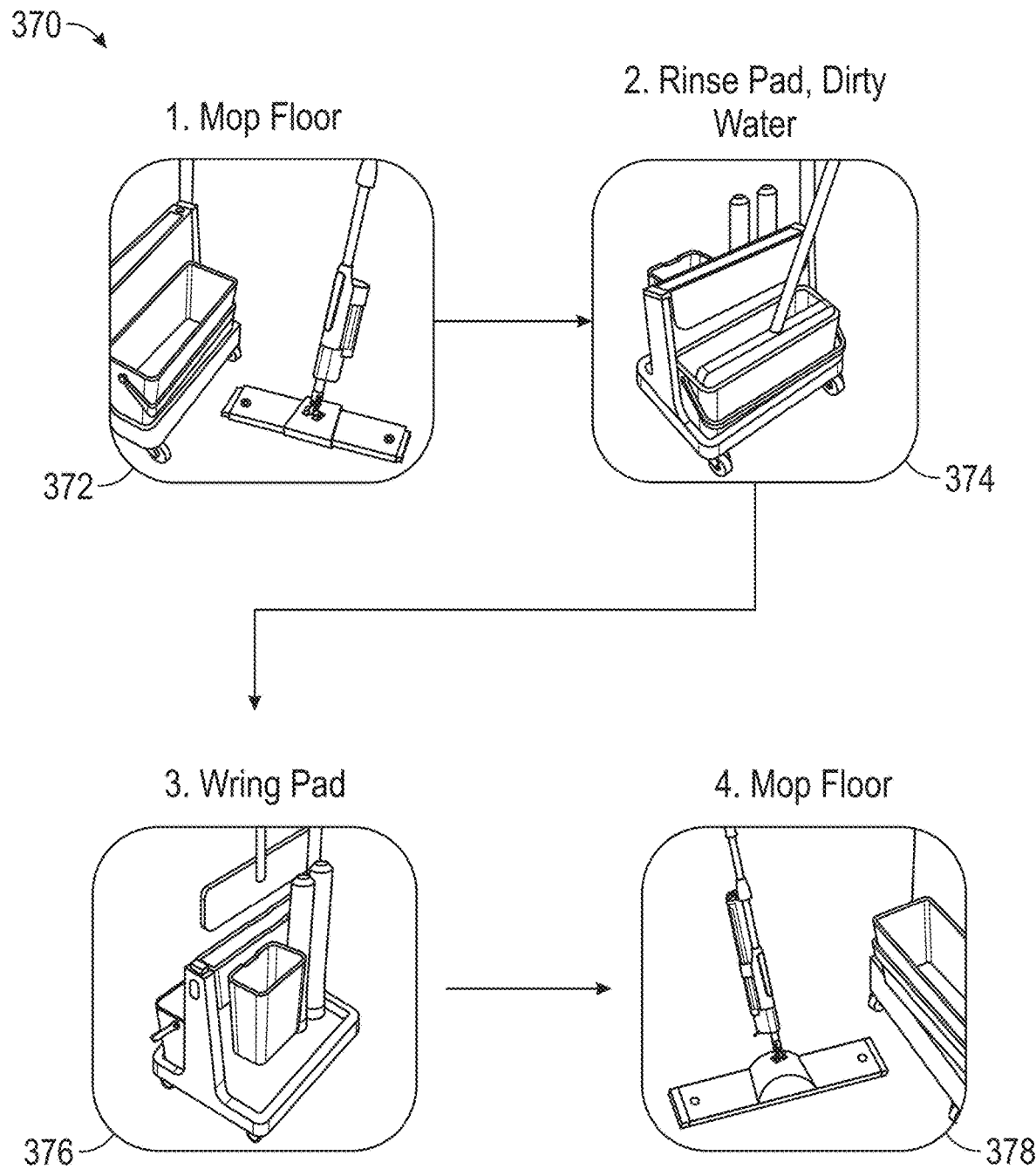
FIG. 34 is a flow diagram of a method of cleaning a floor using the bucket assemblies in accordance with another embodiment.
Figure 35:
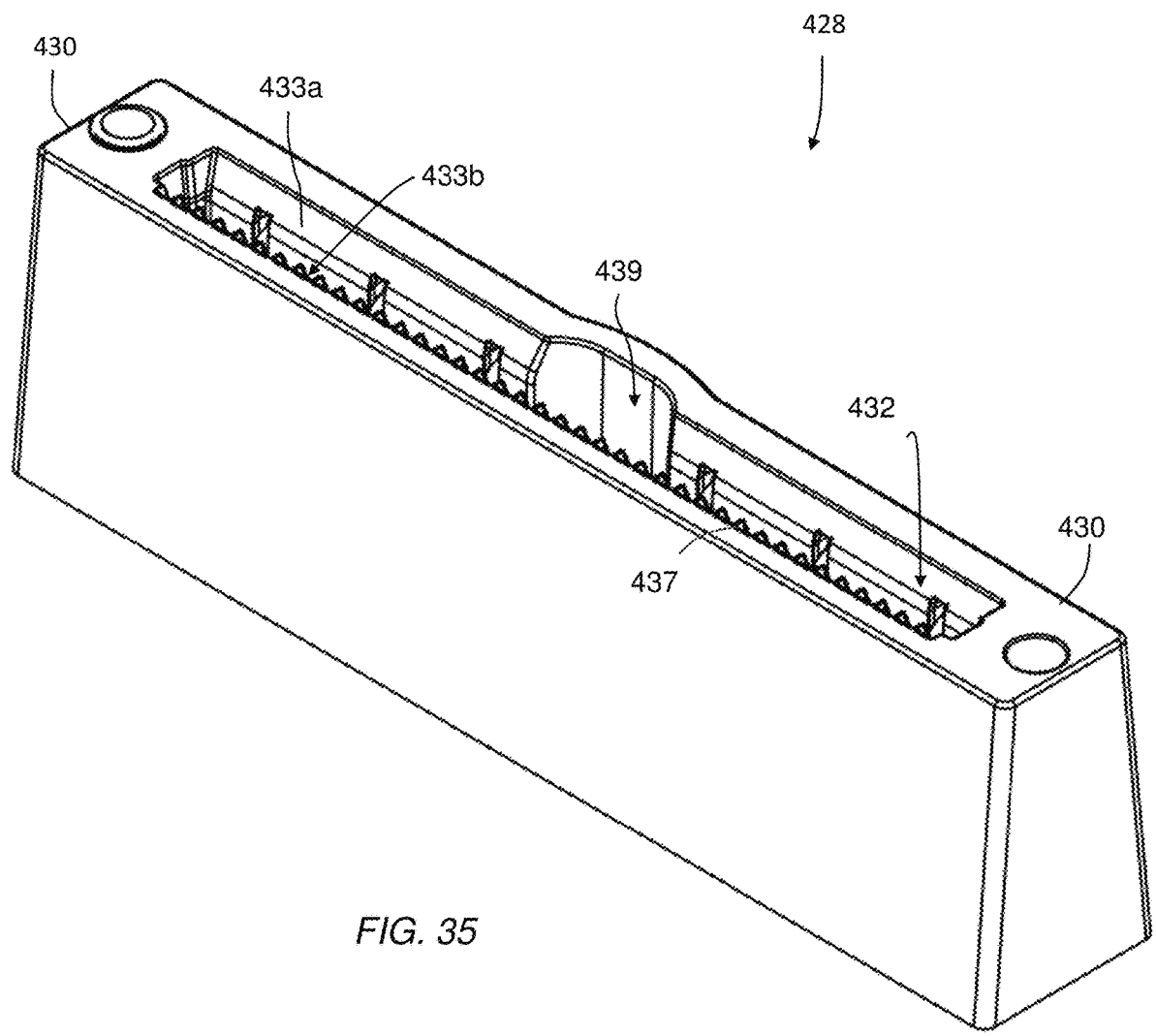
FIGS. 35-45 are various views of a wringing assembly for use with the bucket assemblies with movable rollers and an integrated fixed wringing blade in accordance with an embodiment.

Referring now to FIG. 34, a method 370 is shown for cleaning a floor with the cleaning system that includes the bucket assembly 300. The method 370 begins in block 372 where the user mops the floor or surface to be cleaned by moving the mop head 104 and mop pad 105 across the surface. When the mop pad 105 becomes dirty, the method 370 proceeds to block 374 where the user inserts the mop head 104 into the compartment 318 that includes a fluid, such as fluid, a chemical cleaning solution, or a combination of the forgoing. The user engages the mop pad 105 against the cleaning element to agitate the microfibers and release the dirt or other contaminants therefrom. The method then proceeds to block 376 where the user inserts the mop head 104 into the wringing assembly 328 to extract fluids from the mop pad 105. The extracted fluids flow along a fluid path via the wringing assembly 328 and drain tray 326 into the compartment 318. The method 370 then proceeds to block 378 where the user continues cleaning the surface. These steps may be repeated until the user has completed cleaning floor.

Referring now to FIG. 35-38, an embodiment is shown of a wringing assembly 428 that may be used on the bucket assembly 100, 300, 500. The wringing assembly 428 includes a housing 430 that includes a slot 432. The wringing assembly 428 and the slot 432 are in fluid communication with the first compartment 118, 318, 518 similar to the embodiment of FIG. 1, FIG. 15, and FIG. 24.

Figure 38:
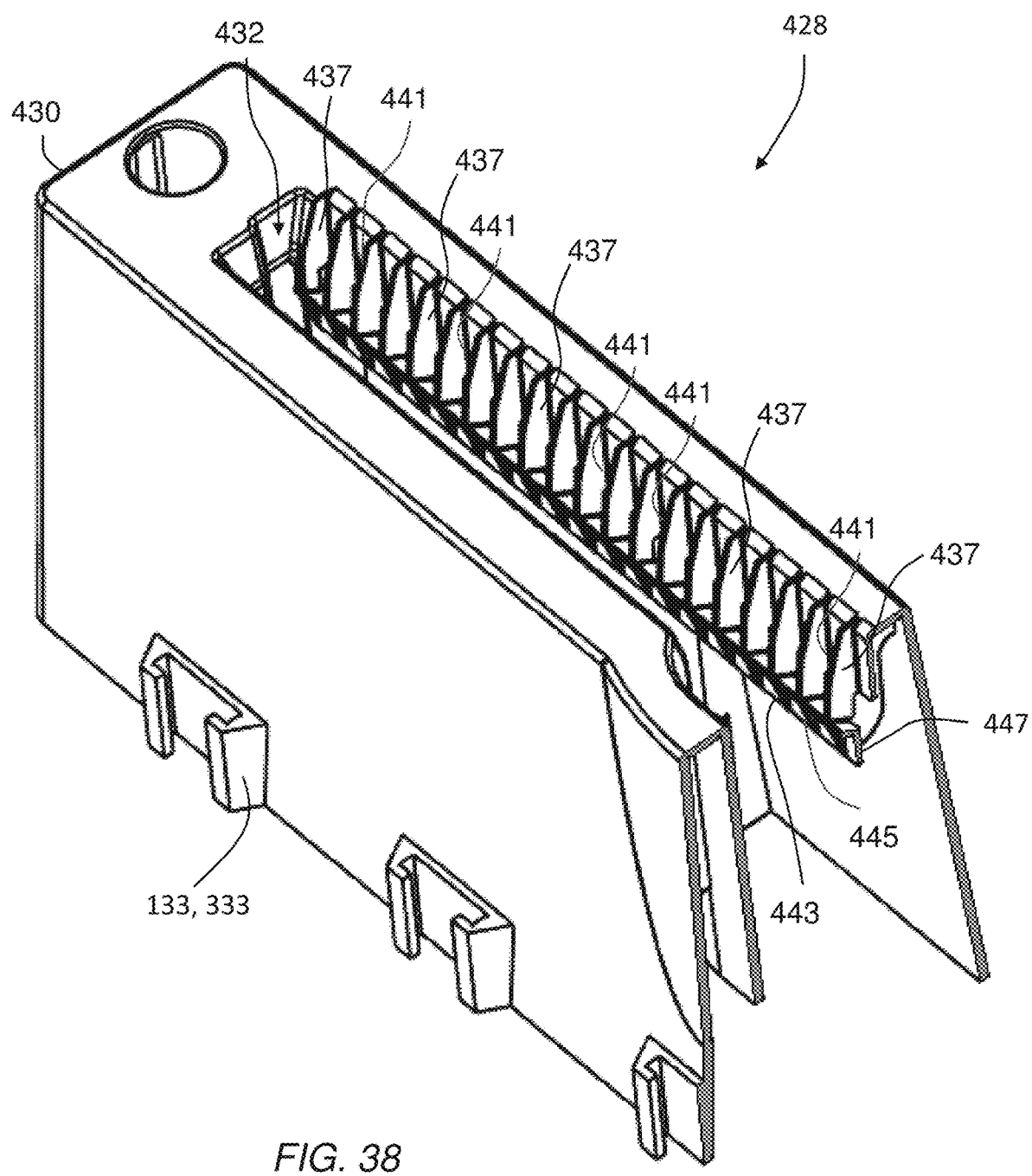
Figure 39:
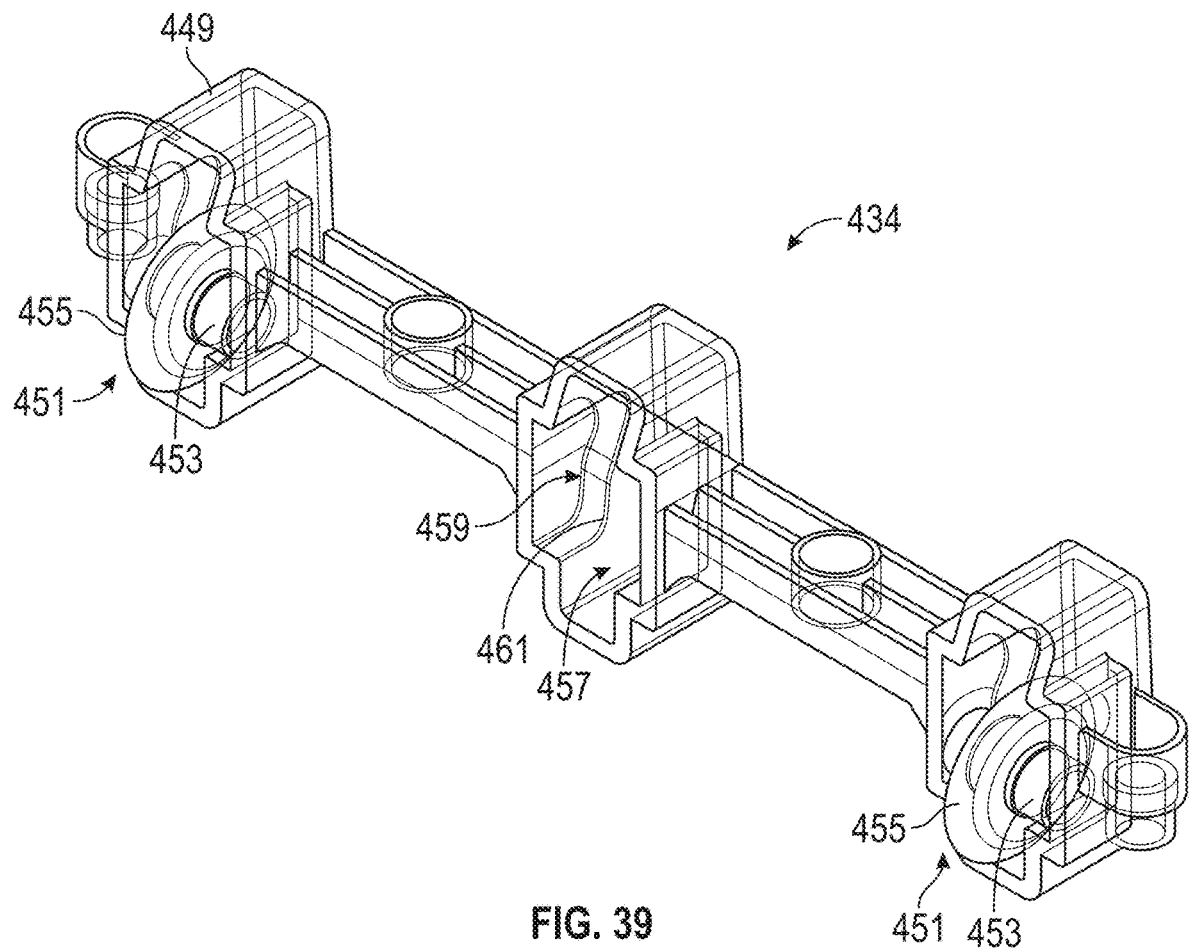
Figure 40:
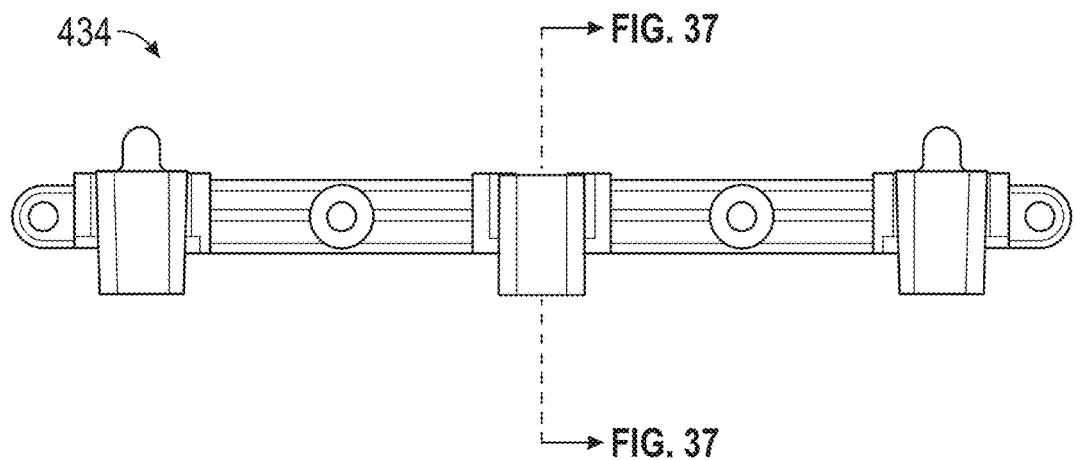
Figure 41:
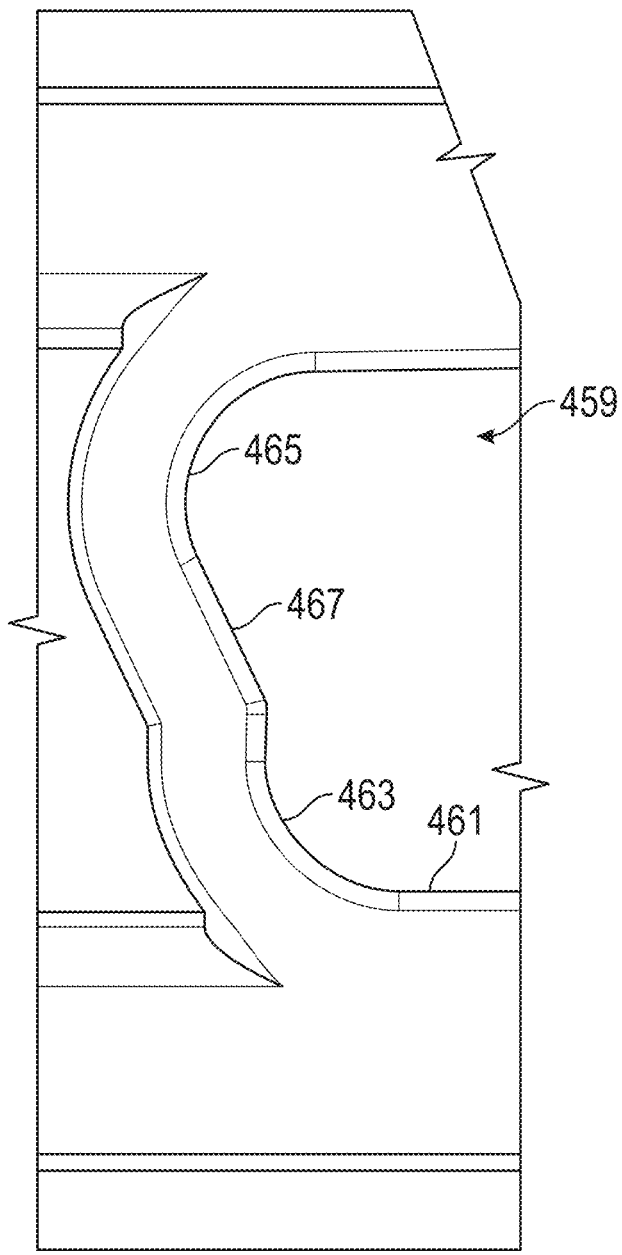

The housing 430 that includes a slot 432 having a pair of lead-in portions 433a, 433b. In the illustrated embodiment, the second lead-in portion 433b (FIG. 42) is defined by surface 435 (FIG. 36) on a plurality of ribs 437. In an embodiment, the slot 432 further includes a relief area 439 that provides clearance for the mop handle as the mop head is inserted into the slot 432. As will be discussed in more detail herein, the housing 430 includes a fixed integrated blade or extractor element 440. In an embodiment, the blade 440 is supported by the plurality of ribs 437. Each pair of the plurality of ribs 437 define a slot 441 (FIG. 38). As will be discussed in more detail herein, the slots 441 provide a flow path for the fluid extracted by the blade 440 from the mop pad.

In an embodiment, the blade 440 further includes a plurality of second ribs 443 (FIG. 38) disposed on an opposite side of the edge 445 from the plurality of ribs 437. The second plurality of ribs 443 define openings that allow fluids to flow therethrough. In an embodiment, each of the plurality of second ribs 443 are aligned with one of the plurality of ribs 437. The ribs 443 may be supported by a wall 447 that in some embodiments extends substantially parallel to the slot 432 or perpendicular to blade edge 440. The ribs 443 are angled away from the edge 445 such that a first end adjacent the edge 445 is closer to the centerline of the slot than the opposite end. In some embodiments function as a lead-in surface/element to slowly compress the mop pad as the mop head assembly is withdrawn from the wringing assembly 428. This further provides advantages in reducing the forces on the connection between the mop pad 105 and the mop head 104. In some embodiments, the blade 440 is positioned within the slot 432 so that as the user pulls upward on the mop head 104 from the slot 432, the mop pad 105 will disengage from the blade 440 while the mop head 104 is still at least partially within the slot 432. It should be appreciated that this allows the user to thereafter reverse the movement of the mop head into the downward direction without removing the mop head from the wringing assembly. This provides advantages in maintaining the mop head in the desired orientation during multiple wringing operations.

It should be appreciated that the integrated blade 440 is advantageous in reducing manufacturing costs and assembly time. In some embodiments, the integrated blade 440 may provide further advantages in strength and stiffness and may also be more precisely positioned relative to the slot 432.

The wringing assembly 428 further includes at least one roller assembly 434. In the illustrated embodiment the wringer assembly includes two roller assemblies 434 that are coupled to the housing 430 and disposed on opposite sides of the relief area 439. In an embodiment, each roller assembly 434 consists of a frame 449 and one or more rollers 451. The frame 449 may be secured to the housing 430 by at least one fastener for example. In one embodiment, the frame 449 is disposed on an angle relative to the blade 440. The angle of the frame 449 is selected to dispose the rollers 451 on a tangent to the surface of the cover of the mop head for example. As a result, in this embodiment the rollers 451 are offset to each other relative to the slot 432. It should be appreciated that while the roller assemblies 434 are shown and described as being in pairs, this is for exemplary purposes and the claims should not be so limited. In other embodiments, the frame may have a single roller and the wringer assembly includes a single roller on each side of the relief area 439. In still further embodiments, the wringer assembly may have a single long roller that extends along a substantial portion of the length of the slot 432.

In an embodiment, the rollers 451 are movably coupled to the frame 449. In an embodiment, each roller 451 includes an axle 453 (FIG. 39) on either side of a wheel 455. It should be appreciated that in the embodiment of FIG. 39, the frame 449 is configured to have three rollers 451, however the center roller is omitted for clarity. The axles 453 define the axis of rotation for the wheel 455. The frame 449 includes a pair of slots 457, each one sized to receive one of the rollers 451. Each slot 457 includes a pair of recesses 459 disposed on either side of the slot 457. The recesses 459 are sized to receive the axles 453 such that the axles 453 can rotate freely therein.

Figure 42:
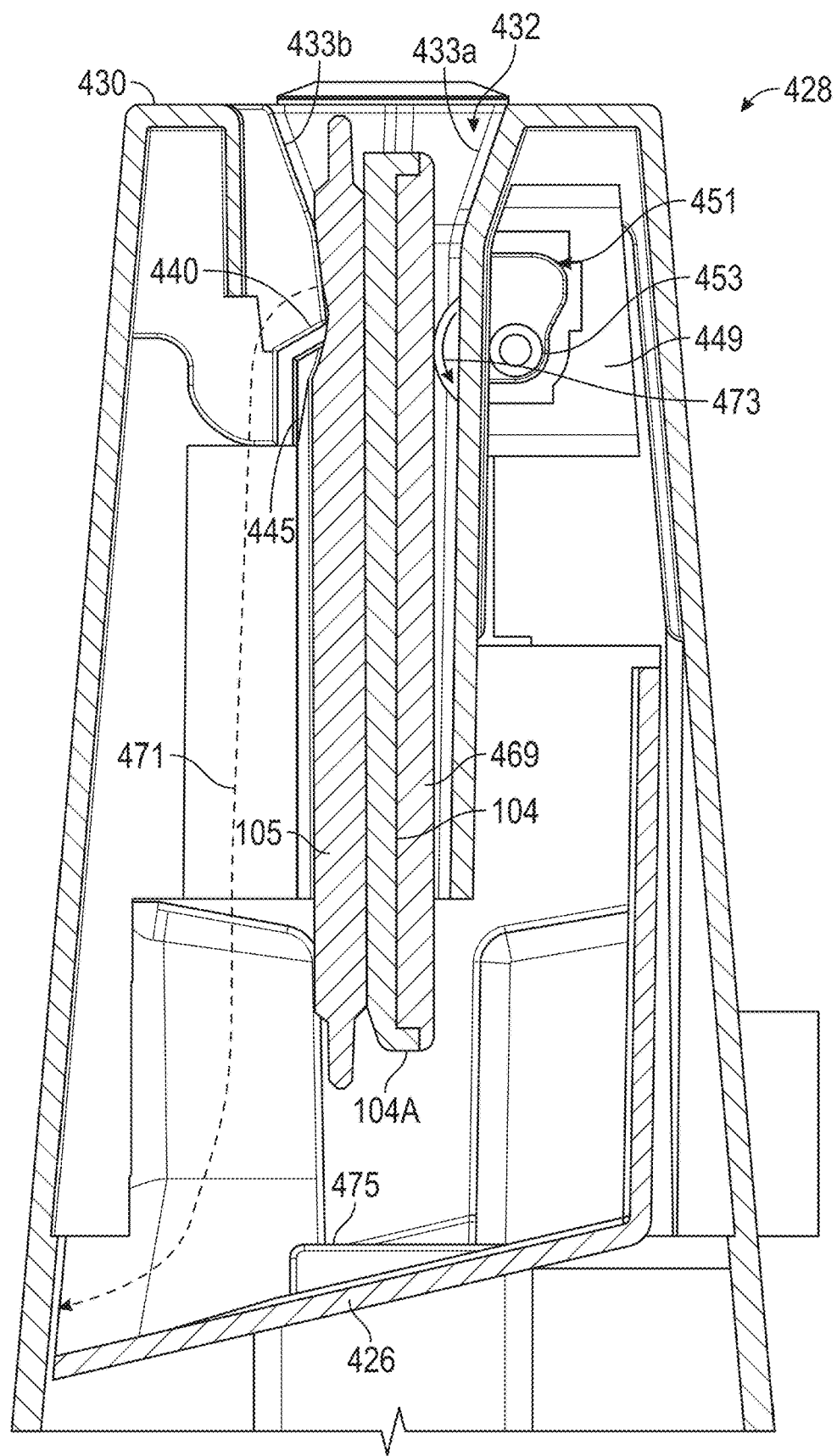
Figure 43:
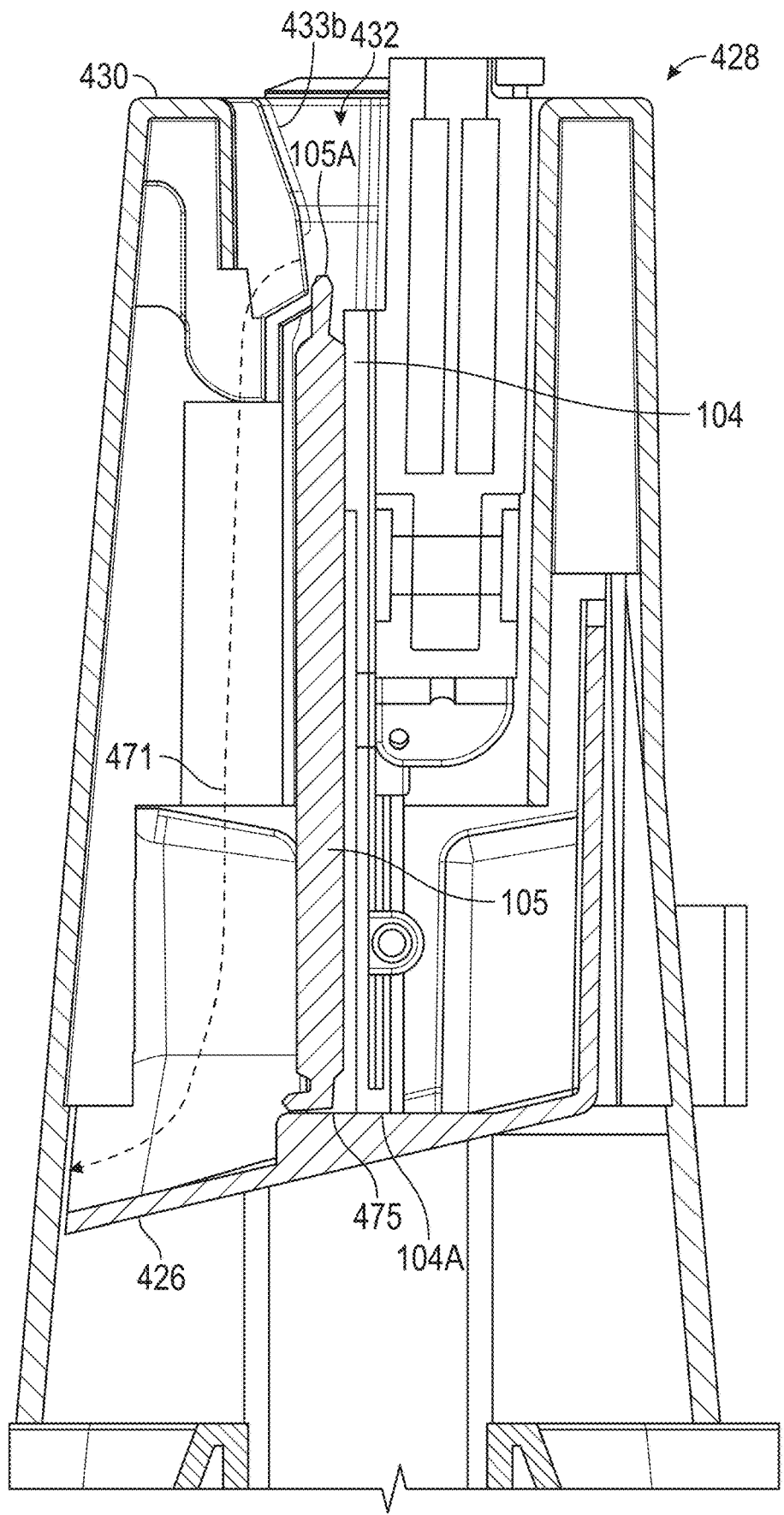

In the illustrated embodiment, the recesses 459 are defined by a wall 461. The wall 461 includes a first rotation area 463 and a second rotation area 465 with an angled portion 467 therebetween. In operation, the rollers 451 rotate about their axis in the first rotation area 463 as the mop head is inserted into and moved through the slot 432 (FIG. 42). As the mop head is withdrawn from the wringer assembly 434, the rollers 451 move to the second rotation area 465 and rotate about their axis on this location (FIG. 42). Without being constrained or bound to any theory, the rollers 451 move from the first position at first rotation area 463 to a second position at second rotation area 465 due to the frictional contact between the mop head cover and the wheels 455.

Referring now to FIGS. 42-45, the operation of the bucket assembly 100, 300, 500 to wring, remove, or extract a fluid from a mop 102 having a mop head 104 with a mop pad 105 attached thereto. It should be appreciated that while the example of FIG. 42-45 is shown and described with reference to a wringing assembly housing 430, the housing 430 may be configured in the same manner as housing 530 and have a u-shaped opening that guides the mop head 104 into the desired vertical alignment with the slot, such as when the mop head 104 is angled due to a saturated mop pad. Thus, it is easier for the end user to align the mop to the slot The mop head 104 also includes a cover 469 on a side of the mop head 104 opposite the mop pad 105. In an embodiment, the mop pad 105 is made from a microfiber material. It should be appreciated that during the floor cleaning process, there are a number of instances where the user may desire wring, remove, or extract fluid from the mop pad. For example, after the user has cleaned the floor for a period of time, the mop pad may accumulate debris or otherwise become dirty or soiled. The user may then place the mop head 104 into the first compartment 118, 318 to rinse the debris off, or optionally agitate the microfibers by rubbing the mop pad 105 against the cleaning element 162. After rinsing the mop pad 105, the user may desire to remove fluid (e.g. dirty fluid) before recharging the mop pad 105 in the second chamber 120. Similarly, after recharging the mop pad 105, the user may desire to remove excess fluid from the mop pad 105.

To wring, remove, or extract fluid from the mop pad, the user rotates (or allows the rotation where the mop head is biased to rotate) to a position with the mop head 104 folded substantially flat against the pole, as is shown in FIG. 33. In this position, the mop head 104, cover 469, and mop pad 105 are positioned to be inserted into the slot 432. As the mop head assembly and end of the pole is inserted into the slot 432, the lead-in portions 433a and 433b cooperate to guide the mop head assembly into the slot and initiate a gradual compression of the mop pad 105. In the exemplary embodiment, the attachment mechanism between the mop pad 105 and the mop head 104 is a hook and loop fastener where the edges of the mop pad 105 may not be connected to the fastener (e.g. the fastener is offset from the edge of the mop pad). In an embodiment, the fastener is 4 mm-6 mm from the edge of the mop head. These lead-in surfaces have been advantageously found to place less force on the leading edge of the mop pad 105 and reduces the risk of the mop pad 105 separating from the mop head 104 during insertion or when the mop pad comes in contact with the blade. As the mop head assembly continues to be inserted, the mop pad 105 engages the edge of the blade 440 and removed or extracted fluid flows through the openings or slots 441 and along a flow path, such as that indicated by arrow 471, into the first compartment 118, 318. The mop pad 105 is held against the blade 440 by the rollers 451 which engage the cover 469. The rollers 451 rotate (in the direction indicated by arrow 473) as the mop head assembly moves through the slot 432. The rollers 451 rotate in the first position (FIG. 42) as the mop head assembly is inserted. In an embodiment, the end 104A of the mop head 104 contacts stop surface, such as surface 475 when in the fully inserted position (see FIG. 43). In an embodiment, the surface 475 is part of the drain tray 426 and allow the wringing fluid to flow beneath the mop pad and reintroduction or reabsorption of the fluid is avoided. In an embodiment, the end 105A of the mop pad 105 remains above the edge of the blade 440 thus reducing or minimizing stress on the connection between the mop pad 105 and the mop head 104. In other embodiments, the end 105A of the mop pad 105 moves past the blade 440 during insertion. In this embodiment, when the mop head 104 is withdrawn, the ribs 443 function as a lead-in to gradually compress the mop pad 105 during withdrawal and reduce the risk of the mop pad 105 separating from the mop head 104.

Figure 44:
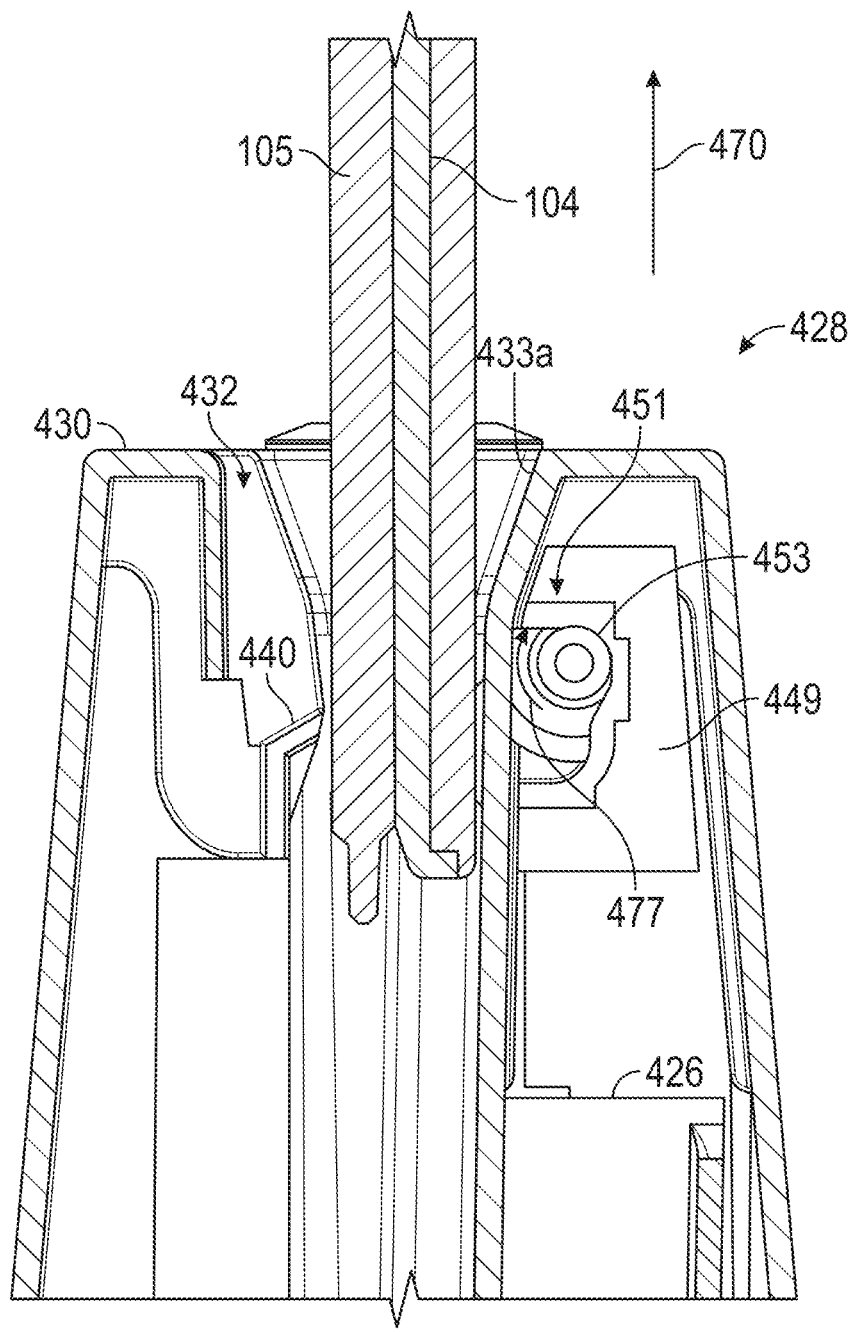
Figure 45:
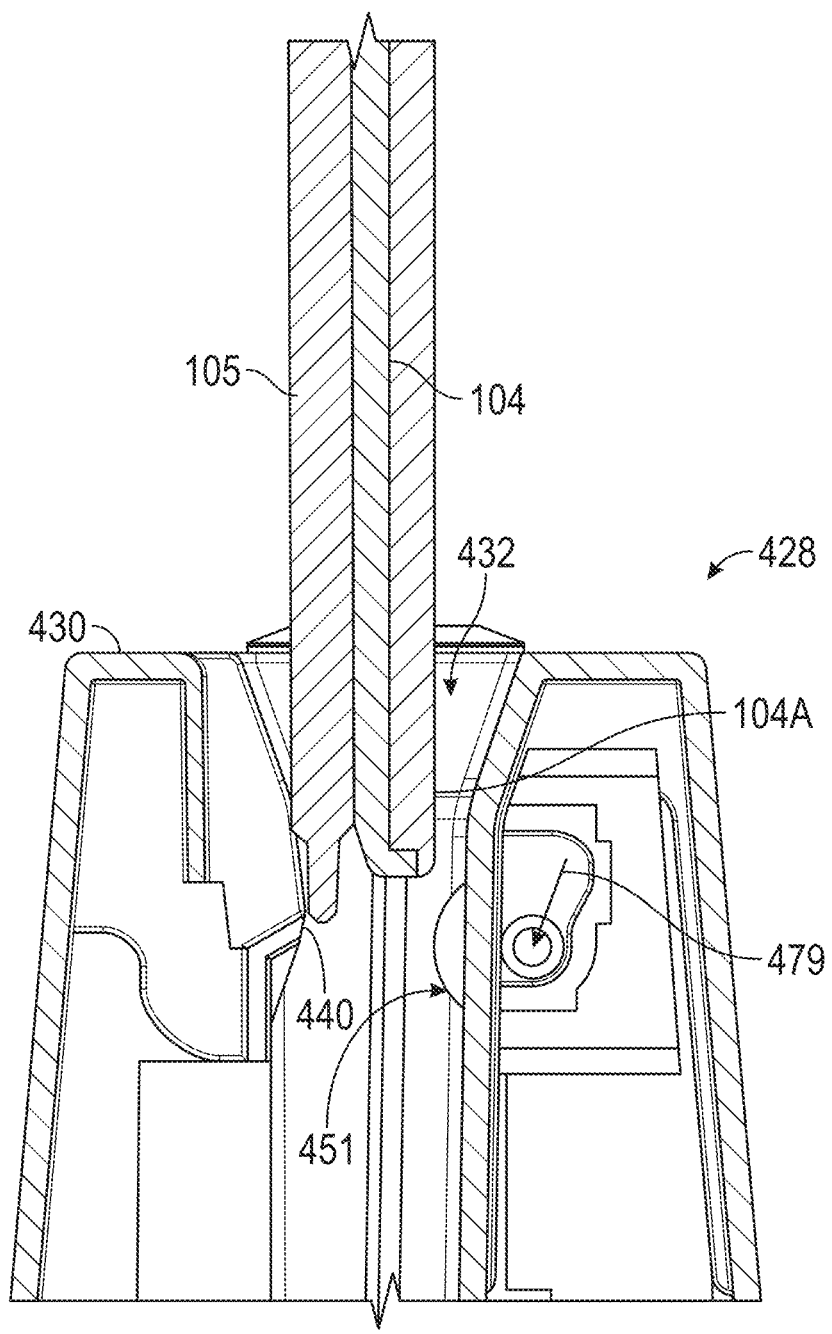

After inserting the mop head assembly, the user may withdraw the mop head assembly by reversing the direction of movement by pulling up on the mop pole as indicated by arrow 470. As a result, due to friction between the cover 469 and the rollers 451, the rollers 451 will rotate in the direction indicated by arrow 477 (FIG. 44). As a result, the rotation of the rollers 451 will cause the rollers 451 to move from the first position (FIG. 42) to the second position (FIG. 44). Once in the second position, the rollers 451 will continue to rotate as the mop head assembly is withdrawn. Once the mop head assembly is withdrawn from the bucket assembly 100, 300, the rollers 451 move back to the first position under the influence of gravity (FIG. 45) as indicated by arrow 479. It should be appreciated that if a roller 451 remains in the second position, the roller will move to the first position the next time the mop head assembly is inserted into the slot 432 and the roller contacts the cover 469. It should be noted that when the mop pad 105 disengages from the blade 440 as shown in FIG. 45, the end 104A of the mop head 104 remains within the slot 432. It should be appreciated that this allows the mop head to be moved through the wringer assembly again without the user reorienting the mop head 104. It should be further appreciated that in the embodiment of FIG. 24, the higher walls 535, 537 also assist in maintaining the alignment of the mop head 104 as the mop head is withdrawn.

It should be appreciated that as the rollers 451 move from the first position to the second position, in addition to moving vertically, the rollers 451 move laterally in a direction away from the centerline of the slot 432. This lateral movement of the rollers 451 allow the mop head 104 and hence the mop pad 105 to also move away from the blade 440 and thus reduce the amount of compression of the mop pad 105. This advantageously reduces the amount of withdrawal force by the user. It should be appreciated that this movement between the first position and second position provides advantages in providing a desired level of fluid removal or extraction during the insertion and making it relatively easy for the user to withdraw. This arrangement provides further advantages in that the lower withdrawal force places less force on the connection between the mop pad and the attachment mechanism of the mop pad 105 to the mop head 104. Thus, the reduced extraction force reduces the risk of the mop pad 105 separating from the mop head 104 during withdrawal.

The term "about" is intended to include the degree of error associated with measurement of the particular quantity based upon the equipment available at the time of filing the application.

It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A floor cleaning system having a flat headed mop, the system comprising:
    a frame having a first portion and a second portion;
    at least one compartment removably coupled to the first portion;
    a wringing assembly fluidly coupled to the at least one compartment and disposed between the first portion and the second portion;
    a post rotatably coupled to and extending from the wringing assembly, the post being rotatable about an axis extending axially through the post; and
    a handle coupled to the end of the post.

2. The floor cleaning system of claim 1, wherein the post is rotatable from a first position with the handle positioned at least partially over the wringing assembly to a second position.

3. The floor cleaning system of claim 1, wherein the post includes a first portion and a second portion, the first portion being coupled to the wringing assembly, the second portion being offset from the first portion.

4. The floor cleaning system of claim 1, wherein the post is extendable from a first length to a second length.

5. The floor cleaning system of claim 1, wherein the handle is comprised of a c-shaped member.

6. The floor cleaning system of claim 1, wherein the handle is comprised of a cross-member having a first c-shaped portion and a second c-shaped portion.

7. A floor cleaning system having a flat headed mop having a pole and a mop head, the mop head having a mop pad and a surface opposite the mop pad, the system comprising:
    a frame;
    at least one compartment removably coupled to the frame, the at least one compartment having a length and a width;
    a member disposed within the at least one compartment, the member having a plurality of walls spaced apart from each other along the length of the at least one compartment; and
    a wringing assembly fluidly coupled to the at least one compartment, the wringing assembly having a housing with a slot sized to receive the flat headed mop;
    a blade fixedly disposed in the slot and configured to extract fluid from the mop pad; and
    wherein the member includes a first wall and a second wall extending along the length of the at least one compartment, the second wall having a relief area sized to receive the handle of the flat headed mop.

8. The floor cleaning system of claim 7, wherein the plurality of walls are parallel to the width of the at least one compartment.

* * * * *